US012694737B2

(12) United States Patent
Ejiri et al.

(10) Patent No.: US 12,694,737 B2
(45) Date of Patent: Jul. 28, 2026

(54) SERVER DEVICE, METHOD, AND PROGRAM

(71) Applicant: Bitkey Inc., Tokyo (JP)

(72) Inventors: Yuki Ejiri, Chuo-ku (JP); Hiroshi Yamamoto, Chuo-ku (JP)

(73) Assignee: Bitkey Inc. (JP)

( * ) Notice: Subject to any disclaimer, the term of this patent is extended or adjusted under 35 U.S.C. 154(b) by 0 days.

(21) Appl. No.: 18/809,764

(22) Filed: Aug. 20, 2024

(65) Prior Publication Data

US 2025/0046138 A1 Feb. 6, 2025

Related U.S. Application Data

(63) Continuation of application No. PCT/JP2023/006278, filed on Feb. 21, 2023.

(30) Foreign Application Priority Data

Feb. 22, 2022 (JP) ................................ 2022-026159

(51) Int. Cl.
*G07C 9/20* (2020.01)
*G07C 9/00* (2020.01)

(52) U.S. Cl.
CPC ... *G07C 9/215* (2020.01); *G07C 2009/00246* (2013.01); *G07C 2009/00253* (2013.01)

(58) Field of Classification Search
None
See application file for complete search history.

(56) References Cited

U.S. PATENT DOCUMENTS 12,026,999 B2 * 7/2024 Einberg ............. G07C 9/00857
2016/0012465 A1 * 1/2016 Sharp .................. G06Q 20/321
705/14.17

(Continued)

FOREIGN PATENT DOCUMENTS

JP 3217118 B2 * 10/2001
JP 2018-025091 A 2/2018

(Continued)

OTHER PUBLICATIONS

International Search Report issued in the corresponding International Patent Application No. PCT/JP2023/006278; dated Apr. 11, 2023 (total 2 pages).

(Continued)

*Primary Examiner* — Fekadeselassie Girma
(74) *Attorney, Agent, or Firm* — Harness, Dickey & Pierce, P.L.C.

(57) ABSTRACT

A server device is provided comprising: at least one processor, wherein the at least one processor is configured to execute a computer readable instructions so as to: receive at least one of person-under-restriction related information related to a person under restriction whose usage of a restricted item is restricted or usage related information related to usage of the restricted item by the person under restriction instructed by an instructor; and generate authentication key information generated based on at least one of the received person-under-restriction related information or the received usage related information, the authentication key information being used to authenticate input key information generated based on predetermined input-key generation rule information and the authentication key information and input to the restricted item by the person under restriction, and to release restriction of the restricted item.

20 Claims, 29 Drawing Sheets

(56) References Cited

U.S. PATENT DOCUMENTS

| | | | | |
|---|---|---|---|---|
| 2021/0075779 | A1* | 3/2021 | Li | H04L 63/083 |
| 2022/0044506 | A1* | 2/2022 | Dewey | G07C 9/215 |
| 2022/0392287 | A1* | 12/2022 | Shen | G06Q 50/163 |

FOREIGN PATENT DOCUMENTS

| | | | | |
|---|---|---|---|---|
| JP | 2021-029022 | A | | 2/2021 |
| JP | 2021088919 | A | * | 6/2021 |
| JP | 2021-192166 | A | | 12/2021 |
| JP | 2022-003559 | A | | 1/2022 |

OTHER PUBLICATIONS

Office Action issued in the corresponding Japanese Patent Application No. 2022-026159; mailed Apr. 14, 2026 (total 10 pages).

* cited by examiner

FIG. 5A

| PERSON-UNDER-RESTRICTION IDENTIFIER | PERSON-UNDER-RESTRICTION RELATED INFORMATION |
|---|---|
| A1 | B1 |
| A2 | B2 |
| ... | ... |
| Am | Bm |

FIG. 5B

| INSTRUCTOR IDENTIFIER | PASSWORD | ADDRESS INFORMATION | PERSONAL INFORMATION | DELIVERY DESTINATION INFORMATION | CHARACTER STRING INFORMATION |
|---|---|---|---|---|---|
| C1 | D1 | E1 | F1 | G1 | T1 |
| C2 | D2 | E2 | F2 | G2 | T2 |
| ... | ... | ... | ... | ... | ... |
| Cm | Dm | Em | Fm | Gm | Tm |

| SERVICE IDENTIFIER | INSTRUCTOR IDENTIFIER | PERSON-UNDER-RESTRICTION IDENTIFIER | RESTRICTED ITEM IDENTIFIER | SERVICE CONTENT |
|---|---|---|---|---|
| J1 | C1 | A1 | P1 | K1 |
| J2 | C2 | A2 | P2 | K2 |
| ... | ... | ... | ... | ... |
| Jm | Cm | Am | Pm | Km |

| KEY IDENTIFIER | SERVICE IDENTIFIER | RESTRICTED ITEM IDENTIFIER | AUTHENTICATION KEY INFORMATION | INPUT-KEY GENERATION RULE INFORMATION | INPUT KEY INFORMATION |
|---|---|---|---|---|---|
| M1 | J1 | P1 | N1 | H1 | O1 |
| M2 | J2 | P2 | N2 | H2 | O2 |
| ... | ... | ... | ... | ... | ... |
| Mm | Jm | Pm | Nm | Hm | Om |

SERVER DEVICE, METHOD, AND PROGRAM

CROSS-REFERENCE TO RELATED APPLICATIONS

The present application is a continuation application of International Application No. PCT/JP2023/006278, filed on Feb. 21, 2023, which is expressly incorporated herein by reference in its entirety.

BACKGROUND

Technical Field

The present disclosure relates to a server device, a method, and a program for managing restriction on usage of a restricted item.

Background Art

Hitherto, for example, a system that can unlock a locked door of an entrance of a multi-unit residential building by an operation using a remote control device (for example, an intercom device) or the like installed in each unit included in the multi-unit residential building is known. However, in a multi-unit residential building in which such a system is provided, in a case where delivery personnel or the like pass through a door of an entrance of the multi-unit residential building, it is necessary for a resident of a delivery destination to be present in the multi-unit residential building to perform an operation of unlocking the door of the entrance.

Japanese Patent Publication No. 2021-088919 A discloses a system that can unlock a door of an entrance of a multi-unit residential building without an operation of a resident of a delivery destination when, for example, a delivery worker of a delivery company passes through the door of the entrance of the multi-unit residential building. In the system, a server device stores a service number set by the delivery company, and when an unlocking request including the service number input by the delivery worker is received by a door control device that controls opening and closing of the door, processing of performing authentication by comparison with the service number stored in the server device and unlocking the door is executed. However, in the system, the server device needs to always store the service number issued by the delivery company for authentication of the unlocking request.

SUMMARY

An embodiment according to the present disclosure has been made from the background described above, and an object of the present disclosure is to flexibly manage restriction on usage of a restricted item by a person under restriction.

A server device according to the present disclosure is a server device comprising: at least one processor, wherein the at least one processor is configured to execute a computer readable instructions so as to: receive at least one of person-under-restriction related information related to a person under restriction whose usage of a restricted item is restricted or usage related information related to usage of the restricted item by the person under restriction instructed by an instructor; and generate authentication key information generated based on at least one of the received person-under-restriction related information or the received usage related information, the authentication key information being used to authenticate input key information generated based on predetermined input-key generation rule information and the authentication key information and input to the restricted item by the person under restriction, and to release restriction of the restricted item.

Further, a method according to the present disclosure is a method for causing a processor to execute a process the method comprising executing on a processor in a computer the steps of: receiving at least one of person-under-restriction related information related to a person under restriction whose usage of a restricted item is restricted or usage related information related to usage of the restricted item by the person under restriction instructed by an instructor; and generating authentication key information generated based on at least one of the received person-under-restriction related information or the received usage related information, the authentication key information being used to authenticate input key information generated based on predetermined input-key generation rule information and the authentication key information and input to the restricted item by the person under restriction, and to release restriction of the restricted item.

A computer program product embodying computer readable instructions stored on a non-transitory computer-readable storage medium cause a computer to execute a process by at least one processor so as to perform the steps of: receiving at least one of person-under-restriction related information related to a person under restriction whose usage of a restricted item is restricted or usage related information related to usage of the restricted item by the person under restriction instructed by an instructor; and generating authentication key information generated based on at least one of the received person-under-restriction related information or the received usage related information, the authentication key information being used to authenticate input key information generated based on predetermined input-key generation rule information and the authentication key information and input to the restricted item by the person under restriction, and to release restriction of the restricted item.

With the server device, the method, and the program according to the present disclosure, it is possible to flexibly manage restriction on usage of a restricted item by a person under restriction.

Note that the above effects are merely examples for convenience of description, and are not restrictive. In addition to or instead of the above effects, any effect described in the present disclosure or an effect obvious to those skilled in the art can be exhibited.

BRIEF DESCRIPTION OF THE DRAWINGS

FIG. 5A is a diagram illustrating a person-under-restriction related information table stored in a memory 213 in the server device 200 illustrated in FIG. 1.

FIG. 5B is a diagram illustrating a usage related information table stored in the memory 213 in the server device 200 illustrated in FIG. 1.

DESCRIPTION

First Embodiment

Figure 1:
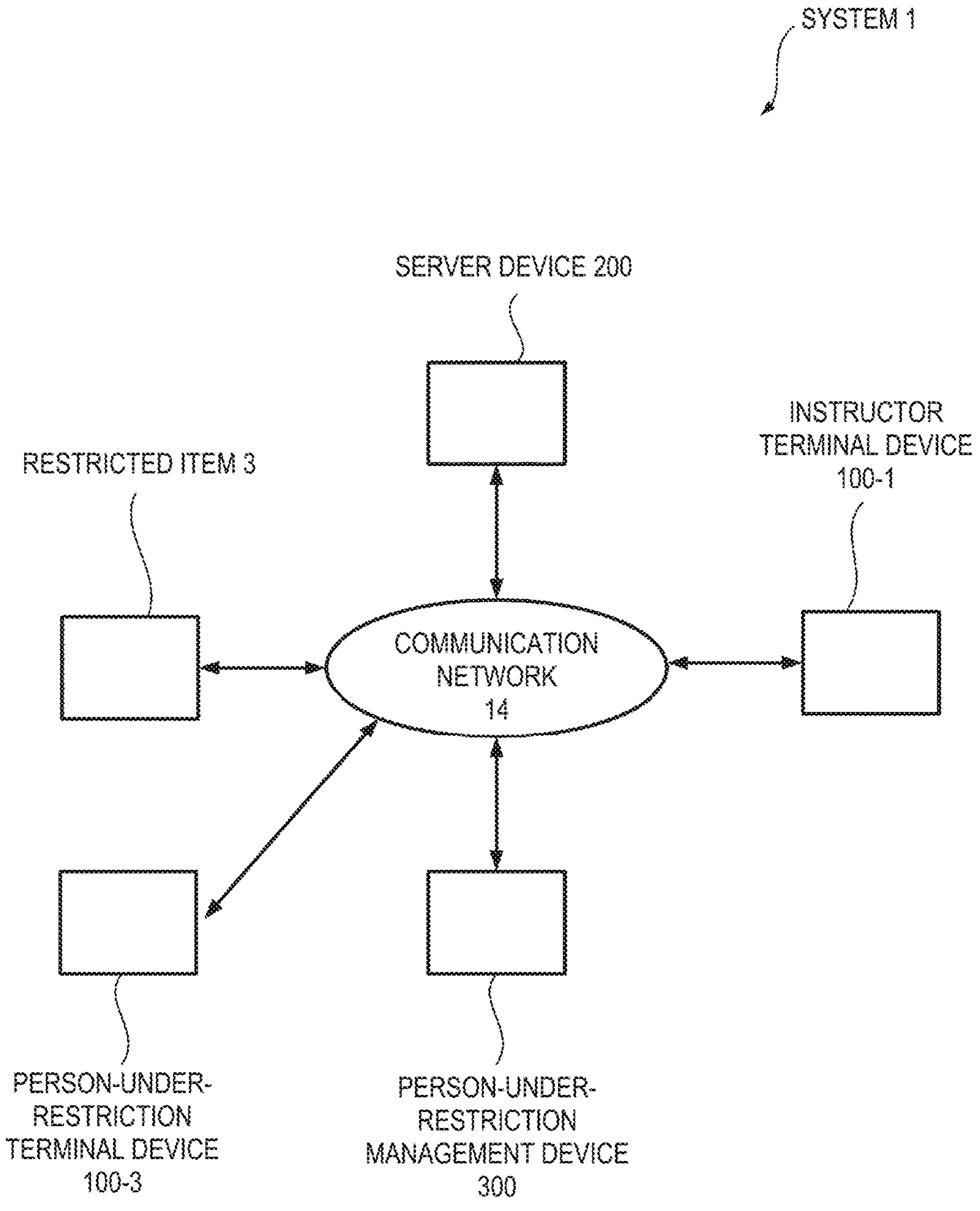
FIG. 1 is a diagram illustrating a configuration of a system 1 according to a first embodiment.

Hereinafter, a first embodiment of the present disclosure will be described in detail with reference to the drawings. Note that substantially the same or corresponding components, processing, and information in the drawings are denoted by the same reference numerals and names. Further, "information" and "data" are not strictly distinguished from each other. The term "person" means not only one natural person but also a plurality of natural persons, legal persons, organizations, companies, and the like. In addition, "usage" includes various meanings including not only actually holding and using a restricted item, such as entrance and exit through a door, using an item, lending and borrowing an item, or the like, but also being present in a space of the restricted item.

In addition, in the drawings, the number and types of components and data are exemplarily illustrated, and are increased or decreased or changed as appropriate. In addition, in the drawings, the order of communication among devices is exemplarily illustrated, and is appropriately changed. Further, in the drawings, components not related to the essential description of the invention may be omitted as appropriate. Furthermore, in the drawings, for convenience of illustration, some of names of components and various types of information such as "information" may be appropriately omitted.

1. Configuration of System 1 According to First Embodiment

Figure 2:
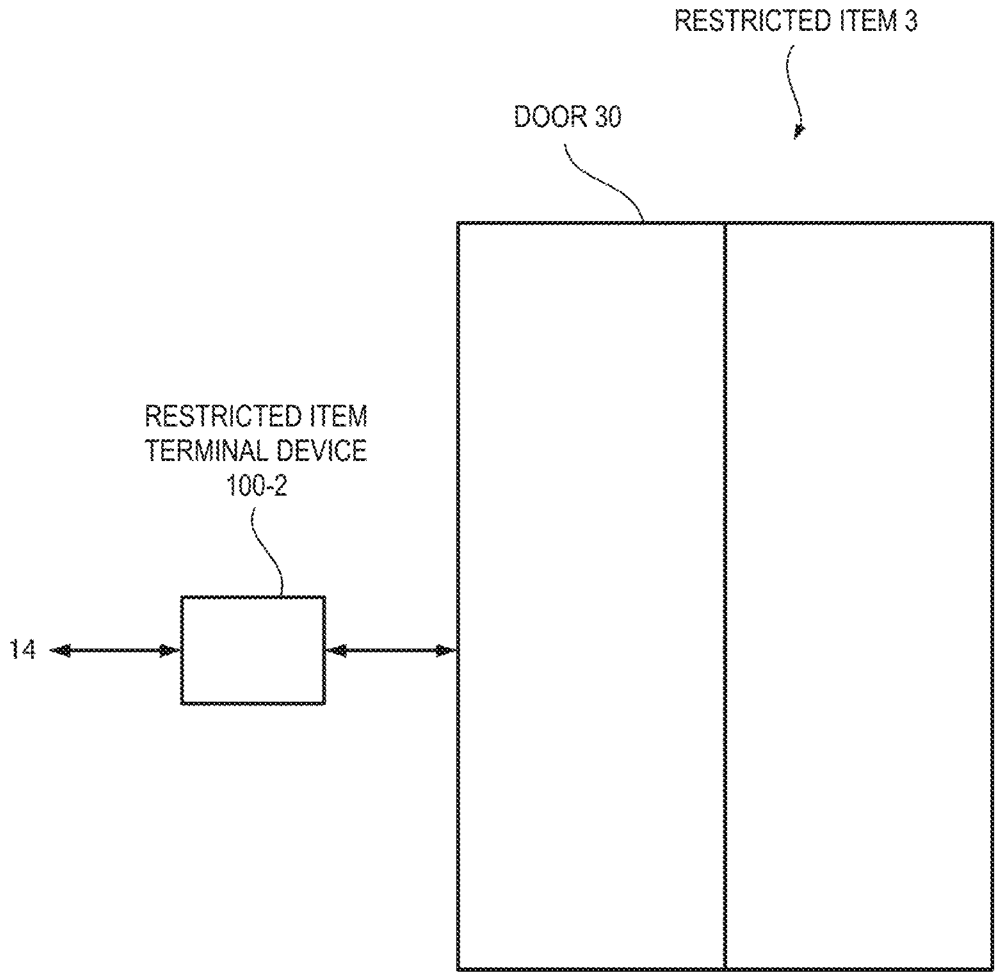
FIG. 2 is a diagram illustrating a configuration of a restricted item 3 according to the first embodiment.

FIG. 1 is a diagram illustrating a configuration of a system 1 according to the first embodiment. FIG. 2 is a diagram illustrating a configuration of a restricted item 3 according to the first embodiment. As illustrated in FIGS. 1 and 2, in the system 1, an instructor terminal device 100-1, a person-under-restriction terminal device 100-3, a server device 200, a person-under-restriction management device 300, and the restricted item 3 are connected via a communication network 14 so as to be able to communicate information and data with each other. As illustrated in FIG. 2, the restricted item 3 includes a restricted item terminal device 100-2 and a door 30. The restricted item terminal device 100-2 is connected to the communication network 14 so as to be able to communicate information and data, and is electrically connected to the door 30.

The instructor terminal device 100-1 is held by an instructor and receives an operation input from the instructor. The person-under-restriction terminal device 100-3 is held by a person under restriction and receives an operation input from the person under restriction. The server device 200 manages restriction on usage of the restricted item 3 by the person under restriction. The person-under-restriction management device 300 manages and controls each person-under-restriction terminal devices 100-3 in a case where each of a plurality of persons under restriction holds the person-under-restriction terminal device 100-3. The communication network 14 connects the components in at least one of a wired manner and a wireless manner, and is implemented by the Internet, a WAN, a VPN, a LAN, or the like.

Hereinafter, when it is not necessary to distinguish the instructor terminal device 100-1, the restricted item terminal device 100-2, and the person-under-restriction terminal device 100-3, the instructor terminal device 100-1, the restricted item terminal device 100-2, and the person-under-restriction terminal device 100-3 are collectively referred to as a terminal device 100.

In the present embodiment, in a case where each of a plurality of persons under restriction holds the person-under-restriction terminal device 100-3 or in a case where a predetermined service is requested to the person under restriction, the system 1 can be suitably executed by the presence of the person-under-restriction management device 300 and the instructor terminal device 100-1, but the person-under-restriction management device 300 and the instructor terminal device 100-1 may be provided as necessary and do not have to be necessarily provided.

2. Example of Restriction on Usage of Restricted Item 3

Restriction on usage of the restricted item 3 by the person under restriction in the system 1 will be described with specific examples. However, it is a matter of course that examples of the restriction on the usage are not limited to those described below, and can be similarly applied to other uses.

(A) a Case where the Restricted Item 3 is a Door of an Entrance of a Multi-Unit Residential Building (an Example of Package Delivery)

Typically, the restricted item 3 may be a door of an entrance of a multi-unit residential building, the person under restriction may be a delivery company or a delivery worker of the delivery company, and the instructor may be a resident of each unit of the multi-unit residential building and a requester who has directly or indirectly requested the delivery company to deliver a package. In such a case, input key information for unlocking the locked door of the entrance of the multi-unit residential building is transmitted as a four-digit number, for example, from the server device 200 directly or via the person-under-restriction management device 300 to the person-under-restriction terminal device 100-3 held and used by the delivery worker who delivers the package.

When the input key information is received from the server device 200, the person-under-restriction terminal device 100-3 outputs the received input key information to a display. The delivery worker views the input key information output to the person-under-restriction terminal device 100-3 and inputs the input key information to the restricted item terminal device 100-2. The restricted item terminal device 100-2 or the server device 200 performs authentication of the input key information. When the authentication succeeds, the locked door of the entrance of the multi-unit residential building is unlocked. As a result, the delivery worker can deliver the package to the unit of the requester who is the instructor by passing through the door of the entrance of the multi-unit residential building. On the other hand, when the authentication fails, the door of the entrance of the multi-unit residential building is not unlocked and remains locked. Therefore, the delivery worker cannot pass through the door of the entrance of the multi-unit residential building.

In this example, a case where the requester requests the delivery company to deliver the package is described. However, for example, the system 1 can be similarly used in a case where a product is purchased by a mail order such as a so-called e-commerce service and the product is delivered.

(B) A Case where the Restricted Item 3 is a Door of an Entrance of a Multi-Unit Residential Building (an Example of Housekeeping Service)

Typically, the restricted item 3 may be a door of an entrance of a multi-unit residential building, the person under restriction may be a housekeeping agent or a housekeeper from the housekeeping agent, and the instructor may be a resident of each unit of the multi-unit residential building and a requester who has requested the housekeeping agent to perform housekeeping. In such a case, input key information for unlocking the locked door of the entrance of the multi-unit residential building is transmitted as a four-digit number, for example, from the server device 200 directly or via the person-under-restriction management device 300 to the person-under-restriction terminal device 100-3 held and used by the housekeeper.

When the input key information is received from the server device 200, the person-under-restriction terminal device 100-3 outputs the received input key information to a display. The housekeeper views the input key information output to the person-under-restriction terminal device 100-3 and inputs the input key information to the restricted item terminal device 100-2. The restricted item terminal device 100-2 or the server device 200 performs authentication of the input key information. When the authentication succeeds, the locked door of the entrance of the multi-unit residential building is unlocked. As a result, the housekeeper can go to the unit of the requester who is the instructor by passing through the door of the entrance of the multi-unit residential building. On the other hand, when the authentication fails, the door of the entrance of the multi-unit residential building is not unlocked and remains locked. Therefore, the housekeeper cannot pass through the door of the entrance of the multi-unit residential building.

(C) A Case where the Restricted Item 3 is a Shared Bicycle

Typically, the restricted item 3 may be a shared bicycle that can be used by applying for use among a plurality of users registered in advance, and the person under restriction may be a user who desires to use the shared bicycle. In such a case, input key information for unlocking the shared bicycle is transmitted as a four-digit number, for example, from the server device 200 to the person-under-restriction terminal device 100-3 held and used by the user. In this case, the user himself/herself instructs usage of the shared bicycle that is the restricted item 3. That is, the person under restriction and the instructor are the same person. Similarly, the person-under-restriction terminal device 100-3 and the instructor terminal device 100-1 can be the same device.

When the input key information is received from the server device 200, the person-under-restriction terminal device 100-3 outputs the received input key information to a display. The user views the input key information output to the person-under-restriction terminal device 100-3 and inputs the input key information to the restricted item terminal device 100-2. The restricted item terminal device 100-2 or the server device 200 performs authentication of the input key information. Then, when the authentication succeeds, the locked shared bicycle is unlocked, and the user can use the shared bicycle. On the other hand, when the authentication fails, the shared bicycle is not unlocked and remains locked. Therefore, the usage of the shared bicycle by the user remains restricted.

(D) A Case where the Restricted Item 3 is a Conference Booth

Typically, the restricted item 3 may be a conference booth that can be lent in a time unit for conference use or the like, and the person under restriction may be a user who intends to use the booth. In such a case, input key information for unlocking the conference booth is transmitted as a four-digit number, for example, from the server device 200 to the person-under-restriction terminal device 100-3 held and used by the user. The user himself/herself instructs usage of the conference booth that is the restricted item 3. The person under restriction is the user himself/herself. That is, the person under restriction and the instructor are the same person. Similarly, the person-under-restriction terminal device 100-3 and the instructor terminal device 100-1 can be the same device.

When the input key information is received from the server device 200, the person-under-restriction terminal device 100-3 outputs the received input key information to a display. The user views the input key information output to the person-under-restriction terminal device 100-3 and inputs the input key information to the restricted item terminal device 100-2. The restricted item terminal device 100-2 or the server device 200 performs authentication of the input key information. Then, when the authentication succeeds, the conference booth is unlocked, and the user can use the conference booth. On the other hand, when the authentication fails, the conference booth is not unlocked and remains locked. Therefore, the usage of the conference room remains restricted for the user.

In the above example, a case where the restricted item 3 is a door of an entrance of a multi-unit residential building, a shared bicycle, or a conference booth has been described. However, it is a matter of course that examples of the restricted item 3 are naturally not limited thereto, and the system 1 can be suitably applied to any item as long as usage thereof by the person under restriction needs to be restricted as represented by a door of an entrance of each unit of a multi-unit residential building, a door of a detached house, a space having a predetermined size and having at least one side partitioned by a wall or the like, such as a conference room, a hotel room, an entrance of an office building, or a coin locker, an entrance of such a space, and an item that can be lent, such as a rental car or a rental construction machine.

Hereinafter, a case in which the person under restriction is a delivery worker of a delivery company who is requested to deliver a package according to an instruction of the instructor, the instructor is a user who requests the delivery company to deliver the package, and the restricted item is the door 30 (FIG. 2) of the entrance of the multi-unit residential building will be described as an example in order to specify and clarify the description. The multi-unit residential building is a so-called multi-unit house or an apartment building.

3. Components of System 1

Each component of the system 1 will be described below.

(A) Configuration of Each Terminal Device 100

Figure 3:
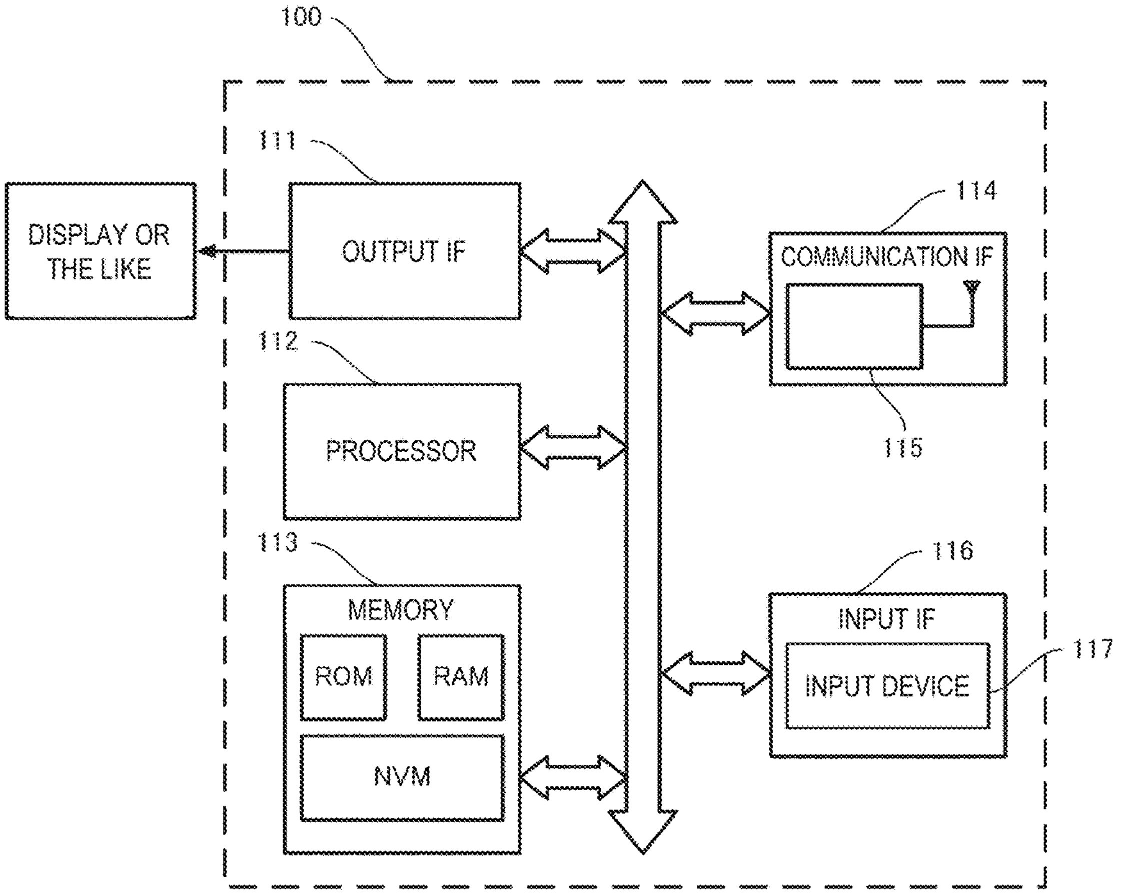
FIG. 3 is a diagram illustrating a configuration of a terminal device 100 according to the first embodiment.

Hereinafter, a configuration of the terminal device 100 including the instructor terminal device 100-1, the restricted item terminal device 100-2, and the person-under-restriction terminal device 100-3 illustrated in FIG. 1 will be described. FIG. 3 illustrates an example thereof, and the instructor terminal device 100-1, the restricted item terminal device 100-2, and the person-under-restriction terminal device 100-3 are not necessarily the same or the same type of terminal devices, and may be different from each other. In addition, the instructor terminal device 100-1, the restricted item terminal device 100-2, and the person-under-restriction terminal device 100-3 are merely names for distinguishing according to a main processing content, and it is also possible to use one terminal device such as using the instructor terminal device 100-1 as the restricted item terminal device 100-2.

FIG. 3 is a diagram illustrating the configuration of the terminal device 100 according to the first embodiment. The terminal device 100 does not need to include all of the components illustrated in FIG. 3, and some of the components may be omitted. Furthermore, other components than those illustrated in FIG. 3 may be added to the terminal device 100.

As illustrated in FIG. 3, the terminal device 100 includes an output interface (output IF) 111, a processor 112, a memory 113, a communication interface (communication IF) 114, and an input interface (input IF) 116. The components are electrically connected via a bus and a control line, and transmit and receive data and information to and from each other.

Examples of the output interface 111 include output devices such as a speaker and a display (not illustrated), and a connection terminal serving as an interface for connecting to the output devices. The output interface 111 functions as an output unit that receives an instruction from the processor 112 and outputs various types of information. In a case where the output interface 111 is a display, the output interface 111 functions as a display unit that performs various types of display for managing restriction on usage of the restricted item according to the present embodiment according to an instruction of the processor 112. Examples of such a display include a liquid crystal display or an organic EL display. In a case where the output interface 111 is a speaker, the output interface 111 functions as an audio output unit that outputs an audio signal for implementing the restriction on usage of the restricted item according to the present embodiment.

The processor 112 includes at least one central processing unit (CPU) or a combination of at least one CPU and a graphics processing unit (GPU) specialized for image processing, and a peripheral circuit thereof. The processor 112 functions as a control unit that controls other connected components based on various programs stored in the memory 113.

Specifically, the processors 112 of the instructor terminal device 100-1, the restricted item terminal device 100-2, and the person-under-restriction terminal device 100-3 execute a program for managing the restriction on usage of the restricted item according to the present embodiment. That is, these processors 112 execute a program for executing processing for implementing each function described in detail below.

The memory 113 is implemented by a read only memory (ROM), a random access memory (RAM), a nonvolatile memory, a hard disk device (HDD), or the like, and functions as a storage unit. A storage medium, a database, or the like that is attachable to and detachable from the terminal device 100 may be connected to the memory 113.

The ROM stores a predetermined instruction command for executing an application or an operating system (OS) according to the present embodiment as a program. The RAM is a memory in which data required for processing is written and from which data required for processing is read while the program stored in the ROM is processed by the processor 112. The nonvolatile memory is a memory that holds written data without power supply. The processor 112 writes data obtained by executing the program in the nonvolatile memory or reads written data from the nonvolatile memory.

For example, each of the memories 113 of the instructor terminal device 100-1, the restricted item terminal device 100-2, and the person-under-restriction terminal device 100-3 stores a program for implementing the restriction on usage of the restricted item according to the present embodiment.

The communication interface 114 includes a communication processing circuit and an antenna (not illustrated). The communication interface 114 is connected to the communication network 14 via the communication processing circuit and the antenna, and functions as a communication unit that transmits and receives data to and from other devices connected to the communication network 14.

Specifically, the communication interface 114 executes processing of transmitting and receiving necessary information and data to and from other components of the system 1 in order to manage the restriction on usage of the restricted item 3 according to the present embodiment.

The communication interface 114 executes communication processing for communicating information with the communication network 14 via the antenna by a broadband wireless communication method such as LTE or a narrowband wireless communication method such as IEEE802.11 or Bluetooth (registered trademark). The communication interface 114 may perform wired communication instead of or in addition to the wireless communication described above.

The input interface 116 includes an input device 117 such as a touch panel and a hard key as an example, and functions as an input unit that receives an operation input of the user of the terminal device 100.

(B) Configurations of Server Device 200 and Person-Under-Restriction Management Device 300

Figure 4:
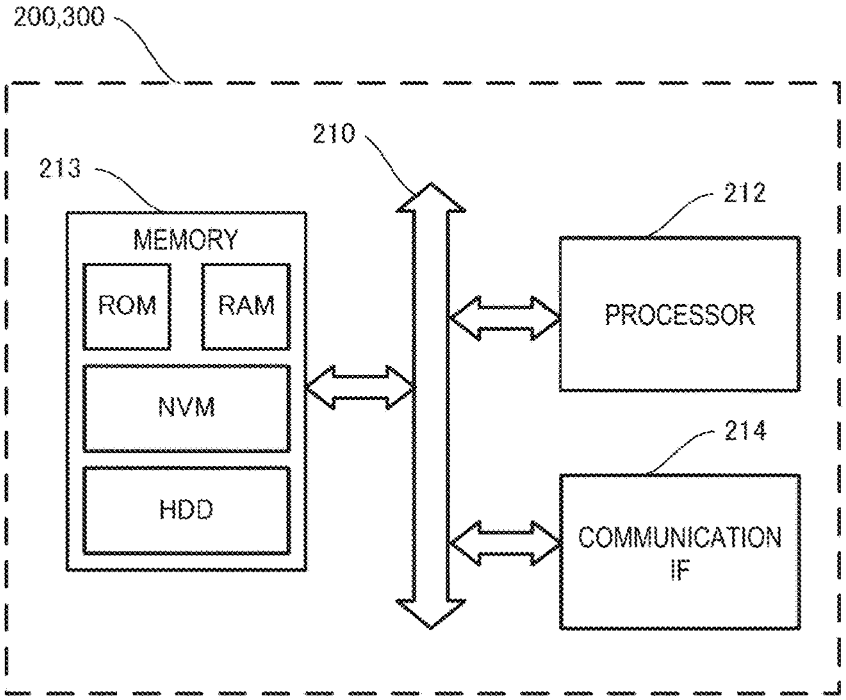
FIG. 4 is a diagram illustrating configurations of a server device 200 and a person-under-restriction management device 300 according to the first embodiment.

Hereinafter, configurations of the server device 200 and the person-under-restriction management device 300 illustrated in FIG. 1 will be described. FIG. 4 illustrates an example thereof, and the server device 200 and the person-under-restriction management device 300 are not necessarily the same or the same type of devices, and may be different from each other.

FIG. 4 is a diagram illustrating the configurations of the server device 200 and the person-under-restriction management device 300 according to the first embodiment. The server device 200 and the person-under-restriction management device 300 do not need to include all the components illustrated in FIG. 4, and some of the components may be omitted. In addition, components other than those illustrated in FIG. 4 may be added to the server device 200 and the person-under-restriction management device 300. Furthermore, the server device 200 and the person-under-restriction management device 300 may have a configuration in which processing and storage are distributed to a plurality of processing devices and storage devices, and in some cases, these devices may be collectively referred to as the server device 200 and the person-under-restriction management device 300.

As illustrated in FIG. 4, each of the server device 200 and the person-under-restriction management device 300 includes a processor 212, a memory 213, and a communication interface (communication IF) 214. The components are electrically connected via a bus and a control line, and transmit and receive data and information to and from each other.

The processor 212 includes at least one central processing unit (CPU) or a combination of at least one CPU and a graphics processing unit (GPU) specialized for image processing, and a peripheral circuit thereof. The processor 212 functions as a control unit that controls other connected components based on various programs stored in the memory 213.

Specifically, the processors 212 of the server device 200 and the person-under-restriction management device 300 execute a program for managing the restriction on usage of the restricted item according to the present embodiment. That is, these processors 212 execute a program for executing processing for implementing each function described in detail below.

In particular, in the server device 200, the processor 212 executes processing of receiving at least one of person-under-restriction related information related to the person under restriction whose usage of the door 30 of the entrance of the multi-unit residential building is restricted or usage related information related to the instructor who indirectly instructs the usage of the door 30 of the entrance of the multi-unit residential building by the delivery company (which means scheduling the usage of the door 30 of the entrance by making a delivery request).

Further, the processor 212 executes processing of generating authentication key information based on at least one of the received person-under-restriction related information or usage related information. When the input key information generated using predefined input-key generation rule information and the authentication key information is input to the restricted item terminal device 100-2 of the restricted item 3, the authentication key information is used to authenticate the input key information that is input and release the restriction of the restricted item 3.

The memory 213 is implemented by a RAM, a ROM, a nonvolatile memory, a HDD, or the like, and functions as a storage unit. The memory 213 stores a program for managing the restriction on usage of the restricted item 3 according to the present embodiment. The ROM stores a predetermined instruction command for executing the processing according to the present embodiment as a program. The RAM is a memory in which data required for processing is written and from which data required for processing is read while the program stored in the ROM is processed by the processor 212. The nonvolatile memory is a memory that holds written data without power supply. The processor 212 writes data obtained by executing the program in the nonvolatile memory or reads written data from the nonvolatile memory.

For example, the memories 213 of the server device 200 and the person-under-restriction management device 300 store a program for managing the restriction on usage of the restricted item 3 according to the present embodiment. In particular, in the server device 200, the memory 213 stores a program for executing processing of receiving at least one of the person-under-restriction related information related to the person under restriction whose usage of the door 30 of the entrance of the multi-unit residential building is restricted or the usage related information related to the instructor who indirectly instructs the usage of the door 30 of the entrance of the multi-unit residential building by the delivery company (which means scheduling the usage of the door 30 of the entrance by making a delivery request).

In addition, the memory 213 stores a program for executing processing of generating the authentication key information based on at least one of the received person-under-restriction related information or usage related information. As described above, when the input key information generated using the predefined input-key generation rule information and the authentication key information is input to the restricted item terminal device 100-2 of the restricted item 3, the authentication key information is used to authenticate the input key information that is input and release the restriction of the restricted item 3.

The communication interface 214 includes a communication processing circuit and an antenna (not illustrated). The communication interface 214 is connected to the communication network 14 via the communication processing circuit and the antenna, and functions as a communication unit that transmits and receives data to and from other devices connected to the communication network 14.

Specifically, the communication interface 214 executes processing of transmitting and receiving necessary information and data to and from other components of the system 1 in order to manage the restriction on usage of the restricted item 3 according to the present embodiment.

The communication interface 214 executes communication processing for communicating information with the communication network 14 via the antenna by a broadband wireless communication method such as LTE or a narrowband wireless communication method such as IEEE802.11 or Bluetooth (registered trademark). The communication interface 214 may perform wired communication instead of or in addition to the wireless communication described above.

4. Function of Each Component of System 1

The terminal device 100, the server device 200, the person-under-restriction management device 300, and the like included in the system 1 include the above-described components. Each of the devices reads a program stored in a memory included in each device and executes processing by a processor to control other components, thereby executing the following functions.

(A) Instructor Terminal Device 100-1

Examples of the instructor terminal device 100-1 include a portable terminal device such as a smartphone capable of communicating with the communication network 14, a tablet personal computer (PC), a notebook PC, a stationary PC, or the like. The instructor terminal device 100-1 is used by the instructor to request the delivery company to deliver the package, and transmits the request to the person-under-restriction management device 300 operated by the delivery company. In addition, the instructor terminal device 100-1 is used to input the usage related information including personal information of the instructor, an arbitrary character string (including a letter, a symbol, or a combination thereof) of an arbitrary number of digits selected by instruction input by the instructor, and the like, and transmits the input usage related information to the server device 200 and the person-under-restriction management device 300.

(B) Restricted Item Terminal Device 100-2

The restricted item terminal device 100-2 is typically configured integrally with a door phone used to communicate with an intercom device provided in each unit of the multi-unit residential building, and is disposed to be electrically connected to the door 30 of the entrance of the multi-unit residential building. The restricted item terminal device 100-2 includes, in addition to the components illustrated in FIG. 3, the intercom and a numeric keypad through which a character string such as numbers can be input. Then, the restricted item terminal device 100-2 receives the input of the input key information by the delivery worker via the input interface 116.

In addition, in some cases, the restricted item terminal device 100-2 transmits the input key information input to the restricted item terminal device 100-2 to the server device 200 for authentication in the server device 200, and receives, from the server device 200, information indicating that the authentication has succeeded and an unlock instruction for unlocking the door 30 of the restricted item 3 once the authentication is performed. In some cases, the restricted item terminal device 100-2 receives input key information generated from the server device 200, compares the input key information with the input key information input to the restricted item terminal device 100-2 to perform authentication, and transmits, to the server device 200, information indicating that the unlock instruction for the door 30 of the restricted item 3 has been issued. In some cases, the restricted item terminal device 100-2 receives the authentication key information and the input-key generation rule information from the server device 200, generates the input key information by itself, performs authentication by comparing the generated input key information with the input key information input to the restricted item terminal device 100-2, and transmits, to the server device 200, information indicating that the unlock instruction for the door 30 of the restricted item 3 has been issued. In some cases, the restricted item terminal device 100-2 receives the authentication key information from the server device 200, receives the input-key generation rule information from the person-under-restriction terminal device 100-3, generates the input key information by itself, performs the authentication by comparing the generated input key information with the input key information input to the restricted item terminal device 100-2, and transmits, to the server device 200, information indicating that the unlock instruction for the door 30 of the restricted item 3 has been issued.

Once the unlock instruction is issued by any of the methods, the restricted item terminal device 100-2 transmits an unlock signal for permitting unlocking of the door 30 of the restricted item 3.

(C) Person-Under-Restriction Terminal Device 100-3

Examples of the person-under-restriction terminal device 100-3 include a portable terminal device such as a smartphone capable of communicating with the communication network 14, a tablet personal computer (PC), a notebook PC, a stationary PC, or the like. However, for example, in a case where the person-under-restriction terminal device 100-3 is held by the delivery worker, a portable terminal device, a tablet PC, or the like that is portable is preferable. Such a person-under-restriction terminal device 100-3 is carried and used by the delivery worker who is employed by the delivery company operating the person-under-restriction management device 300 and delivers a delivery item to a delivery location designated by the instructor according to an instruction of the delivery company.

The person-under-restriction terminal device 100-3 receives input of the person-under-restriction related information related to the person under restriction holding the person-under-restriction terminal device 100-3, and transmits the input person-under-restriction related information to the server device 200.

In addition, the person-under-restriction terminal device 100-3 receives the input key information used to unlock the door 30 from the server device 200, and outputs the received input key information to the display to show the input key information to the delivery worker. As a result, the delivery worker can input the input key information displayed on the person-under-restriction terminal device 100-3 to the restricted item terminal device 100-2. Here, the person-under-restriction terminal device 100-3 receives the input key information from the server device 200, but the input key information may be received via the person-under-restriction management device 300.

In addition, in some cases, the person-under-restriction terminal device 100-3 receives the input-key generation rule information from the server device 200, and further transmits the received input-key generation rule information to the server device 200 that performs authentication. In some cases, the person-under-restriction terminal device 100-3 receives the input-key generation rule information from the server device 200, and transmits the input-key generation rule information received through near field communication or the like to the restricted item terminal device 100-2 that performs authentication.

(D) Server Device 200

The server device 200 is, for example, a server device operated by an administrator who manages the restriction on usage of the restricted item 3. The server device 200 stores the input-key generation rule information indicating a logic for generating the input key information from the authentication key information in advance.

The server device 200 receives at least one of the person-under-restriction related information related to the delivery company who manages and operates the person-under-restriction management device 300 or the delivery worker who performs delivery according to the instruction of the delivery company, or the usage related information related to the instructor who makes the delivery request. Thereafter, the server device 200 generates the authentication key information used to generate the input key information by using at least one of the received person-under-restriction related information or the received usage related information. The generation of the authentication key information does not mean generation using only at least one of the person-under-restriction related information or the usage related information. That is, the authentication key information may be generated based on both the person-under-restriction related information and the usage related information, or may be generated based on information other than these pieces of information.

In addition, the server device 200 generates the input key information from the authentication key information by using the input-key generation rule information. In addition, the server device 200 transmits the generated input key information to the person-under-restriction terminal device 100-3. Furthermore, in some cases, the server device 200 receives the input key information input to the restricted item terminal device 100-2 from the restricted item terminal device 100-2 and compares the input key information with the input key information generated in advance, thereby authenticating the delivery worker who has input the input key information to the restricted item terminal device 100-2. In some cases, the server device 200 transmits the generated input key information to the restricted item terminal device 100-2 in order to perform authentication of the input key information input to the restricted item terminal device 100-2. In some cases, the server device 200 transmits the authentication key information and the input-key generation rule information to the restricted item terminal device 100-2 in order to perform authentication of the input key information input to the restricted item terminal device 100-2. In some cases, the server device 200 transmits the input key information and the input-key generation rule information to the person-under-restriction terminal device 100-3, receives the input key information input to the restricted item terminal device 100-2 from the restricted item terminal device 100-2, and receives the input-key generation rule information from the person-under-restriction terminal device 100-3, thereby authenticating the delivery worker who has input the input key information to the restricted item terminal device 100-2. In some cases, the server device 200 transmits the input key information and the input generation rule information to the person-under-restriction terminal device 100-3, and transmits the authentication key information to the restricted item terminal device 100-2 in order to perform authentication of the input key information input to the restricted item terminal device 100-2.

In a case where the server device 200 has performed authentication of the delivery worker who has input the input key information to the restricted item terminal device 100-2, the server device 200 transmits, to the restricted item terminal device 100-2, information indicating that the authentication has succeeded and the unlock instruction for the door 30 of the restricted item 3. In addition, the server device 200 transmits an unlock notification indicating that the door 30 has been unlocked to the instructor terminal device 100-1 that has directly or indirectly issued the delivery instruction to the delivery worker. In a case where the restricted item terminal device 100-2 has performed authentication of the delivery worker who has input the input key information, the server device 200 receives, from the restricted item terminal device 100-2, information indicating that the unlock instruction for the door 30 of the restricted item 3 has been issued. In addition, the server device 200 transmits the unlock notification indicating that the door 30 has been unlocked to the instructor terminal device 100-1 that has directly or indirectly issued the delivery instruction to the delivery worker.

(E) Person-Under-Restriction Management Device 300

The person-under-restriction management device 300 receives, from the instructor terminal device 100-1, the delivery request from the instructor, and executes processing necessary for causing the delivery worker to deliver the requested package to an address designated by the instructor. The person-under-restriction management device 300 transmits, to the server device 200, the person-under-restriction related information related to the delivery company who operates the person-under-restriction management device 300 and the delivery worker who delivers the package. Further, in a case where the delivery request is received from the instructor terminal device 100-1, the person-under-restriction management device 300 transmits the usage related information included in the delivery request to the server device 200.

5. Information Stored in Memory 213 of Server Device 200

FIG. 5A is a diagram illustrating a person-under-restriction related information table stored in the memory 213 in the server device 200 illustrated in FIG. 1. In the person-under-restriction information table, "person-under-restriction identifier" and "person-under-restriction related information" are stored in association with each other. Here, the person-under-restriction identifier is information unique to each person under restriction, and is information for identifying each person under restriction. In addition, the person-under-restriction related information is information related to each person under restriction, and is information stored in advance or stored by being received from the person-under-restriction management device 300 or the person-under-restriction terminal device 100-3 of the delivery company who manages the delivery worker who is the person under restriction each time processing is executed. Examples of such person-under-restriction related information include information related to the individual delivery worker who is the person under restriction, such as a name, a contact phone number, and an access URL of profile information of the person under restriction, information related to the delivery worker, such as delivery company identification information specifying the delivery company to which the delivery worker who is the person under restriction belongs, and a contact phone number of the delivery company, and information related to the delivery item, such as package identification information specifying the delivery item delivered by the delivery worker who is the person under restriction (typically, an inquiry number of the delivery item or the like), or type information indicating the type of the delivery item. The pieces of person-under-restriction related information including the person-under-restriction identifier, the delivery company identification information, and the package identification information may be transmitted to the server device 200 as the person-under-restriction related information and then appropriately processed by a predetermined method in the server device 200. For example, the server device 200 may have a predetermined conversion table for the delivery company identification information, and may execute processing such as conversion into a code of "0001" in a case where the delivery company identification information of a delivery company A is received, or conversion into a code of "0002" in a case where the delivery company identification information of a delivery company B is received.

FIG. 5B is a diagram illustrating a usage related information table stored in the memory 213 in the server device 200 illustrated in FIG. 1. In the usage related information table, "instructor identifier", "password", "address information", "personal information", "delivery destination information", and "character string information" are stored in association with each other. Here, the instructor identifier is information unique to each instructor and is information for identifying each instructor. In addition, the password, the address information, the personal information, and the delivery destination information are pieces of information related to the individual instructor and are pieces of information used as the usage related information. These pieces of information are stored in advance or stored by being received from the instructor terminal device 100-1 or the person-under-restriction management device 300 each time the delivery request is made. Here, the password is authentication information used for login in a case where the instructor uses a delivery service, and may be information subjected to arbitrary conversion processing such as hashing. The address information is an electronic mail address or the like that can be used by the instructor, and is, for example, authentication information used for login in the case of using the delivery service. The personal information is user identification information in other services available to the instructor. Examples of the personal information include user identification information or the like in an SNS application service. The delivery destination information is information indicating a home address of the instructor (such as an address of the multi-unit residential building or a room number indicating the unit of the instructor), and is information that can be designated as a delivery destination of the package. The character string information is information indicating an arbitrary character string of an arbitrary number of digits selected by receiving the instruction input by the instructor via the input interface 116. Such a character string may be in a text format, a word, a phrase, a symbol, a number, katakana, hiragana, kanji, an alphabet, other characters, or a combination thereof.

Figures 5C, 5D, 6A:
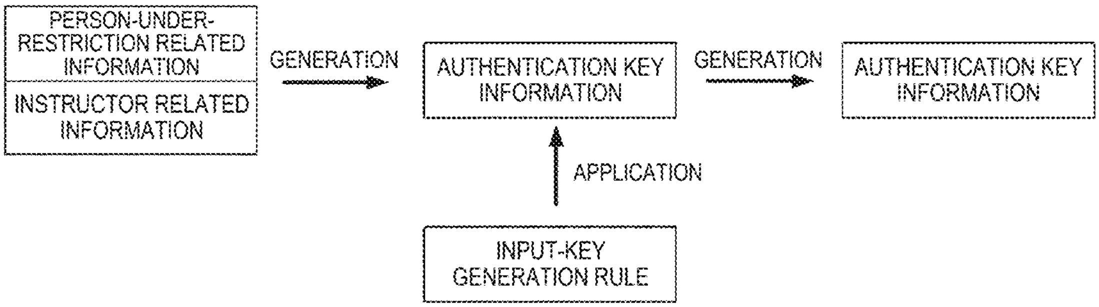
FIG. 5C is a diagram illustrating a service information table stored in the memory 213 in the server device 200 illustrated in FIG. 1.
FIG. 5D is a diagram illustrating a key information table stored in the memory 213 in the server device 200 illustrated in FIG. 1.
FIG. 6A is a diagram conceptually illustrating generation of authentication key information and generation of input key information according to the present disclosure.

FIG. 5C is a diagram illustrating a service information table stored in the memory 213 in the server device 200 illustrated in FIG. 1. In the service information table, "service identifier", "instructor identifier", "person-under-restriction identifier", "restricted item identifier", and "service content information" are stored in association with each other, and these pieces of information are information stored by being received from the instructor terminal device 100-1 or the person-under-restriction management device 300 each time the delivery request is made or at a predetermined cycle. Here, the service identifier is information generated each time the delivery request for the delivery item is received from the instructor, and is information unique to the delivery service provided to the instructor according to the request. The instructor identifier is information for identifying each instructor, and is information for specifying the instructor who has made the delivery request. The person-under-restriction identifier is information for identifying each delivery worker, and is information for specifying the delivery worker in charge of delivery of the delivery item requested by the instructor. The restricted item identifier is information for identifying the delivery item requested by the instructor, and is information unique to each delivery item. Such a restricted item identifier is typically package identification information (for example, the inquiry number) attached to each delivery item to be delivered. The service content information is information indicating a content of the service requested by the instructor and provided by the delivery worker or the delivery company. Examples of such service content information typically include delivery time information (a time zone in which the delivery is desired to be performed and a date and time in which the delivery is desired to be performed) indicating a time at which the delivery item is delivered to a requester (that is, a time at which the service is provided), and information regarding a place at which the delivery is performed (that is, a place at which the service is provided) (information regarding the home address of the instructor, an address designated as the delivery destination, or equipment of the delivery destination). Among these pieces of information, the service identifier, the person-under-restriction identifier, and the restricted item identifier can be used as the person-under-restriction related information. In addition, the instructor identifier and the service content information can be used as the usage related information.

FIG. 5D is a diagram illustrating a key information table stored in the memory 213 in the server device 200 illustrated in FIG. 1. In the key information table, "key identifier", "service identifier", "restricted item identifier", "authentication key information", "input-key generation rule information", and "input key information" are stored in association with each other. Here, the key identifier is generated each time new authentication key information is generated, and is information for identifying each combination of the authentication key information and other information. The service identifier is information generated each time the delivery request for the delivery item is received from the instructor, and is information unique to the delivery service provided to the instructor according to the request. The restricted item identifier is information for identifying the delivery item requested by the instructor, and is information unique to each delivery item. Since at least one of the service identifier or the restricted item identifier is associated with the authentication key information, the authentication key information and the like can be managed for each service to be provided or each delivery item to be delivered. The authentication key information is information indicating an authentication key generated using at least one of the person-under-restriction related information or the usage related information. The input-key generation rule information is information indicating each generation rule assigned to each input-key generation rule (generation logic) prepared in advance. The input key information is information indicating an input key generated by similarly applying the associated input-key generation rule information to the associated authentication key information. Generation of the authentication key information and generation of the input key information are described below.

In FIG. 5D, a case where the authentication key information, the input-key generation rule information, and the input key information are stored in the key information table has been described, but these pieces of information are not always stored, which depends on a device that performs authentication or information transmitted to the restricted item terminal device 100-2 and the person-under-restriction terminal device 100-3.

6. Generation of Authentication Key Information and Input Key Information (A) Outline of Generation of Authentication Key Information and Input Key Information FIG. 6A is a diagram conceptually illustrating the generation of the authentication key information and the generation of the input key information according to the present disclosure. Specifically, FIG. 6A illustrates a process of processing the authentication key information generated by the processor 212 of the server device 200 and the input key information generated by the processor 212 of the server device 200 or the processor 112 of the restricted item terminal device 100-2. Referring to FIG. 6A, the processor 212 of the server device 200 first receives the person-under-restriction related information from the person-under-restriction terminal device 100-3 or the person-under-restriction management device 300 and receives the usage related information from the instructor terminal device 100-1 or the person-under-restriction management device 300 via the communication interface 214. Then, the processor 212 of the server device 200 generates the authentication key information based on the received person-under-restriction related information and usage related information. The processor 212 of the server device 200 stores the generated authentication key information in the key information table.

As an example of the generation of the authentication key information, the person-under-restriction related information and the usage related information described in an arbitrary character string are converted into a numerical value having a predetermined fixed length using a hash function. Next, numerical values obtained by converting the respective pieces of information are added up to obtain the total value of the numerical values. Then, predetermined lower eight digits of the obtained total value are acquired as the authentication key information. The method for generating the authentication key information is merely an example, and it is a matter of course that the present disclosure is not limited to this example.

In addition, various types of person-under-restriction related information and usage related information are used in the generation of the authentication key information, and it is possible to set in advance which information among these pieces of information is to be used and the conversion method for each delivery company. For example, the memory 213 of the server device 200 stores a conversion table in which information to be used for generating the authentication key information and a conversion rule are associated with each piece of delivery company identification information in advance. Then, once the person-under-restriction related information is received, the processor 212 extracts the information to be used for generating the authentication key information and the conversion rule by referring to the conversion table based on the delivery company identification information included in the information. Then, the processor 212 reads necessary information from the person-under-restriction related information and the usage related information based on the extracted information used for generating the authentication key information, and generates the authentication key information according to the extracted conversion rule.

Next, the processor 212 of the server device 200 randomly selects, for example, one piece of input-key generation rule information from a plurality of predefined input-key generation rules. Then, the selected input-key generation rule information is stored in the key information table in association with the generated authentication key information.

Examples of the input-key generation rule include:

- obtaining lower four digits of a value obtained by multiplying an eight-digit numerical value, which is the generated authentication key information, by an eight-digit number indicating a date when the authentication key is generated;
- obtaining lower four digits of a numerical value obtained by adding an eight-digit number indicating a date of birth of the instructor who has requested the delivery; and
- obtaining upper four digits of a value obtained by dividing the generated authentication key information by a predetermined fixed value.

The input-key generation rule is merely an example, and it is a matter of course that the present disclosure is not limited thereto.

Next, the processor 212 of the server device 200 or the processor 112 of the restricted item terminal device 100-2 generates the input key information by applying the selected input-key generation rule information to the generated authentication key information. For example, in a case where the input-key generation rule information of "obtaining lower four digits of the value obtained by multiplying the generated authentication key information by the eight-digit number indicating a date when the authentication key is generated" is selected, the processor 212 of the server device 200 or the processor 112 of the restricted item terminal device 100-2 computes the authentication key information which is the eight-digit numerical value according to the rule, and finally obtains the four-digit numerical value as the input key information. The four-digit numerical value is merely an example of the input key information, and it is a matter of course that the input key information is not limited to this example. For example, the numerical value may be converted into an arbitrary character string or may be converted into a number of digits other than four digits.

As described above, in the present embodiment, since the authentication is not performed based only on the input key information, and the authentication key information is generated and used together, the authentication cannot be performed unless both pieces of key information are obtained, so that security can be further improved.

Figure 6B:
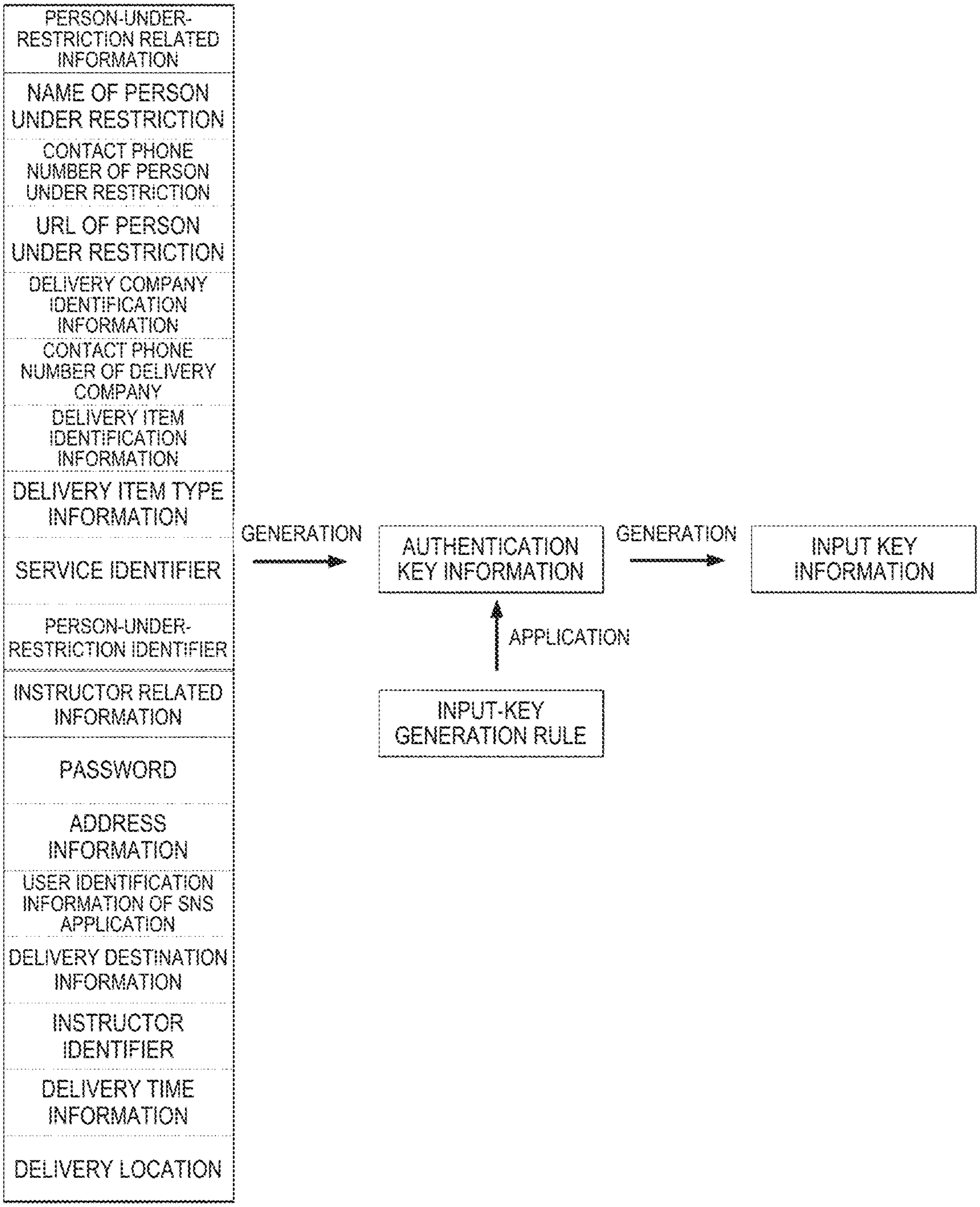
FIG. 6B is a diagram conceptually illustrating a specific example of generation of the authentication key information and generation of the input key information according to the first embodiment.

(B) Specific Example of Generation of Authentication Key Information and Input Key Information FIG. 6B is a diagram conceptually illustrating a specific example of the generation of the authentication key information and the generation of the input key information according to the first embodiment. Specifically, FIG. 6B illustrates a specific process of processing the authentication key information generated by the processor 212 of the server device 200 and the input key information generated by the processor 212 of the server device 200 or the processor 112 of the restricted item terminal device 100-2. The specific example is an example, and the present disclosure is not limited to the processing process.

Referring to FIG. 6B, the processor 212 of the server device 200 first receives the person-under-restriction related information from the person-under-restriction terminal device 100-3 or the person-under-restriction management device 300 and receives the usage related information from the instructor terminal device 100-1 or the person-under-restriction management device 300 via the communication interface 214. Then, the processor 212 of the server device 200 generates the authentication key information based on the received person-under-restriction related information and usage related information. The processor 212 of the server device 200 stores the generated authentication key information in the key information table. Here, examples of the received person-under-restriction related information include the name of the person under restriction, the contact phone number of the person under restriction, the access URL of the profile information of the person under restriction, the delivery company identification information, the contact phone number of the delivery company, the delivery item identification information, the service identifier, and the person-under-restriction identifier. In addition, examples of the usage related information include the password, the address information, the user identification information of the SNS application, the delivery destination information, the instructor identifier, the delivery time information, and the delivery location information. The person-under-restriction related information and the usage related information described herein are merely examples, and other information may be used in combination. In addition, it is not necessary to use all of the pieces of information for generating the authentication key information, and only some pieces of information selected by the processor 212 may be used. Only one of the person-under-restriction related information and the usage related information may be used.

The processor 212 converts each of the received person-under-restriction related information and the received usage related information into a numerical value having a fixed length by using a hash function. Then, the processor 212 adds up the numerical values after conversion, and generates, as the authentication key information, lower eight digits determined in advance in the obtained total value. The processor 212 stores the generated eight-digit numerical value in the key information table as the authentication key information. The method for generating the authentication key information is merely an example, and it is a matter of course that the present embodiment is not limited to this example.

Next, the processor 212 of the server device 200 randomly selects, for example, one piece of input-key generation rule information from a plurality of predefined input-key generation rules. Then, the selected input-key generation rule information is stored in the key information table in association with the generated authentication key information. Next, the processor 212 of the server device 200 or the processor 112 of the restricted item terminal device 100-2 generates the input key information (for example, a four-digit numerical value) by applying the selected input-key generation rule information to the generated authentication key information.

7. Communication Sequence Until Restriction on Usage of Restricted Item 3 is Released In the present embodiment, as described above, a case where when the instructor requests the delivery of the delivery item, the delivery worker of the delivery company who has received the request visits the multi-unit residential building that is the restricted item 3 designated by the instructor, and unlocks the locked door 30 of the entrance of the multi-unit residential building will be described. Six processing patterns are conceivable depending on a difference in information transmitted to the person-under-restriction terminal device 100-3 held by the delivery worker who is the person under restriction whose usage (that is, passage) of the door 30 is limited and a device that performs authentication, and thus, each of the processing patterns will be described below. It is a matter of course that the six processing patterns are examples, and the processing patterns according to the present embodiment are not limited to only the six processing patterns.

(A) A Case where Only the Input Key Information is Transmitted to the Person-Under-Restriction Terminal Device 100-3

(A-1) A Case where Authentication is Performed by Server Device 200 (the Generated Input Key Information is Stored in the Server Device 200)

Figure 7A:
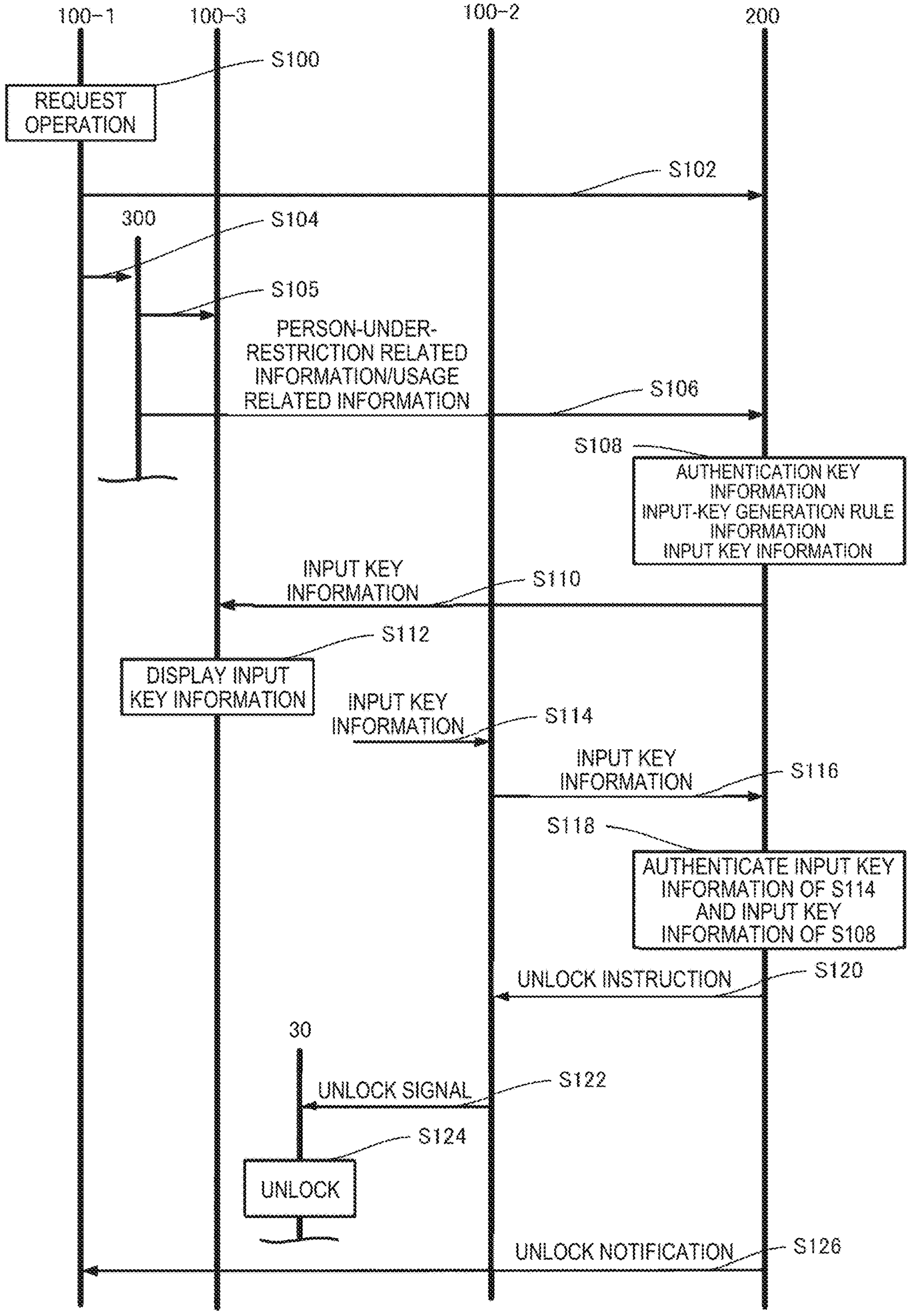
FIG. 7A is a diagram illustrating a communication sequence in the system 1 according to the first embodiment.

FIG. 7A is a diagram illustrating a communication sequence in the system 1 according to the first embodiment. Specifically, FIG. 7A illustrates a processing sequence in a case where the input key information is transmitted to the person-under-restriction terminal device 100-3 and authentication is performed by the server device 200. Referring to FIG. 7A, the processor 112 of the instructor terminal device 100-1 receives an operation input of the instructor via the input interface 116, and receives a delivery request operation for the delivery item (S100).

Figure 7B:
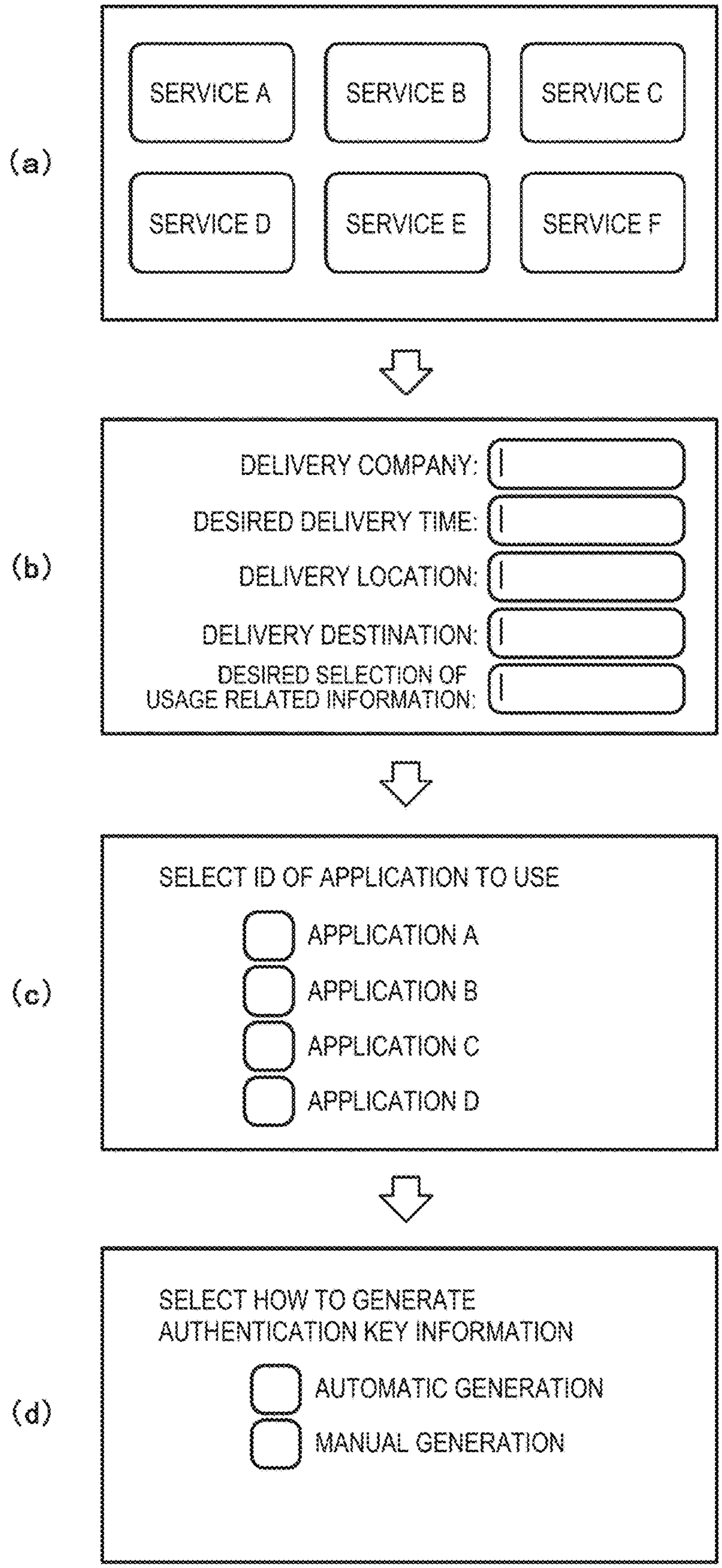
FIG. 7B is a diagram illustrating an example of a screen output in an instructor terminal device 100-1.
Figure 7C:
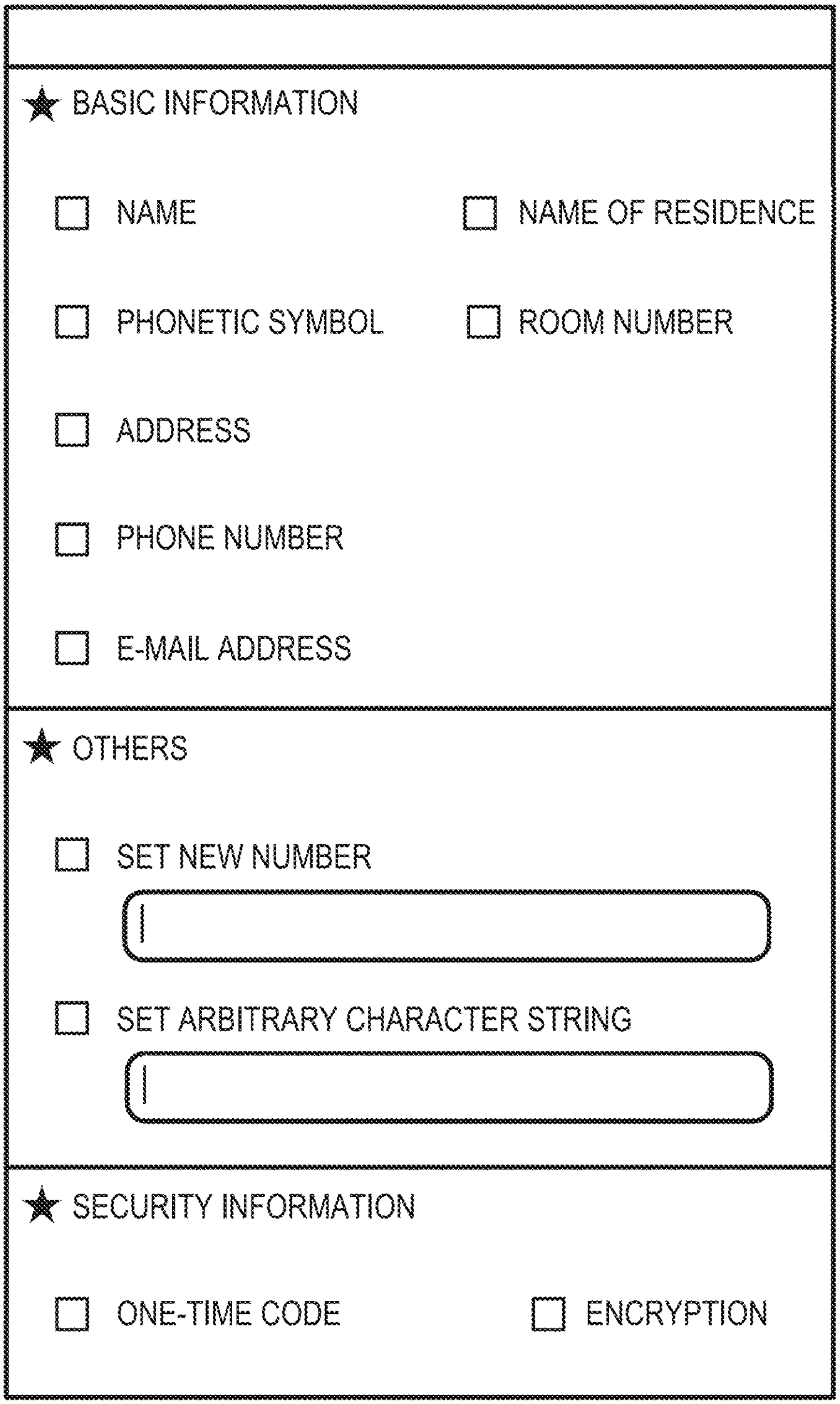
FIG. 7C is a diagram illustrating an example of a screen output in the instructor terminal device 100-1.

Here, FIGS. 7B and 7C are diagrams illustrating examples of screens output in the instructor terminal device 100-1. Specifically, FIG. 7B is a diagram illustrating an example of a service selection screen (a screen for receiving the delivery request operation) output via the output interface 111 of the instructor terminal device 100-1. FIG. 7C is a diagram illustrating an example of a usage related information selection screen when the delivery service is requested.

Referring to FIG. 7B, the processor 112 of the instructor terminal device 100-1 displays the service selection screen on the display via the output interface 111. Here, as illustrated in (a) of FIG. 7B, a plurality of icons (services A to F) corresponding to a plurality of available services are displayed on the screen. When the instructor makes a predetermined operation input (for example, tap operation) on an icon corresponding to a desired service, the input interface 116 of the instructor terminal device 100-1 detects the operation input, and the processor 112 determines that the icon corresponding to the desired service has been selected. Here, for the services A to F displayed as the icons, it is preferable that information regarding the instructor such as each instructor identifier is provided in advance from each business operator that provides each service to the server device 200. Next, the processor 112 displays a service request content selection screen corresponding to the selected service on the display via the output interface 111. Here, as illustrated in (b) of FIG. 7B, an item for selecting a service request content and an input box corresponding to the item are displayed on the screen. The input interface 116 of the instructor terminal device 100-1 detects an operation input (for example, character input operation) of the instructor on each input box, and the processor 112 stores the desired service request content in the memory 113 as the usage related information. Next, the processor 112 displays a selection screen for the user identification information of the application desired to be used as the usage related information via the output interface 111 based on a confirmation operation of confirming a request content input to each input box. Here, as illustrated in (c) of FIG. 7B, a list of available applications and selection boxes provided corresponding to the respective applications are displayed on the screen. The input interface 116 of the instructor terminal device 100-1 detects an operation input (for example, tap operation) of the instructor on the selection box, and the processor 112 reads the user identification information of the application for which the operation input has been made on the selection box. Then, the read user identification information is stored in the memory 113 as the usage related information.

Next, the processor 112 displays a selection screen for the method for generating the authentication key information on the display via the output interface 111. Here, as illustrated in (d) of FIG. 7B, a selection box for selecting automatic generation or manual generation as the method for generating the authentication key information is displayed. The input interface 116 of the instructor terminal device 100-1 detects an operation input (for example, tap operation) of the instructor on the selection box, and the processor 112 advances the processing by the method for which the operation input has been made on the selection box. Specifically, in a case where the automatic generation is selected, the processor 112 transmits the request contents input as in (a) to (c) of FIG. 7B and the instructor identifier to the server device 200 and the person-under-restriction management device 300. In a case where the manual generation is selected, the processor 112 displays a selection screen for information desired to be used as the usage related information illustrated in FIG. 7C. The order of the steps of processing executed in (c) and (d) of FIG. 7B may be reversed.

Referring to FIG. 7C, in a case where the manual generation is selected in (d) of FIG. 7B, the processor 112 displays the selection screen for the information desired to be used as the usage related information via the output interface 111. Here, as illustrated in FIG. 7C, information associated with the individual instructor, such as a name, an address, a phone number, or an e-mail address of the instructor, a name of the multi-unit residential building, and a unit number, and a selection box for selecting each piece of information are displayed as the usage related information. The input interface 116 of the instructor terminal device 100-1 detects an operation input (for example, tap operation) of the instructor on the selection box, and selects information desired to be used by the processor 112 as the usage related information. Then, the processor 112 stores the selected information in the memory 113 as the usage related information.

Here, it is also possible to newly select an arbitrary character string having an arbitrary number of digits and use the character string as the usage related information associated with the instructor, in addition to selecting the usage related information from pieces of predetermined information. Such a character string may be in a text format, a word, a phrase, a symbol, a number, katakana, hiragana, kanji, an alphabet, other characters, or a combination thereof. Furthermore, in addition to the authentication of the authentication key information and the input key information, usage of a temporarily available one-time code and encryption processing may be selectable by the instructor. In this manner, as a one-time code or an arbitrary character string can be used as the usage related information used for generating the authentication key information, the security can be further improved.

The service content and the usage related information selected in FIGS. 7B and 7C are transmitted to the person-under-restriction management device 300 or the server device 200 via the communication interface 114 under the control of the processor 112.

Referring back to FIG. 7A, when the delivery request operation is performed through the service selection screen illustrated in FIG. 7B, the processor 112 of the instructor terminal device 100-1 transmits the request content including the usage related information to the server device 200 (S102), and transmits the request content to the person-under-restriction management device 300 (S104). In a case where "automatic generation" is selected on the screen illustrated in (d) of FIG. 7B, the server device 200 uses the usage related information necessary for generating the authentication key information for generation of the authentication key information in S108 described below by reading, from the memory 213, information associated with the individual instructor, such as the name, the address, the phone number, or the e-mail address of the instructor, the name of the multi-unit residential building, and the unit number associated in advance with the received instructor identifier. In this case, the user can register the information in the server device 200 together with application for usage as the instructor for the service provided by the system 1. In the present embodiment, the instructor terminal device 100-1, the person-under-restriction management device 300, and the server device 200 can cooperate with each other by executing an application or the like in a state where information necessary for processing can be transmitted and received among the instructor terminal device 100-1, the person-under-restriction management device 300, and the server device 200. Therefore, the processor 112 of the instructor terminal device 100-1 transmits the request content including the usage related information to the server device 200 in S102, and transmits the request content to the person-under-restriction management device 300 in S104. However, the present embodiment can be similarly applied even to a case where the information cannot be directly transmitted and received between the instructor terminal device 100-1 and the person-under-restriction management device 300, that is, a case where cooperation cannot be made due to an application or the like to be used. In this case, in S104, the person-under-restriction management device 300 receives the request content from the server device 200 that has received the request content including the usage related information in S102.

Once the request content is received from the instructor terminal device 100-1, the processor of the person-under-restriction management device 300 selects the delivery worker who is the person under restriction according to the request content, and transmits the delivery notification to the person-under-restriction terminal device 100-3 held by the delivery worker (S105). The delivery notification includes the delivery time information, the delivery location information, the delivery item identification information, and the like in addition to information such as the instructor identifier for specifying the instructor of the delivery destination and the name of the instructor. Meanwhile, the processor of the person-under-restriction management device 300 generates the usage related information and the person-under-restriction related information based on the received request content, the person-under-restriction identifier for identifying the selected delivery worker who is the person under restriction, and the like, and transmits the usage related information and the person-under-restriction related information to the server device 200 via the communication interface in association with the service identifier (S106).

The processor 212 of the server device 200 stores the received usage related information, person-under-restriction related information, and request content in the person-under-restriction information table illustrated in FIG. 5A, the usage related information table illustrated in FIG. 5B, and the service information table illustrated in FIG. 5C, respectively, in association with the service identifier. Then, the processor 212 of the server device 200 reads at least one of the stored person-under-restriction related information or the stored usage related information, and generates the authentication key information from the read information (S108). Such specific generation processing is as described in the items 6(A) and 6(B) above. The processor 212 of the server device 200 stores the generated authentication key information in the key information table illustrated in FIG. 5D in association with the service identifier. The processor 212 of the server device 200 selects one piece of input-key generation rule information from among the plurality of pieces of input-key generation rule information, and stores the input-key generation rule information in the key information table in association with the authentication key information. Next, the processor 212 of the server device 200 generates the input key information by applying the generated authentication key information to the selected input-key generation rule information. Such specific generation processing is as described in the items 6(A) and 6(B) above. The processor 212 of the server device 200 stores the generated input key information in the key information table in association with the authentication key information. As a result, a combination of the authentication key information and the input key information is completed. Then, the processor 212 of the server device 200 transmits the input key information among the generated authentication key information and input key information together with the service identifier to the person-under-restriction terminal device 100-3 held by the delivery worker who is the person under restriction via the communication interface 214 (S110).

The input key information may be transmitted to the person-under-restriction terminal device 100-3 via the person-under-restriction management device 300. Although not specifically described, for example, the input key information and the input-key generation rule information need to be associated with each delivery item delivered by each delivery worker or each service provided by the delivery worker. Therefore, these pieces of information are transmitted and received together with the service identifier or the restricted item identifier stored in the service information table of FIG. 5C.

The processor 112 of the person-under-restriction terminal device 100-3 that has received the input key information stores the received input key information in the memory 113 in association with the service identifier. Thereafter, the delivery worker who is the person under restriction holds the person-under-restriction terminal device 100-3 and visits the door 30 (the restricted item 3) of the entrance of the designated multi-unit residential building based on the delivery time information and the delivery location information designated by the delivery notification received from the person-under-restriction management device 300. It is a matter of course that, at this point of time, the door 30 of the entrance, which is the restricted item 3, remains locked, and the delivery worker, who is the person under restriction, cannot pass. Therefore, the person-under-restriction terminal device 100-3 receives the operation input of the delivery worker via the input interface 116, and outputs the input key information received in advance to the display via the output interface 111 (S112). Then, the delivery worker inputs the input key information to the restricted item terminal device 100-2 that is the restricted item 3 with reference to the output input key information.

The processor 112 of the restricted item terminal device 100-2 receives the operation input of the input key information performed with the numeric keypad via the input interface 116, and stores the received input key information in the memory 113 (S114). Then, the processor 112 of the restricted item terminal device 100-2 transmits the input key information to the server device 200 via the communication interface 114 (S116).

Once the input key information is received, the processor 212 of the server device 200 compares the received input key information with the input key information stored in the key information table in the processing of S108. When any one piece of input key information stored in the key information table matches the received input key information, the processor 212 of the server device 200 authenticates the received input key information (S118).

When the input key information is authenticated, the processor 212 of the server device 200 transmits, to the restricted item terminal device 100-2 that has transmitted the input key information, information indicating that the authentication has succeeded and the unlock instruction for the door 30 of the restricted item 3 via the communication interface 114 (S120). In a case where the input key information that is input does not match the input key information stored in the key information table, the authentication fails. In such a case, the processor 212 of the server device 200 transmits information indicating that the authentication has failed to the restricted item terminal device 100-2 to notify the delivery worker of the information indicating the failure via the restricted item terminal device 100-2.

Once the unlock instruction is received, the processor 112 of the restricted item terminal device 100-2 transmits the unlock signal for permitting unlocking of the door 30 of the restricted item 3 according to the received unlock instruction (S122). Once the unlock signal is received, the door 30 whose opening and closing has been restricted is unlocked, and processing of driving the motor to open the door 30 is executed (S124). As a result, the delivery worker who is the person under restriction whose passage through the door 30 that is the restricted item 3 has been restricted can pass through the door 30. The processor 112 of the restricted item terminal device 100-2 may be able to store, in the memory 113, a log indicating that the door 30 has been unlocked in S124. Further, the processor 112 of the restricted item terminal device 100-2 may transmit the log to the server device 200, and the server device 200 may store the log indicating that the door 30 has been unlocked in the memory 213, and may manage the log by the processor 212.

Following the transmission of the unlock instruction, the processor 212 of the server device 200 transmits the unlock notification indicating that the door 30 has been unlocked to the instructor terminal device 100-1 that has requested the delivery, based on the service identifier associated with the authenticated input key information (S126). As a result, the instructor can know that the restriction of the door 30 has been released. The unlock notification in S126 may be transmitted to the instructor terminal device 100-1 in response to the unlock instruction in S120.

Figure 7D:
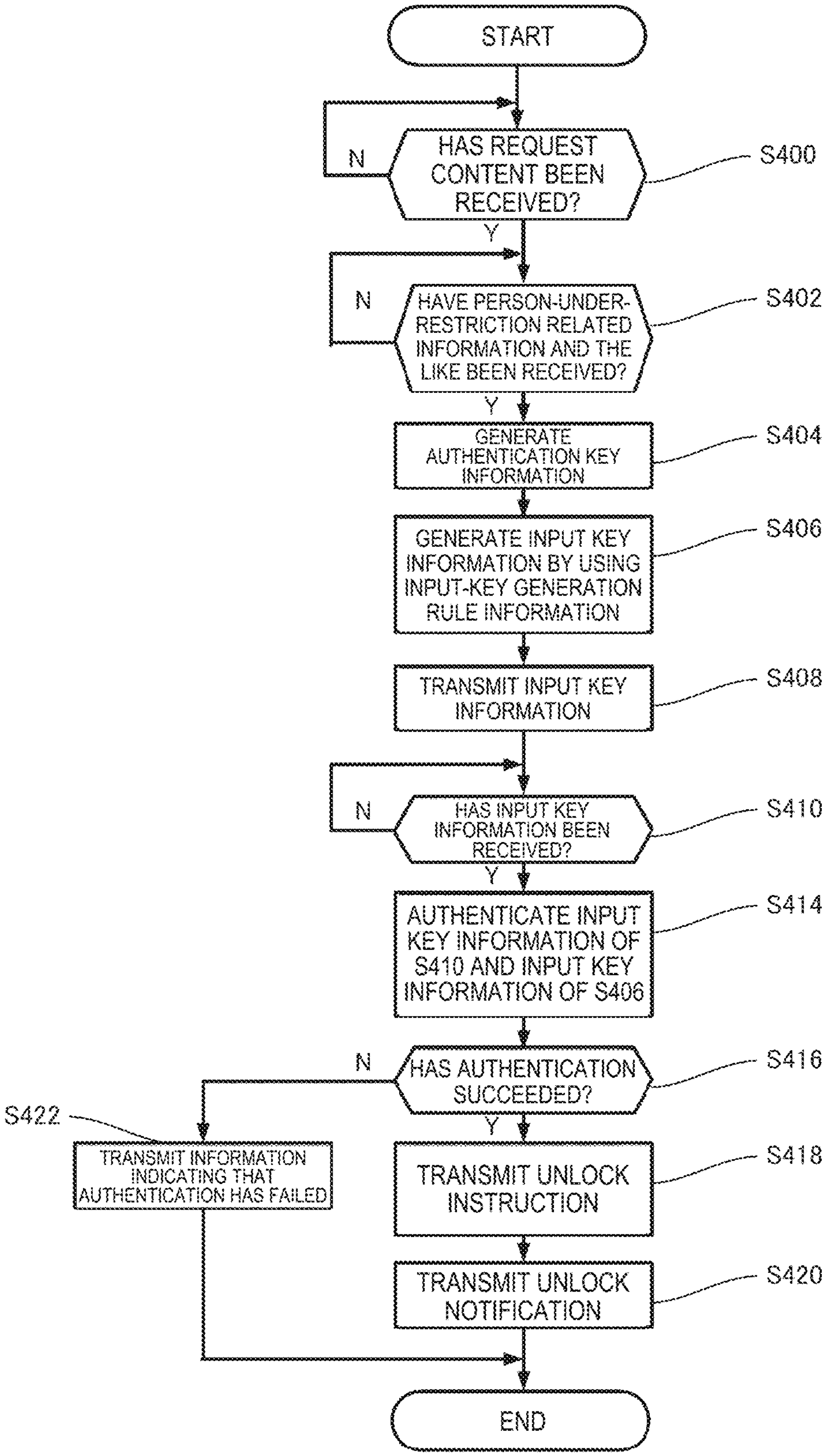
FIG. 7D is a flowchart illustrating processing executed in a processor 212 of the server device 200 according to the first embodiment.

FIG. 7D is a flowchart illustrating processing executed in the processor 212 of the server device 200 according to the first embodiment. Specifically, FIG. 7D is a diagram illustrating a processing flow executed by the processor 212 of the server device 200 reading and executing the program stored in the memory 213 in a processing sequence in a case where the input key information is transmitted to the person-under-restriction terminal device 100-3 and the authentication is performed by the server device 200 as illustrated in FIG. 7A.

Referring to FIG. 7D, the processor 212 determines whether or not the request content including the usage related information has been received from the instructor terminal device 100-1 via the communication interface 214 (S400). In a case where the request content has been received, the processor 212 proceeds to the processing of S402, and in a case where the request content has not been received, the processor 212 remains in the processing of S400.

Next, the processor 212 determines whether or not the person-under-restriction related information, the usage related information, and the request content have been received together with the service identifier from the person-under-restriction management device 300 via the communication interface 214 (S402). In a case where the person-under-restriction related information and the usage related information have been received, the processor 212 stores the received person-under-restriction related information, usage related information, and request content in the person-under-restriction information table, the instructor information table, and the service information table, respectively, in association with the service identifier, and proceeds to the processing of S404. On the other hand, in a case where the person-under-restriction related information, the usage related information, and the request content have not been received, the processor 212 remains in the processing of S402.

The processor 212 generates the authentication key information by reading the person-under-restriction related information and the usage related information received in the processing of S402 from the tables (S404) Such specific generation processing is as described in the items 6(A) and 6(B) above. The processor 212 stores the generated authentication key information in the key information table in association with the service identifier.

The processor 212 randomly selects the input-key generation rule information of a position from among the plurality of pieces of input-key generation rule information, and stores the selected input key generation information in association with the authentication key information generated in the key information table. Then, the processor 212 generates the input key information from the generated authentication key information by using the selected input-key generation rule information (S406). Such specific generation processing is as described in the items 6(A) and 6(B) above. The processor 212 stores the generated input key information in the key information table in association with the previously generated authentication key information.

The processor 212 transmits the generated input key information to the person-under-restriction terminal device 100-3 held by the delivery worker who is the person under restriction specified by the service identifier via the communication interface 214 (S408).

The processor 212 determines whether or not the input key information input to the restricted item terminal device 100-2 by the delivery worker has been received from the restricted item terminal device 100-2 via the communication interface 214 (S410). In a case where the input key information has been received, the processor 212 proceeds to the processing of S414, and in a case where the input key information has not been received, the processor 212 remains in the processing of S410.

Once the input key information is received, the processor 212 compares the received input key information with the input key information in the key information table storing the input key information generated in the processing of S406 (S414) The processor 212 determines that the authentication has succeeded in a case where any one piece of input key information matches the received input key information as a result of the comparison, and the processor 212 determines that the authentication has failed in a case where no input key information matches the received input key information (S416) Then, the processor 212 proceeds to the processing of S418 in a case where the authentication has succeeded, and proceeds to the processing of S422 in a case where the authentication has failed.

The processor 212 transmits, to the restricted item terminal device 100-2 via the communication interface 214, information indicating that the authentication has succeeded and the unlock instruction for the door 30 of the restricted item 3 (S418). In addition, the processor 212 transmits, via the communication interface 214, the unlock notification indicating that the door 30 has been unlocked to the instructor terminal device 100-1 of the instructor who has requested the delivery, based on the service identifier associated with the input key information (S420).

On the other hand, in a case where the authentication in S414 has failed, the processor 212 transmits information indicating that the authentication has failed to the restricted item terminal device 100-2 (S422). In this way, the processing flow ends.

As described above, in the example of the processing illustrated in FIGS. 7A and 7D, various types of information can be used in the generation of the input key information used for authentication, and the restricted item can be flexibly managed. In addition, since only the input key information needs to be transmitted to the person-under-restriction terminal device 100-3, a processing load in communication can also be reduced.

(A-2) A Case where Authentication is Performed by the Restricted Item Terminal Device 100-2 (the Input Key Information is Transmitted to the Restricted Item Terminal Device 100-2 in Advance)

Figure 8A:
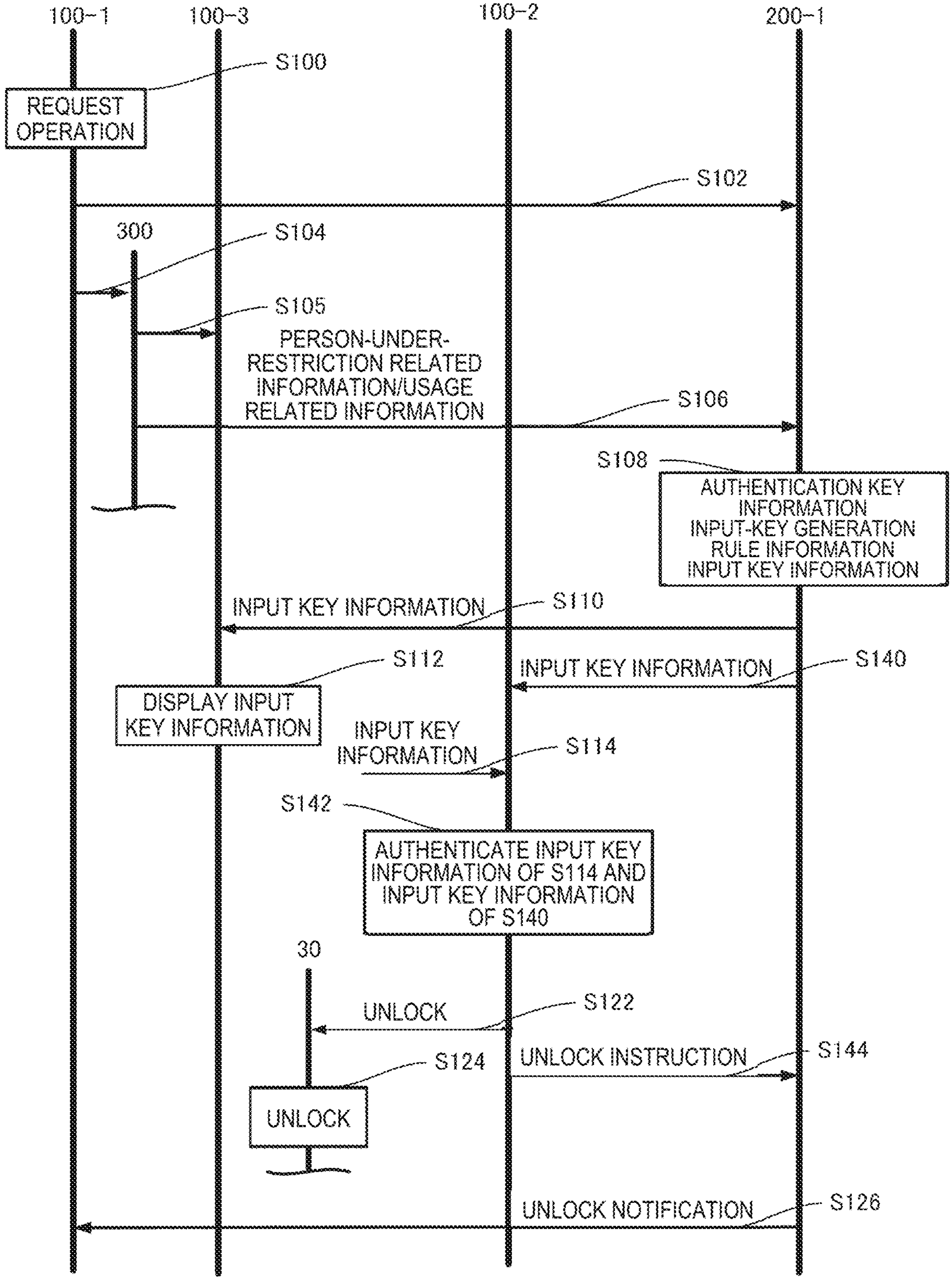
FIG. 8A is a diagram illustrating a communication sequence in the system 1 according to the first embodiment.

FIG. 8A is a diagram illustrating a communication sequence in the system 1 according to the first embodiment. Specifically, FIG. 8A illustrates a processing sequence in a case where the input key information is transmitted to the person-under-restriction terminal device 100-3 and authentication is performed by the restricted item terminal device 100-2. Referring to FIG. 8A, in the system 1, the processing is the same as the processing of S100 to S110 illustrated in FIG. 7A, and thus, a description of the processing is omitted.

The processor 212 of the server device 200 transmits the input key information generated in the processing of S108 together with the service identifier to the restricted item terminal device 100-2 via the communication interface 214 (S140).

Next, the person-under-restriction terminal device 100-3 receives the operation input of the delivery worker via the input interface 116, and outputs the input key information received in advance to the display via the output interface 111 (S112). Then, the delivery worker inputs the input key information to the restricted item terminal device 100-2 that is the restricted item 3 with reference to the output input key information.

The processor 112 of the restricted item terminal device 100-2 receives the operation input of the input key information performed with the numeric keypad via the input interface 116, and stores the received input key information in the memory 113 (S114). Once the input key information is input, the processor 112 of the restricted item terminal device 100-2 compares the input key information with the input key information received in S140. In a case where both pieces of input key information match each other, the processor 112 of the restricted item terminal device 100-2 authenticates the received input key information (S142).

In a case where the input key information is authenticated, the processor 112 of the restricted item terminal device 100-2 transmits the unlock signal for permitting unlocking of the door 30 of the restricted item 3 (S122). Once the unlock signal is received, the door 30 whose opening and closing has been restricted is unlocked, and processing of driving the motor to open the door 30 is executed (S124). As a result, the delivery worker who is the person under restriction whose passage through the door 30 that is the restricted item 3 has been restricted can pass through the door 30.

In addition, the processor 112 of the restricted item terminal device 100-2 transmits, to the server device 200 via the communication interface 114, information indicating that the unlock instruction for the door 30 of the restricted item 3 has been issued, together with the service identifier (S144). Then, the processor 212 of the server device 200 that has received the information executes the processing of S126 illustrated in FIG. 7A.

Figure 8B:
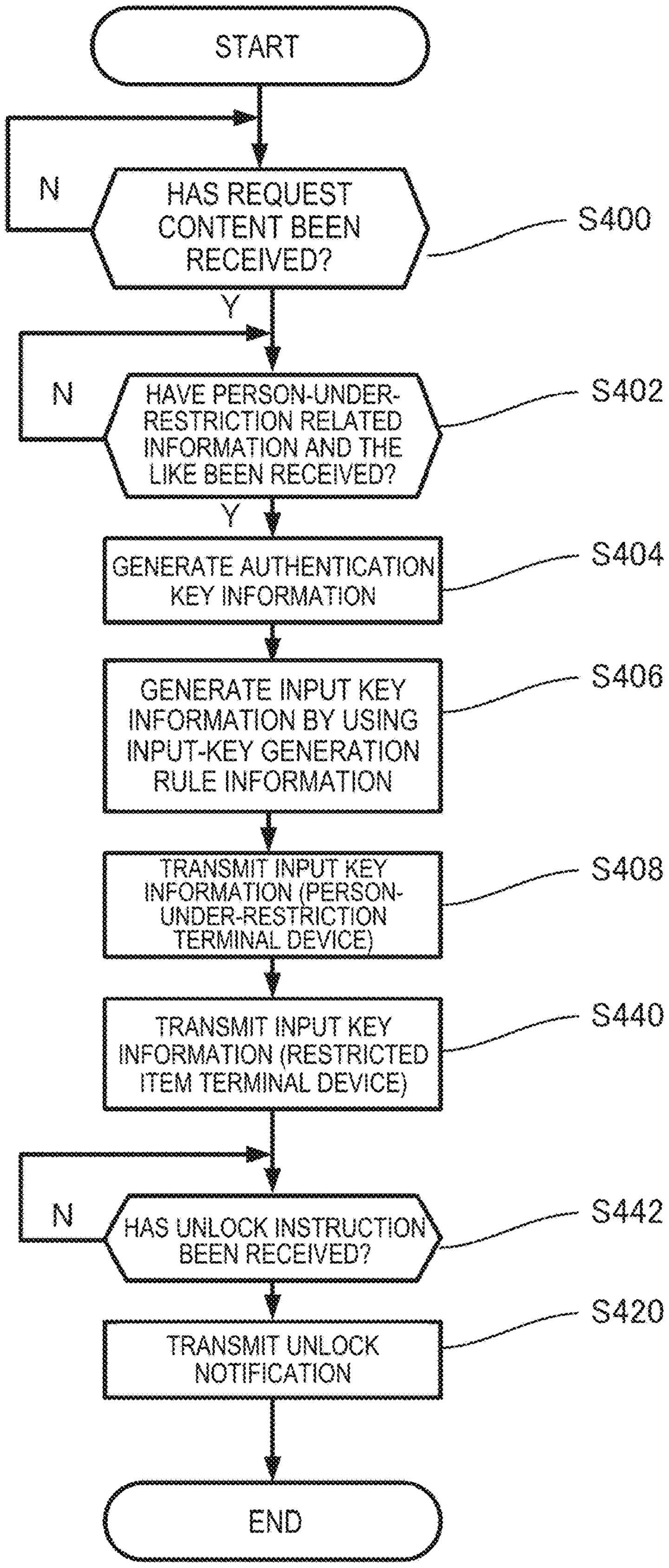
FIG. 8B is a flowchart illustrating processing executed in the processor 212 of the server device 200 according to the first embodiment.

FIG. 8B is a flowchart illustrating processing executed in the processor 212 of the server device 200 according to the first embodiment. Specifically, FIG. 8B is a diagram illustrating a processing flow executed by the processor 212 of the server device 200 reading and executing the program stored in the memory 213 in a processing sequence in a case where the input key information is transmitted to the person-under-restriction terminal device 100-3 and the authentication is performed by the restricted item terminal device 100-2 as illustrated in FIG. 8A.

Referring to FIG. 8B, first, the processor 212 executes the processing of S400 to S408 illustrated in FIG. 7D. Next, the processor 212 transmits the input key information generated in the processing of S406 to the restricted item terminal device 100-2 via the communication interface 214.

The processor 212 determines whether or not information indicating that the unlock instruction has been issued from the restricted item terminal device 100-2 via the communication interface 214 within a predetermined period (S442). In a case where the unlock notification information has been received within the predetermined period, the processor 212 transmits, to the instructor terminal device 100-1, the unlock notification indicating that the locked door 30 has been unlocked, similarly to S420 illustrated in FIG. 7D (S420). By doing so, the processing flow ends.

As described above, in the example of the processing illustrated in FIGS. 8A and 8B, various types of information can be used in the generation of the input key information used for authentication, and the restricted item can be flexibly managed. In addition, since the authentication is performed by the restricted item terminal device 100-2 that has received the input key information generated in advance, it is not necessary for the server device 200 to always hold the input key information used for the authentication, so that more flexible management can be performed.

(A-3) A Case where Authentication is Performed by the Restricted Item Terminal Device 100-2 (the Authentication Key Information and the Input-Key Generation Rule Information are Transmitted to the Restricted Item Terminal Device 100-2 in Advance)

Figure 9A:
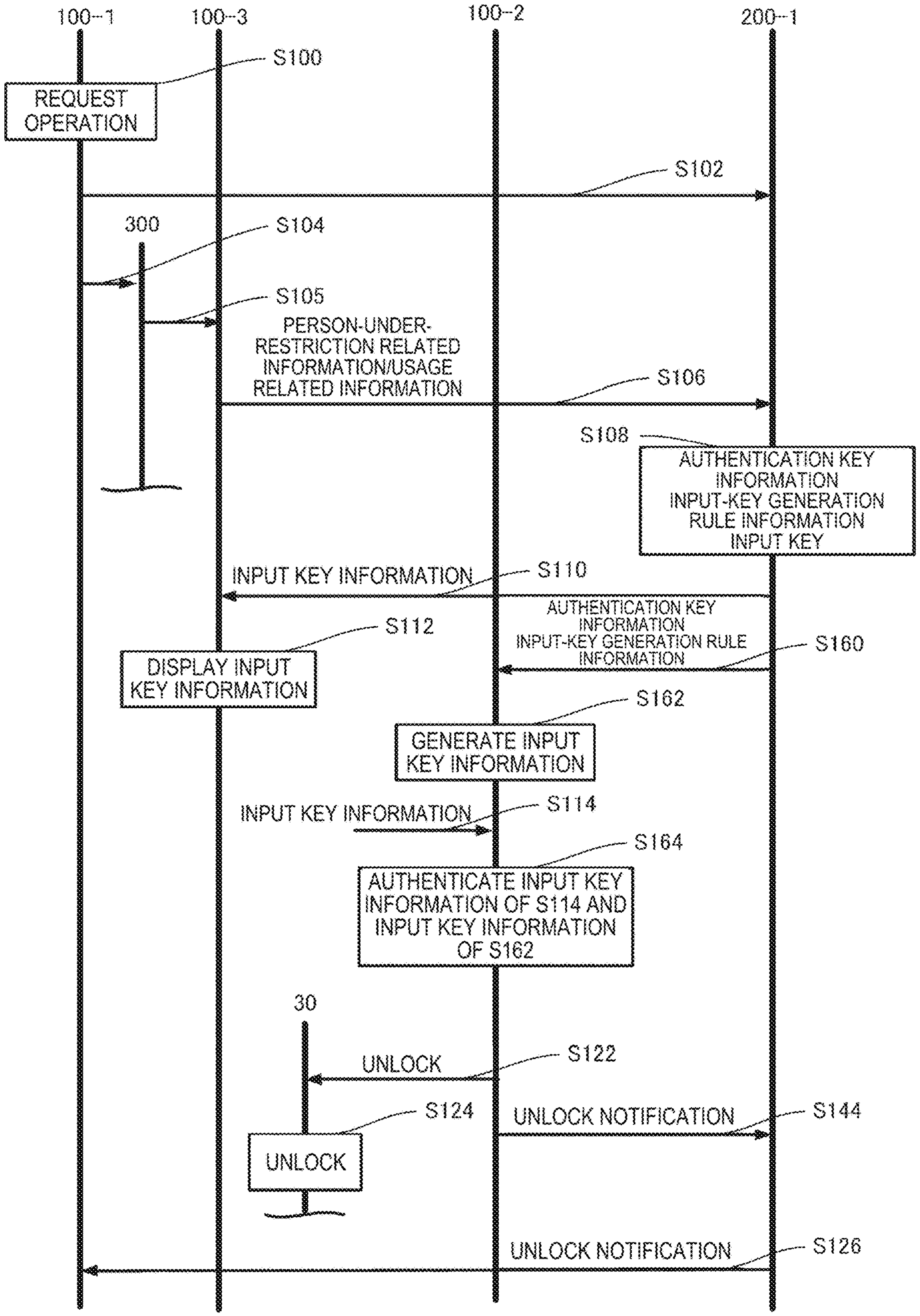
FIG. 9A is a diagram illustrating a communication sequence in the system 1 according to the first embodiment.

FIG. 9A is a diagram illustrating a communication sequence in the system 1 according to the first embodiment. Specifically, FIG. 9A illustrates a processing sequence in a case where the input key information is transmitted to the person-under-restriction terminal device 100-3 and authentication is performed by the restricted item terminal device 100-2. However, the example of FIG. 9A is different from the example of the processing of FIG. 8A in that the input key information is transmitted to the restricted item terminal device 100-2 in the example of FIG. 8A, whereas the authentication key information and the input-key generation rule information are transmitted to the restricted item terminal device 100-2 in the example of FIG. 9A. That is, referring to FIG. 9A, in the system 1, the processing is the same as the processing of S100 to S110 of FIG. 8A, and thus, a description of the processing is omitted.

The processor 212 of the server device 200 transmits, to the restricted item terminal device 100-2 via the communication interface 214, the authentication key information generated in the processing of S108 and the input-key generation rule information in association with the service identifier (S160).

Next, the person-under-restriction terminal device 100-3 receives the operation input of the delivery worker via the input interface 116, and outputs the input key information received in advance to the display via the output interface 111 (S112). Then, the delivery worker inputs the input key information to the restricted item terminal device 100-2 that is the restricted item 3 with reference to the output input key information.

Once the authentication key information and the input-key generation rule information are received from the server device 200, the processor 112 of the restricted item terminal device 100-2 generates the input key information by applying the received input-key generation rule information to the received authentication key information (S162). Next, the processor 112 of the restricted item terminal device 100-2 receives the operation input of the input key information performed with the numeric keypad via the input interface 116, and stores the received input key information in the memory 113 (S114). Once the input key information is input, the processor 112 of the restricted item terminal device 100-2 compares the input key information with the input key information generated in S162. In a case where both pieces of input key information match each other, the processor 112 of the restricted item terminal device 100-2 authenticates the received input key information (S164). The generation of the input key information in S162 may be performed based on the received authentication key information and input-key generation rule information in response to the unlock instruction based on the input key information in S114.

Since the subsequent processing is the same as the processing of S144 and S126 in FIG. 8A, a description of the processing is omitted.

Figure 9B:
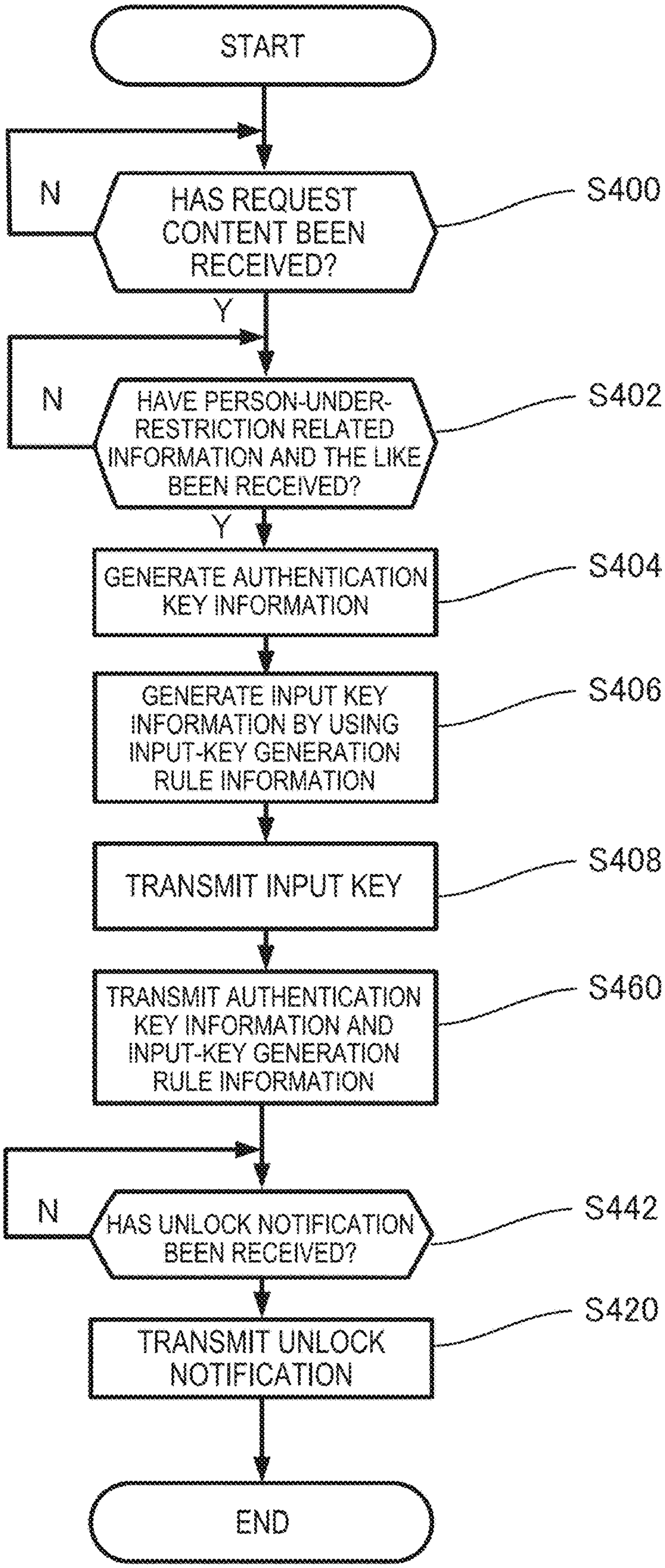
FIG. 9B is a flowchart illustrating processing executed in the processor 212 of the server device 200 according to the first embodiment.

FIG. 9B is a flowchart illustrating processing executed in the processor 212 of the server device 200 according to the first embodiment. Specifically, FIG. 9B is a diagram illustrating a processing flow executed by the processor 212 of the server device 200 reading and executing the program stored in the memory 213 in a processing sequence in a case where the authentication key information and the input-key generation rule information are transmitted to the person-under-restriction terminal device 100-3 and the authentication is performed by the restricted item terminal device 100-2 as illustrated in FIG. 9A.

Referring to FIG. 9B, first, the processor 212 executes the processing of S400 to S408 illustrated in FIG. 8B. Next, the processor 212 transmits the authentication key information generated in the processing of S404 and the input-key generation rule information selected in the processing of S406 to the restricted item terminal device 100-2 via the communication interface 214.

Since the subsequent processing is the same as the processing of S442 and S420 in FIG. 8B, a description of the processing is omitted. By doing so, the processing flow ends.

As described above, in the example of the processing illustrated in FIGS. 9A and 9B, various types of information can be used in the generation of the input key information used for authentication, and the restricted item can be flexibly managed. In addition, since the restricted item terminal device 100-2 that has received the authentication key information and the input-key generation rule information generated in advance generates the input key information and then performs the authentication, it is not necessary for the server device 200 to always hold the authentication key information, the input-key generation rule information, and the input key information used for authentication, so that more flexible management can be performed.

(A-4) A Case where Authentication is Performed by the Server Device 200 (a Case where it is not Necessary to Always Store the Generated Input Key Information in the Server Device 200)

Figure 10A:
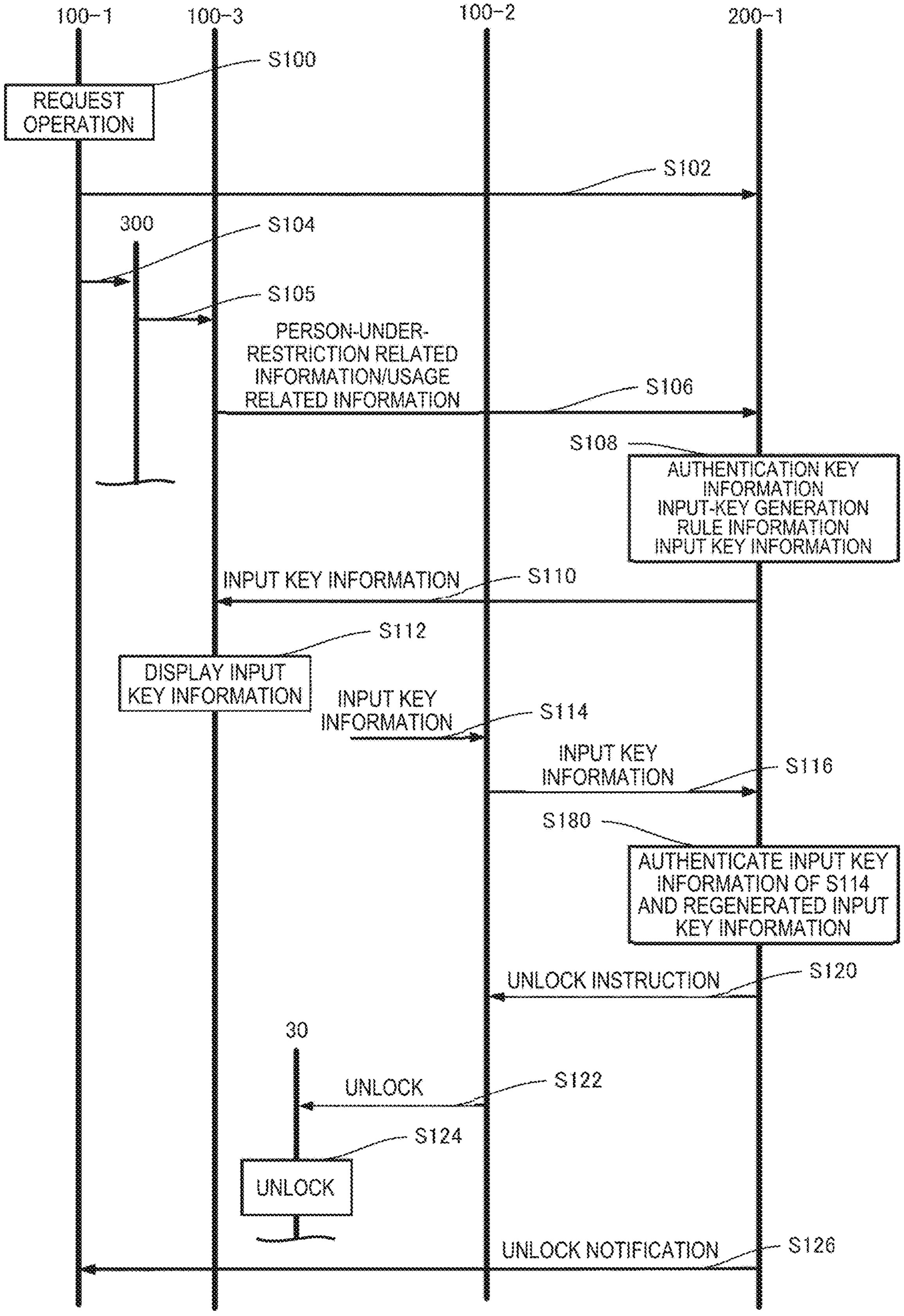
FIG. 10A is a diagram illustrating a communication sequence in the system 1 according to the first embodiment.

FIG. 10A is a diagram illustrating a communication sequence in the system 1 according to the first embodiment. Specifically, FIG. 10A illustrates a processing sequence in a case where the input key information is transmitted to the person-under-restriction terminal device 100-3 and authentication is performed by the server device 200. However, the example of FIG. 10A is different from the example of the processing of FIG. 7A in that when the input key information is once generated in the server device 200, the input key information is continuously stored and used for authentication as it is in the example of FIG. 7A, whereas the input key information is once generated in the server device 200 and then deleted, and is regenerated before authentication and used for authentication in the example of FIG. 10A. That is, referring to FIG. 10A, in the system 1, the processing is the same as the processing of S100 to S116 of FIG. 7A, and thus, a description of the processing is omitted.

Once the input key information input to the restricted item terminal device 100-2 is received from the restricted item terminal device 100-2 in the processing of S116, the processor 212 of the server device 200 reads the authentication key information and the input-key generation rule information stored in the key information table, and regenerates the input key information. Then, once the input key information is regenerated, the processor 212 of the server device 200 compares the received input key information with the regenerated input key information. In a case where both pieces of input key information match each other, the processor 212 of the server device 200 authenticates the received input key information (S180). The service identifier is required to receive the input key information and read the authentication key information and the like. Therefore, the service identifier may be simultaneously input to the restricted item terminal device 100-2 and transmitted together with the input key information, or the service identifier may be transmitted from the person-under-restriction terminal device 100-3 in advance.

Since the subsequent processing is the same as the processing of S120 to S126 in FIG. 7A, a description of the processing is omitted.

Figure 10B:
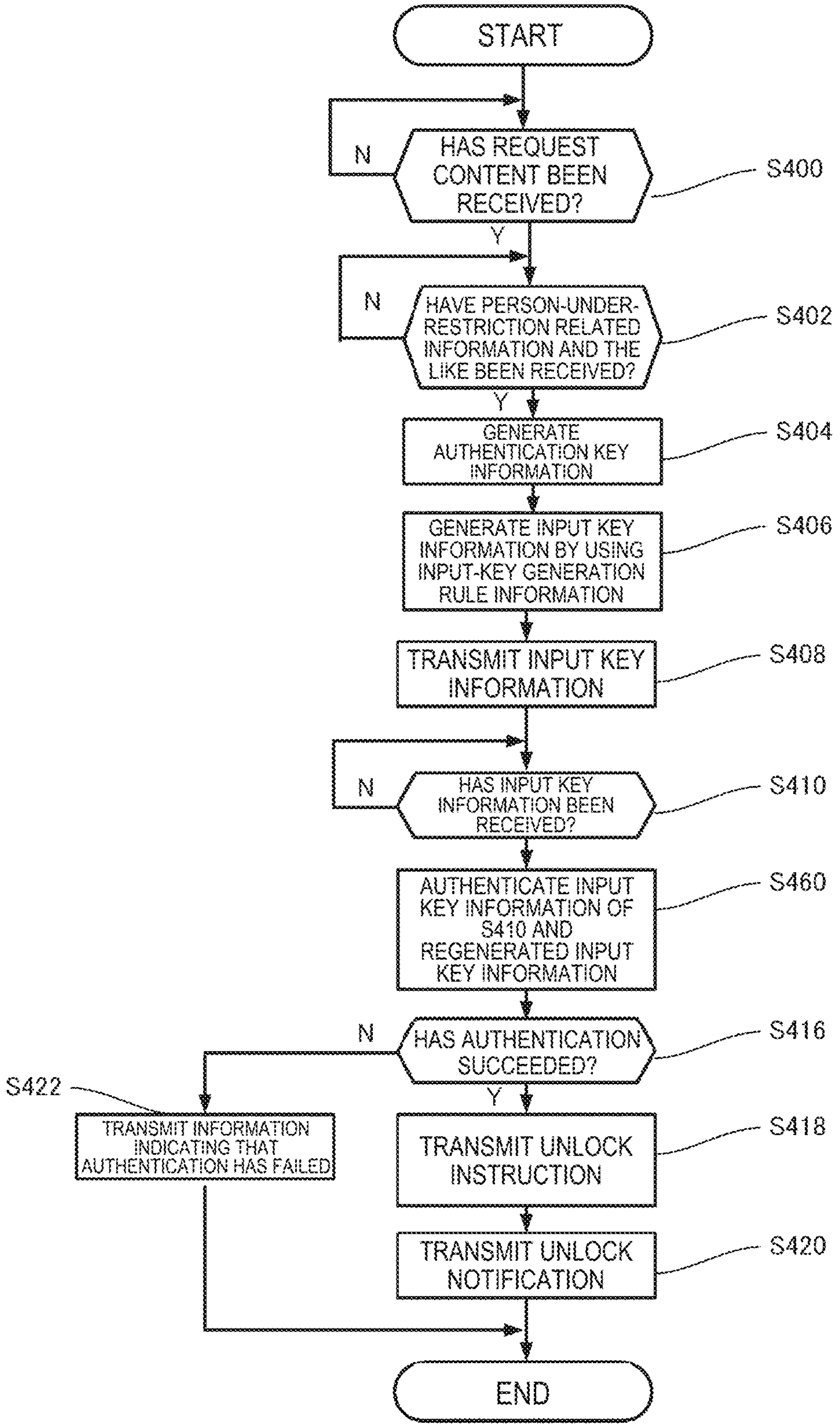
FIG. 10B is a flowchart illustrating processing executed in the processor 212 of the server device 200 according to the first embodiment.

FIG. 10B is a flowchart illustrating processing executed in the processor 212 of the server device 200 according to the first embodiment. Specifically, FIG. 10B is a diagram illustrating a processing flow executed by the processor 212 of the server device 200 reading and executing the program stored in the memory 213 in a processing sequence in a case where the input key information is transmitted to the person-under-restriction terminal device 100-3 and the authentication is performed by the server device 200 as illustrated in FIG. 10A.

Referring to FIG. 10B, first, the processor 212 executes the processing of S400 to S410 illustrated in FIG. 7D. Next, once the input key information is received, the processor 212 reads the authentication key information and the input-key generation rule information by referring to the key information table, and regenerates the input key information based on a combination of the authentication key information and the input-key generation rule information. Then, the processor 212 compares the regenerated input key information with the input key information received in S410 (S460). In a case where both pieces of input key information match each other as a result of the comparison, the processor 212 determines that the authentication has succeeded, and in a case where both pieces of input key information do not match each other, the processor 212 determines that the authentication has failed (S416). Then, the processor 212 proceeds to the processing of S418 in a case where the authentication has succeeded, and proceeds to the processing of S422 in a case where the authentication has failed.

Since the subsequent processing is the same as the processing of S418 and S420 in FIG. 7D, a description of the processing is omitted. By doing so, the processing flow ends. Although not particularly illustrated in FIG. 10B, the input key information generated in S406 may be deleted after being transmitted to the person-under-restriction terminal device 100-3 in S408 to regenerate the input key information in S460.

As described above, in the example of the processing illustrated in FIGS. 10A and 10B, various types of information can be used in the generation of the input key information used for authentication, and the restricted item can be flexibly managed. In addition, since the input key information is regenerated based on the authentication key information generated in advance and the input-key generation rule information to perform authentication, the server device 200 does not need to always hold the input key information used for authentication, so that more flexible management can be performed.

(B) A Case where the Input Key Information and the Input-Key Generation Rule Information are Transmitted to the Person-Under-Restriction Terminal Device 100-3

(B-1) A Case where Authentication is Performed by the Server Device 200

Figure 11A:
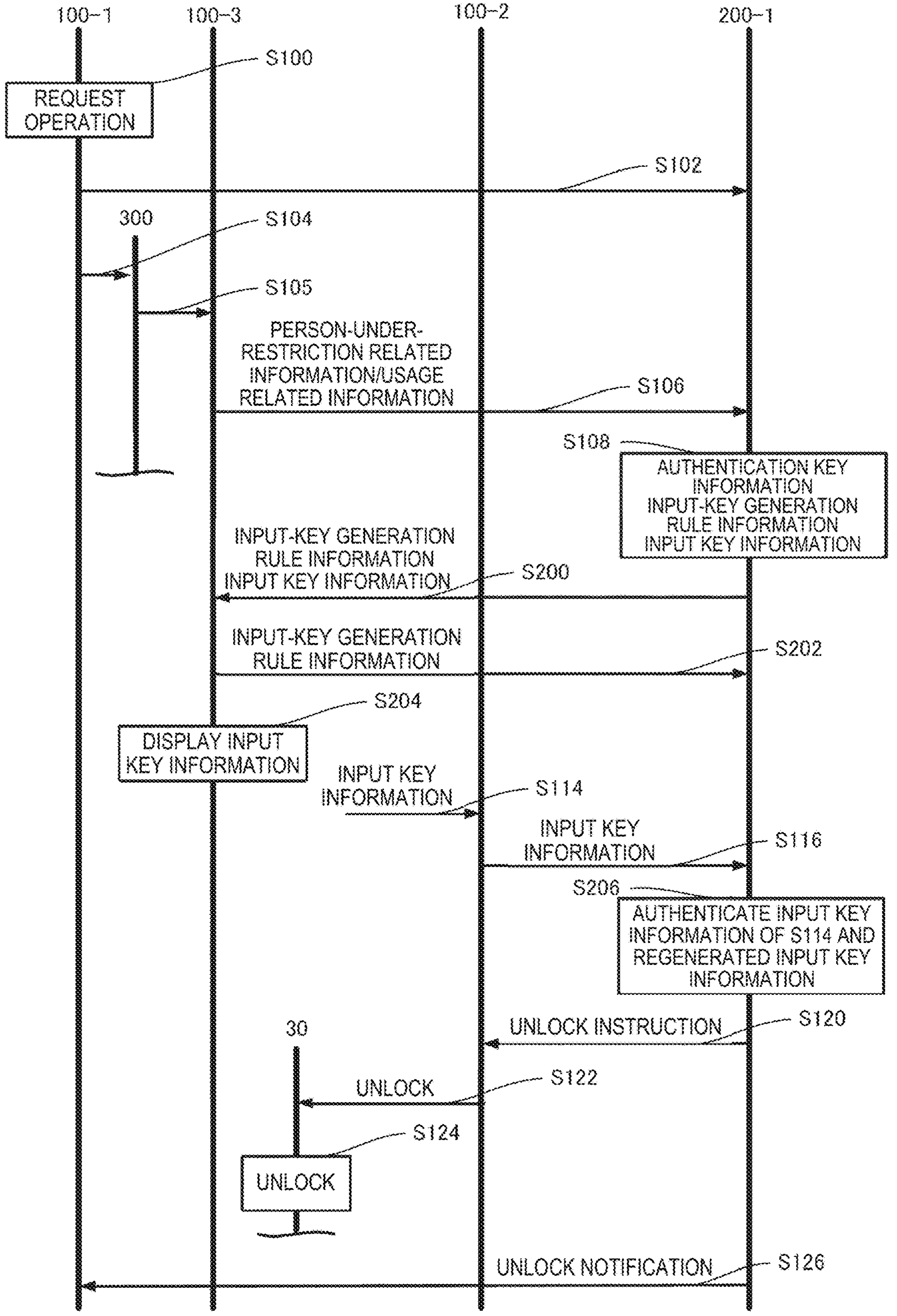
FIG. 11A is a diagram illustrating a communication sequence in the system 1 according to the first embodiment.

FIG. 11A is a diagram illustrating a communication sequence in the system 1 according to the first embodiment. Specifically, FIG. 11A illustrates a processing sequence in a case where the input key information and the input-key generation rule information are transmitted to the person-under-restriction terminal device 100-3 and authentication is performed by the server device 200. However, the example of FIG. 11A is different from the example of the processing of FIG. 7A in that only the input key information is transmitted to the person-under-restriction terminal device 100-3 in the example of FIG. 7A, whereas the input key information and the input-key generation rule information are transmitted to the person-under-restriction terminal device 100-3 in the example of FIG. 11A. That is, referring to FIG. 11A, in the system 1, the processing is the same as the processing of S100 to S108 of FIG. 7A, and thus, a description of the processing is omitted.

Once the input-key generation rule information is selected in S108 and the input key information is generated, the processor 212 of the server device 200 transmits these pieces of information to the person-under-restriction terminal device 100-3 via the communication interface 214 in association with the service identifier (S200).

The processor 112 of the person-under-restriction terminal device 100-3 that has received the input key information and the input-key generation rule information stores the received input key information in the memory 113. Thereafter, the delivery worker who is the person under restriction holds the person-under-restriction terminal device 100-3 and visits the door 30 (the restricted item 3) of the entrance of the designated multi-unit residential building based on the delivery time information and the delivery location information designated by the delivery notification received from the person-under-restriction management device 300. Then, in a case where the processor 112 of the person-under-restriction terminal device 100-3 receives the operation input of the delivery worker via the input interface 116, and position information of the person-under-restriction terminal device 100-3 matches information regarding a location of the restricted item terminal device 100-2 or the person-under-restriction terminal device 100-3 is located within a predetermined range from the location, the processor 112 transmits the input-key generation rule information received in advance together with the service identifier to the server device 200 via the communication interface 114 (S202). Once the operation input of the delivery worker is received via the input interface 116, the processor 112 of the person-under-restriction terminal device 100-3 outputs the input key information received in advance to the display via the output interface 111 (S204). The delivery worker inputs the input key information to the restricted item terminal device 100-2 that is the restricted item 3 with reference to the output input key information (S114). The transmission of the input-key generation rule information in S202 is performed by "receiving the operation input of the delivery worker via the input interface 116", but the operation input may be the same as the operation input in S204. That is, in the same case, it is possible to omit the effort for the operation input of the delivery worker. Further, the operation inputs may be different from each other. In this case, the security can be further improved. Further, automatic transmission of the input-key generation rule information may be performed in S202 instead of the operation input. For example, when a signal transmitted from the restricted item terminal device 100-2 via near field communication or non-contact wireless communication is received, corresponding information may be transmitted via the communication interface 114 of the person-under-restriction terminal device 100-3. In this case, the person under restriction who is the delivery worker does not need to recognize the input-key generation rule information, and the input-key generation rule information is transmitted to the restricted item terminal device 100-2. Therefore, it is possible to avoid a risk of leakage of the input-key generation rule information from the delivery worker. Further, even in a case where the person under restriction who is the delivery worker recognizes only the input key information, the authentication cannot be performed unless the input-key generation rule information can be transmitted to the server device 200. Therefore, the risk of leakage of the input key information from the delivery worker can be avoided, and the security can be further improved. In S202, the processor 112 of the person-under-restriction terminal device 100-3 receives the operation input of the delivery worker via the input interface 116 as a condition for transmitting the input-key generation rule information received in advance together with the service identifier to the server device 200 via the communication interface 114, and the position information of the person-under-restriction terminal device 100-3 matches the information regarding the location of the restricted item terminal device 100-2 or the person-under-restriction terminal device 100-3 is located within the predetermined range from the location. Here, as an example of a method for ensuring that the delivery worker is actually in front of the restricted item terminal device 100-2, the position information of the person-under-restriction terminal device 100-3 is used, but the method is not limited thereto. By adopting such a method, for example, even in a case where the delivery worker is at a location away from the restricted item terminal device 100-2, it is possible to prevent the input-key generation rule information from being transmitted from the person-under-restriction terminal device 100-3 to the server device 200 in response to the operation input via the input interface 116 of the person-under-restriction terminal device 100-3.

The processor 112 of the restricted item terminal device 100-2 receives the operation input of the input key information performed with the numeric keypad via the input interface 116, and stores the received input key information in the memory 113 (S114). Then, the processor 112 of the restricted item terminal device 100-2 transmits the input key information to the server device 200 via the communication interface 114 (S116).

Once the input key information input to the restricted item terminal device 100-2 is received from the restricted item terminal device 100-2 in the processing of S116, the processor 212 of the server device 200 specifies the authentication key information stored in the key information table based on the service identifier, and regenerates the input key information based on the authentication key information and the input-key generation rule information received in S202. Then, once the input key information is regenerated, the processor 212 of the server device 200 compares the received input key information with the regenerated input key information. In a case where both pieces of input key information match each other, the processor 212 of the server device 200 authenticates the received input key information (S206).

Since the subsequent processing is the same as the processing of S120 to S126 in FIG. 7A, a description of the processing is omitted.

Figure 11B:
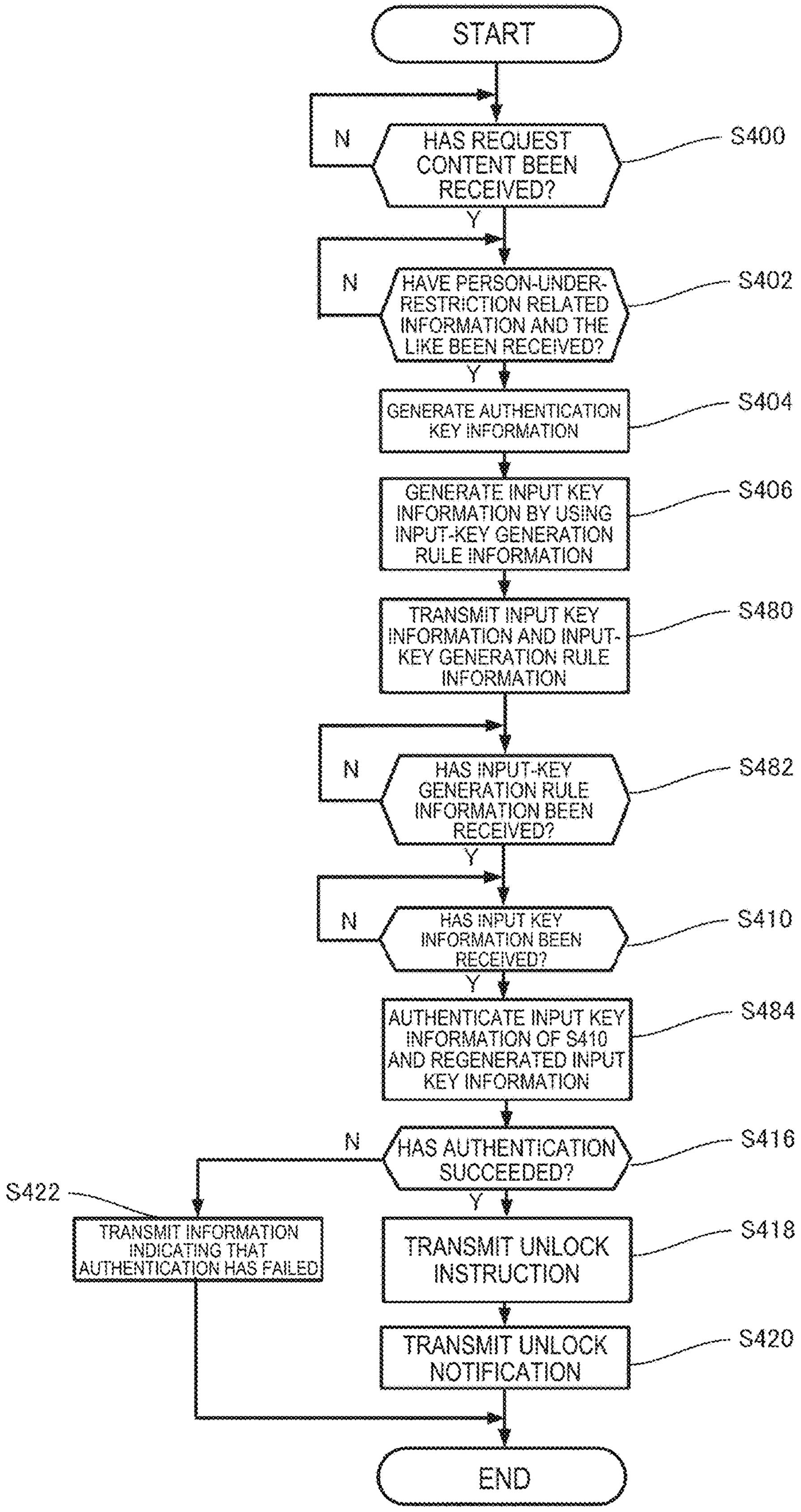
FIG. 11B is a flowchart illustrating processing executed in the processor 212 of the server device 200 according to the first embodiment.

FIG. 11B is a flowchart illustrating processing executed in the processor 212 of the server device 200 according to the first embodiment. Specifically, FIG. 11B is a diagram illustrating a processing flow executed by the processor 212 of the server device 200 reading and executing the program stored in the memory 213 in a processing sequence in a case where the input key information and the input-key generation rule information are transmitted to the person-under-restriction terminal device 100-3 and the authentication is performed by the server device 200 as illustrated in FIG. 11A.

Referring to FIG. 11B, first, the processor 212 executes the processing of S400 to S406 illustrated in FIG. 7D. Next, the processor 212 transmits the generated input key information and the selected input-key generation rule information to the person-under-restriction terminal device 100-3 via the communication interface 214 (S480).

Next, the processor 212 determines whether or not the input-key generation rule information has been received from the person-under-restriction terminal device 100-3 via the communication interface 214 (S482). In a case where it is determined that the input-key generation rule information has been received, the processor 212 proceeds to the processing of S410, and the processor 212 determines whether or not the input key information input to the restricted item terminal device 100-2 by the delivery worker has been received from the restricted item terminal device 100-2 via the communication interface 214 (S410). In a case where the input key information has been received, the processor 212 proceeds to the processing of S484, and in a case where the input key information has not been received, the processor 212 remains in the processing of S410.

The processor 212 regenerates the input key information based on the input-key generation rule information received in S482 and the authentication key information generated in S404. Then, the processor 212 compares the input key information input to the restricted item terminal device 100-2 with the regenerated input key information. In a case where both pieces of input key information match each other, the processor 112 of the restricted item terminal device 100-2 authenticates the received input key information (S484). In a case where both pieces of input key information match each other as a result of the comparison, the processor 212 determines that the authentication has succeeded, and in a case where both pieces of input key information do not match each other, the processor 212 determines that the authentication has failed (S416). Then, the processor 212 proceeds to the processing of S418 in a case where the authentication has succeeded, and proceeds to the processing of S422 in a case where the authentication has failed.

Since the subsequent processing is the same as the processing of S418 to S422 in FIG. 7D, a description of the processing is omitted. By doing so, the processing flow ends. Although not particularly illustrated in FIG. 11B, the input-key generation rule information selected in S406 and the generated input key information may be deleted after being transmitted to the person-under-restriction terminal device 100-3 in S480 in order to receive the input-key generation rule information again in S482 and regenerate the input key information in S484.

As described above, in the example of the processing illustrated in FIGS. 11A and 11B, various types of information can be used in the generation of the input key information used for authentication, and the restricted item can be flexibly managed. In addition, since the input-key generation rule information selected in advance and the input key information generated in advance are received or generated again from each terminal device to perform authentication, it is not necessary for the server device 200 to always hold the input-key generation rule information and the input key information, so that more flexible management can be performed.

(B-2) A Case where Authentication is Performed by the Restricted Item Terminal Device 100-2

Figure 12A:
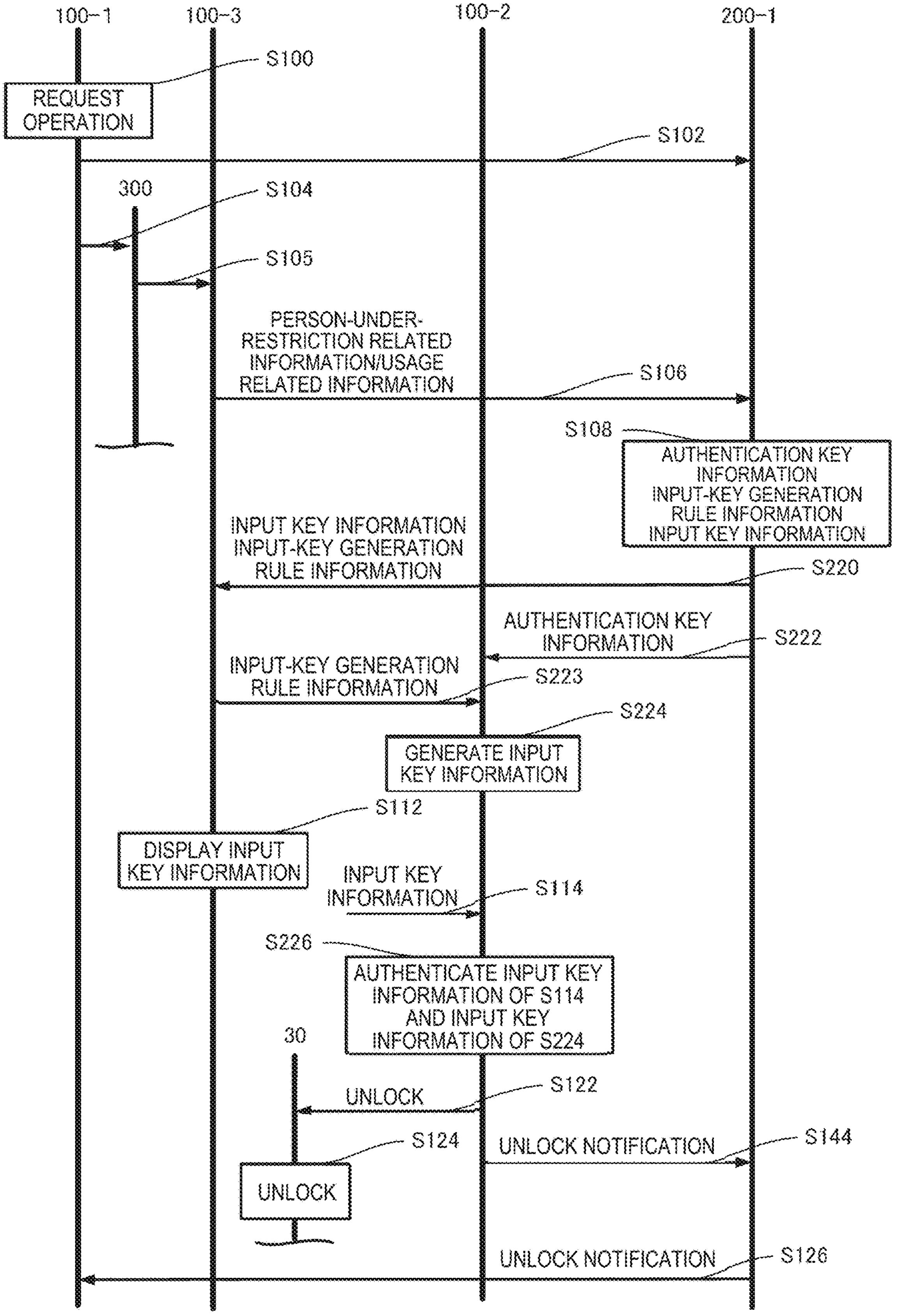
FIG. 12A is a diagram illustrating a communication sequence in the system 1 according to the first embodiment.

FIG. 12A is a diagram illustrating a communication sequence in the system 1 according to the first embodiment. Specifically, FIG. 12A illustrates a processing sequence in a case where the input key information and the input-key generation rule information are transmitted to the person-under-restriction terminal device 100-3 and authentication is performed by the restricted item terminal device 100-2. However, the example of FIG. 12A is different from the example of the process of FIG. 11A in that the authentication is performed by the server device 200 in the example of FIG. 11A, whereas the authentication is performed by the restricted item terminal device 100-2 in the example of FIG. 12A. That is, referring to FIG. 12A, in the system 1, the processing is the same as the processing of S100 to S220 of FIG. 11A, and thus, a description of the processing is omitted.

Once the input key information and the like are transmitted to the person-under-restriction terminal device 100-3 in S220 via the communication interface 114, the processor 212 of the server device 200 transmits the authentication key information generated in S108 to the restricted item terminal device 100-2 together with the service identifier via the communication interface 114 (S222). The transmission of the input key information and the like in S220 and the transmission of the authentication key information in S222 may be performed at the same timing, or any one of the transmissions may be performed first.

The processor 112 of the person-under-restriction terminal device 100-3 that has received the input key information and the input-key generation rule information stores the received input key information in the memory 113. Thereafter, the delivery worker who is the person under restriction holds the person-under-restriction terminal device 100-3 and visits the door 30 (the restricted item 3) of the entrance of the designated multi-unit residential building based on the delivery time information and the delivery location information designated by the delivery notification received from the person-under-restriction management device 300. In a case where the processor 112 of the person-under-restriction terminal device 100-3 receives the operation input of the delivery worker via the input interface 116, and position information of the person-under-restriction terminal device 100-3 matches information regarding a location of the restricted item terminal device 100-2 or the person-under-restriction terminal device 100-3 is located within a predetermined range from the location, the processor 112 transmits the input-key generation rule information received in advance together with the service identifier to the restricted item terminal device 100-2 via the communication interface 114 (S223). In this case, since the person under restriction who is the delivery worker himself/herself transmits the input-key generation rule information to the restricted item terminal device 100-2 without recognizing the input-key generation rule information, a risk that the input-key generation rule information leaks from the delivery worker can be avoided, so that the security can be further improved. Further, even in a case where the person under restriction who is the delivery worker recognizes only the input key information, the authentication cannot be performed unless the person under restriction can transmit the input-key generation rule information to the restricted item terminal device 100-2. Therefore, the risk of leakage of the input key information from the delivery worker can be avoided, and the security can be further improved. Once the authentication key information and the input-key generation rule information are received from the server device 200, the processor 112 of the restricted item terminal device 100-2 generates the input key information by applying the received input-key generation rule information to the received authentication key information (S224).

Once the operation input of the delivery worker is received via the input interface 116, the processor 112 of the person-under-restriction terminal device 100-3 outputs the input key information received in advance to the display via the output interface 111 (S112). The processor 112 of the restricted item terminal device 100-2 receives the operation input of the input key information performed with the numeric keypad via the input interface 116, and stores the received input key information in the memory 113 (S114). The transmission of the input-key generation rule information in S223 is performed by "receiving the operation input of the delivery worker via the input interface 116", but the operation input may be the same as the operation input in S112. That is, in the same case, it is possible to omit the effort for the operation input of the delivery worker. Further, the operation inputs may be different from each other. In this case, the security can be further improved. Further, automatic transmission of the input-key generation rule information may be performed in S223 instead of the operation input. For example, when a signal transmitted from the restricted item terminal device 100-2 via near field communication or non-contact wireless communication is received, corresponding information may be transmitted via the communication interface 114 of the person-under-restriction terminal device 100-3. As one of the conditions for transmitting the input-key generation rule information to the restricted item terminal device 100-2 in S223, a case where the position information matches the information regarding the location of the restricted item terminal device 100-2 or the person-under-restriction terminal device 100-3 is located within the predetermined range from the location has been described, but the present disclosure is not limited thereto. For example, the input-key generation rule information may be transmitted from the person-under-restriction terminal device 100-3 to the restricted item terminal device 100-2 when the operation input is made by the delivery worker, and the person-under-restriction terminal device 100-3 becomes communicable with the restricted item terminal device 100-2 via the communication interface 114. Here, as an example of a method for ensuring that the delivery worker is actually in front of the restricted item terminal device 100-2, the position information of the person-under-restriction terminal device 100-3 is used, but the method is not limited thereto. By adopting such a method, for example, even in a case where the delivery worker is at a location away from the restricted item terminal device 100-2, it is possible to prevent the input-key generation rule information from being transmitted from the person-under-restriction terminal device 100-3 to the restricted item terminal device 100-2 in response to the operation input via the input interface 116 of the person-under-restriction terminal device 100-3.

Next, once the input key information is input, the processor 112 of the restricted item terminal device 100-2 compares the input key information input in S114 with the input key information generated in S224. In a case where both pieces of input key information match each other, the processor 112 of the restricted item terminal device 100-2 authenticates the received input key information (S226).

In a case where the input key information is authenticated, the processor 112 of the restricted item terminal device 100-2 transmits the unlock signal for permitting unlocking of the door 30 of the restricted item 3 (S122). Once the unlock signal is received, the door 30 whose opening and closing has been restricted is unlocked, and processing of driving the motor to open the door 30 is executed (S124). As a result, the delivery worker who is the person under restriction whose passage through the door 30 that is the restricted item 3 has been restricted can pass through the door 30.

In addition, the processor 112 of the restricted item terminal device 100-2 transmits, to the server device 200 via the communication interface 114, information indicating that the unlock instruction for the door 30 of the restricted item 3 has been issued, together with the service identifier (S144). Then, the processor 212 of the server device 200 that has received the information executes the processing of S126 illustrated in FIG. 11A.

Figure 12B:
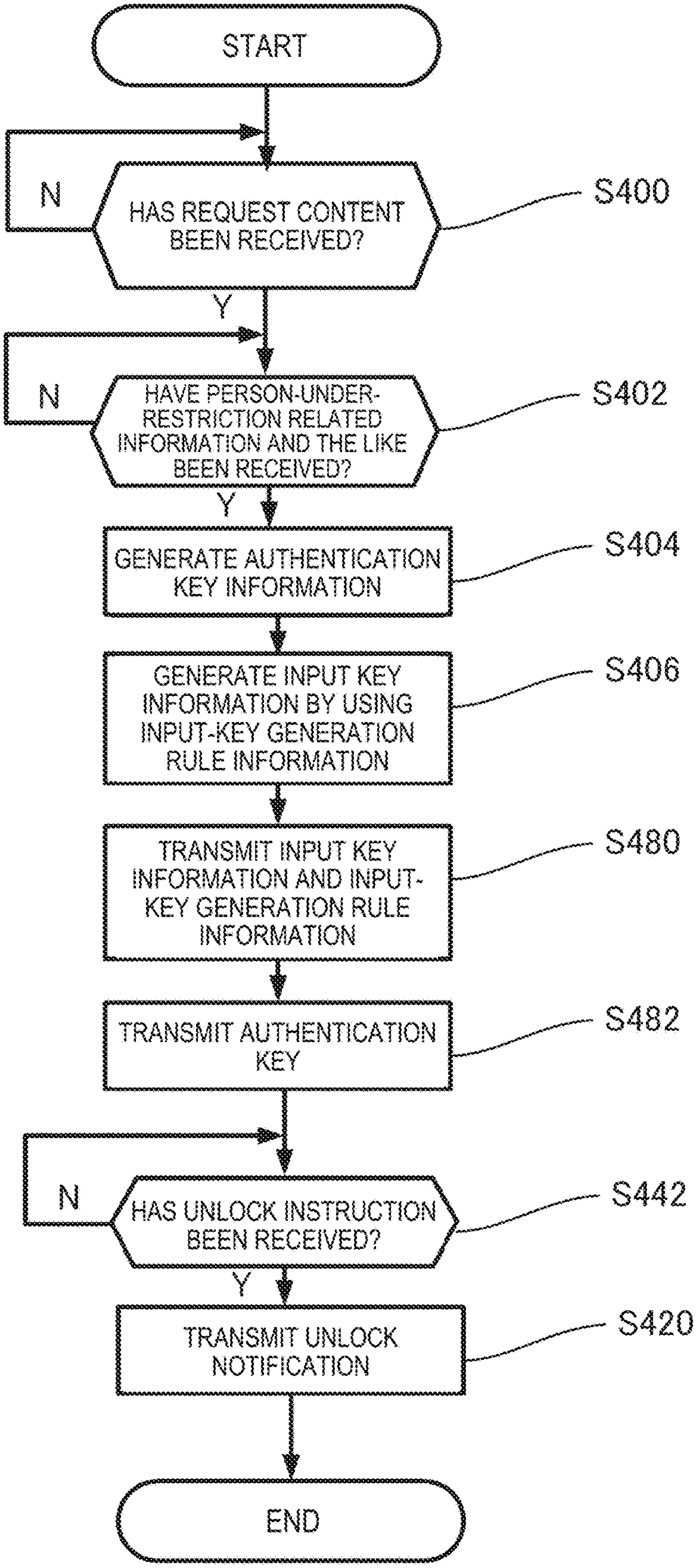
FIG. 12B is a flowchart illustrating processing executed in the processor 212 of the server device 200 according to the first embodiment.

FIG. 12B is a flowchart illustrating processing executed in the processor 212 of the server device 200 according to the first embodiment. Specifically, FIG. 12B is a diagram illustrating a processing flow executed by the processor 212 of the server device 200 reading and executing the program stored in the memory 213 in a processing sequence in a case where the input key information and the input-key generation rule information are transmitted to the person-under-restriction terminal device 100-3 and the authentication is performed by the restricted item terminal device 100-2 as illustrated in FIG. 12A.

Referring to FIG. 12B, first, the processor 212 executes the processing of S400 to S480 illustrated in FIG. 11B. Next, the processor 212 transmits the authentication key information generated in S406 to the restricted item terminal device 100-2 via the communication interface 214 (S482).

The processor 212 determines whether or not information indicating that the unlock instruction has been issued from the restricted item terminal device 100-2 via the communication interface 214 within a predetermined period (S442). In a case where the unlock notification information has been received within the predetermined period, the processor 212 transmits, to the instructor terminal device 100-1, the unlock notification indicating that the locked door 30 has been unlocked, similarly to S420 illustrated in FIG. 7D (S420). By doing so, the processing flow ends.

As described above, in the example of the processing illustrated in FIGS. 12A and 12B, various types of information can be used in the generation of the input key information used for authentication, and the restricted item can be flexibly managed. In addition, since the input-key generation rule information selected in advance and the authentication key information and the input key information generated in advance are transmitted to each terminal device again and authentication is performed by the restricted item terminal device 100-2, it is not necessary for the server device 200 to always hold the input-key generation rule information, the authentication key information, and the input key information, so that more flexible management can be performed.

As described above, in the present embodiment, various types of information can be used in the generation of the input key information used for authentication, and the restricted item can be flexibly managed.

Second Embodiment

In the first embodiment, a case where a system 1 includes an instructor terminal device 100-1, a person-under-restriction terminal device 100-3, a server device 200, and a person-under-restriction management device 300, and authentication is performed in the server device 200 or a restricted item terminal device 100-2 has been described. In a second embodiment, a case where the system 1 further includes a restricted item management device 400 remotely installed so as to be able to communicate with the restricted item terminal device 100-2 and the like via a communication network 14, and authentication is performed in the server device 200 or the restricted item management device 400 will be described. A configuration, processing, and a procedure of the present embodiment are similar to those of the first embodiment except for points specifically described below. Therefore, a detailed description of these matters is omitted.

Figure 13:
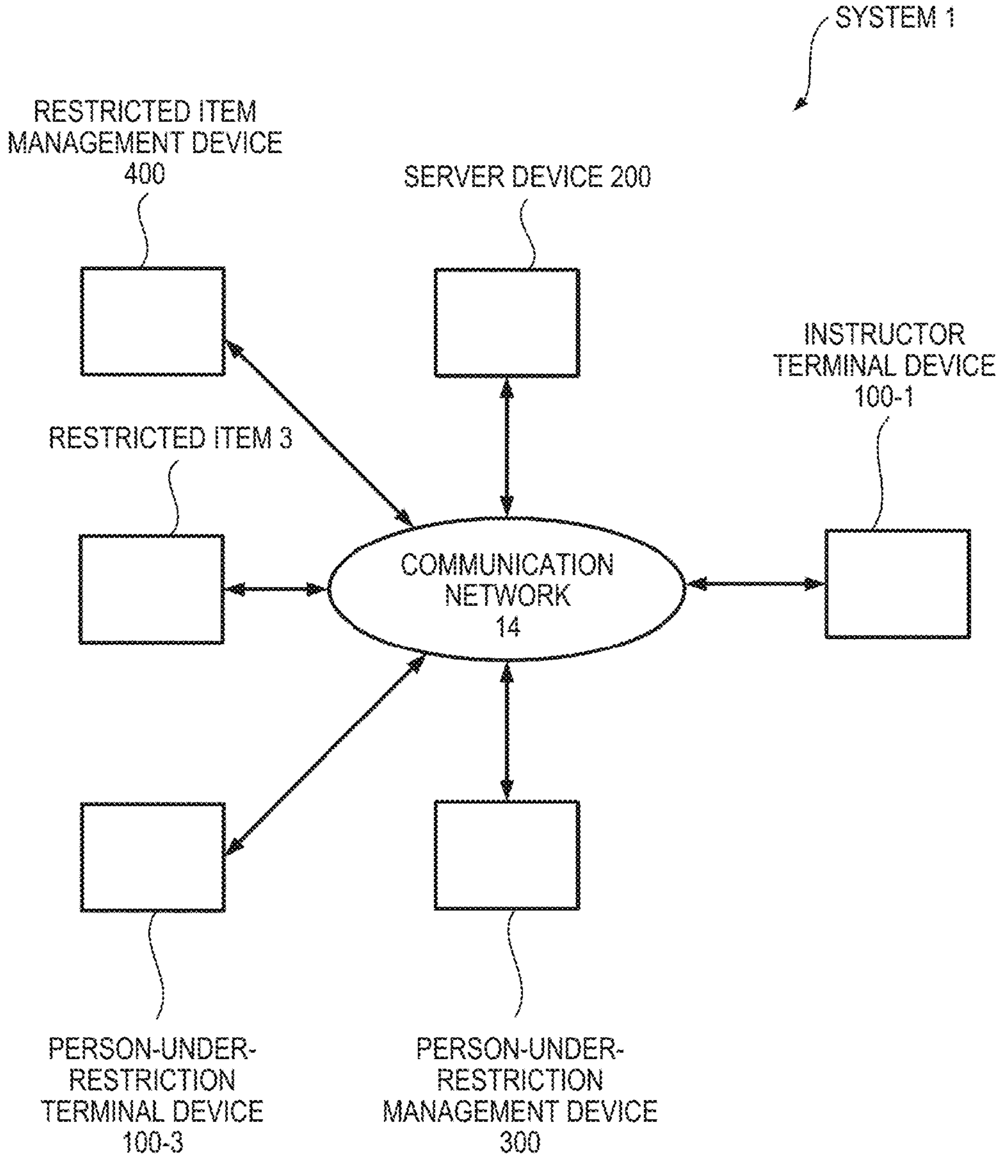
FIG. 13 is a diagram illustrating a configuration of a system 1 according to a second embodiment.

FIG. 13 is a diagram illustrating a configuration of the system 1 according to the second embodiment. Referring to FIG. 13, the system 1 includes the restricted item management device 400 communicably connected to the restricted item terminal device 100-2 and the like of a restricted item 3 via the communication network 14. In the example of FIG. 13, only one restricted item 3 and one restricted item terminal device 100-2 are described, but the present disclosure is not limited to the following example. For example, the restricted item management device 400 is suitably used in a case where doors 30 and restricted item terminal devices 100-2 of a plurality of restricted items 3 are installed in a multi-unit residential building and managed collectively or in a case where restricted items 3 of a plurality of multi-unit residential buildings are managed collectively.

A configuration of the restricted item management device 400 is not limited to the following example, but may be similar to a configuration of the server device 200 illustrated in FIG. 4, for example. That is, the restricted item management device 400 includes a processor, a memory, and a communication IF, and is configured such that the processor reads and processes a program stored in the memory, and communicates with another device via the communication IF. In the example of FIG. 13, a case where the restricted item management device 400 and the restricted item terminal device 100-2 are configured as separate devices has been described, but it is a matter of course that the restricted item management device 400 and the restricted item terminal device 100-2 may be configured integrally.

Hereinafter, different processing patterns will be described depending on a difference in device that performs authentication of a delivery worker who is a person under restriction whose usage (that is, passage) of the door 30 is restricted. It is a matter of course that the six processing patterns are examples, and the processing patterns according to the present embodiment are not limited to only the six processing patterns.

(A) a Case where Only Input Key Information is Transmitted to the Person-Under-Restriction Terminal Device 100-3

(A-1) A Case where Authentication is Performed by Server Device 200 (Generated Input Key Information is Stored in the Server Device 200)

Figure 14:
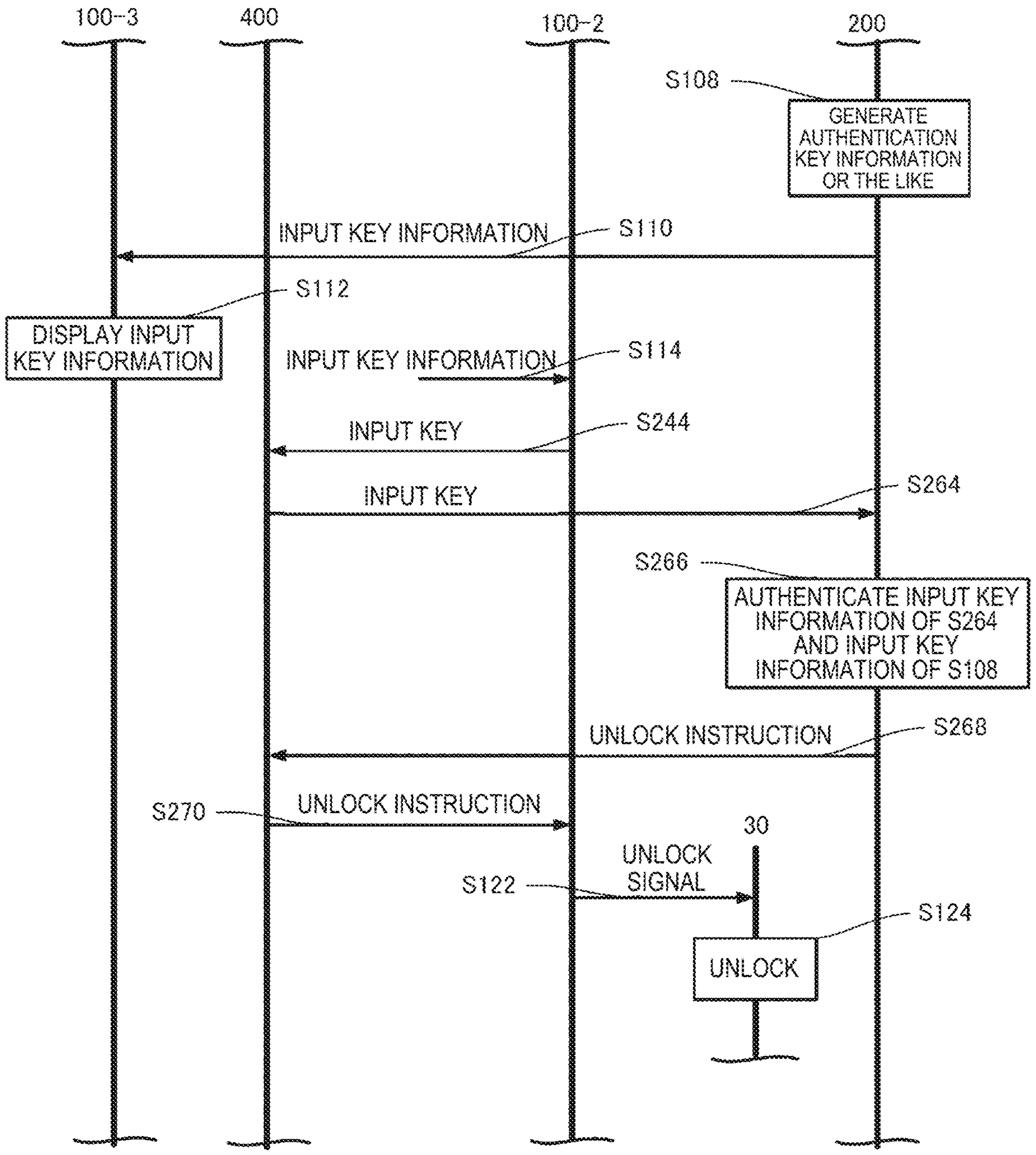
FIG. 14 is a diagram illustrating a communication sequence in the system 1 according to the second embodiment.

FIG. 14 is a diagram illustrating a communication sequence in the system 1 according to the second embodiment. Specifically, FIG. 14 illustrates a processing sequence in a case where the input key information is transmitted to the person-under-restriction terminal device 100-3 and authentication is performed by the server device 200. In FIG. 14, processing before processing related to generation of authentication key information and the like (S108) is omitted, but the same processing as S100 to S108 of FIG. 7A including S108 is performed.

Referring to FIG. 14, a processor 212 of the server device 200 transmits the input key information among the generated authentication key information and input key information to the person-under-restriction terminal device 100-3 held by the delivery worker who is the person under restriction via a communication interface 214 (S110).

A processor 112 of the person-under-restriction terminal device 100-3 that has received the input key information stores the received input key information in a memory 113. Thereafter, the delivery worker who is the person under restriction holds the person-under-restriction terminal device 100-3 and visits the door 30 (the restricted item 3) of the entrance of the designated multi-unit residential building based on the delivery time information and the delivery location information designated by the delivery notification received from the person-under-restriction management device 300. Then, the person-under-restriction terminal device 100-3 receives an operation input of the delivery worker via an input interface 116, and outputs the input key information received in advance to a display via an output interface 111 (S112). The delivery worker inputs the input key information to the restricted item terminal device 100-2 that is the restricted item 3 with reference to the output input key information.

The processor 112 of the restricted item terminal device 100-2 receives the operation input of the input key information performed with the numeric keypad via the input interface 116, and stores the received input key information in the memory 113 (S114). Then, the processor 112 of the restricted item terminal device 100-2 transmits the input key information to the restricted item management device 400 via a communication interface 114 (S224). Once the input key information is received from the restricted item terminal device 100-2 via the communication interface, the processor of the restricted item management device 400 transmits the received input key information to the server device 200 (S264).

Once the input key information is received, the processor 212 of the server device 200 compares the received input key information with the input key information stored in a key information table in the processing of S108. When any one piece of input key information stored in the key information table matches the received input key information, the processor 212 of the server device 200 authenticates the received input key information (S266).

When the input key information is authenticated, the processor 212 of the server device 200 transmits, to the restricted item management device 400 that has transmitted the input key information, information indicating that the authentication has succeeded and an unlock instruction for the door 30 of the restricted item 3 via the communication interface 114 (S120). In a case where the input key information that is input does not match the input key information stored in the key information table, the authentication fails. In such a case, the processor 212 of the server device 200 transmits information indicating that the authentication has failed to the restricted item management device 400 to notify the delivery worker of the information indicating the failure via the restricted item terminal device 100-2.

Once the unlock instruction is received, the processor of the restricted item management device 400 transmits the received unlock instruction to the restricted item terminal device 100-2. Once the unlock instruction is received, the processor 112 of the restricted item terminal device 100-2 transmits an unlock signal for permitting unlocking of the door 30 of the restricted item 3 according to the received unlock instruction (S122). Once the unlock signal is received, the door 30 whose opening and closing has been restricted is unlocked, and processing of driving the motor to open the door 30 is executed (S124). As a result, the delivery worker who is the person under restriction whose passage through the door 30 that is the restricted item 3 has been restricted can pass through the door 30. The subsequent processing is executed in the same manner as in S126 in FIG. 7A.

As described above, in the example of the processing of FIG. 14, various types of information can be used in the generation of the input key information used for authentication, and the restricted item can be flexibly managed. In addition, with the restricted item management device 400, it is possible to reduce a processing load of the restricted item terminal device 100-2 and to more flexibly cope with function update and the like.

(A-2) A Case where Authentication is Performed by the Restricted Item Management Device 400 (the Input Key Information is Transmitted to the Restricted Item Management Device 400 in Advance)

Figure 15:
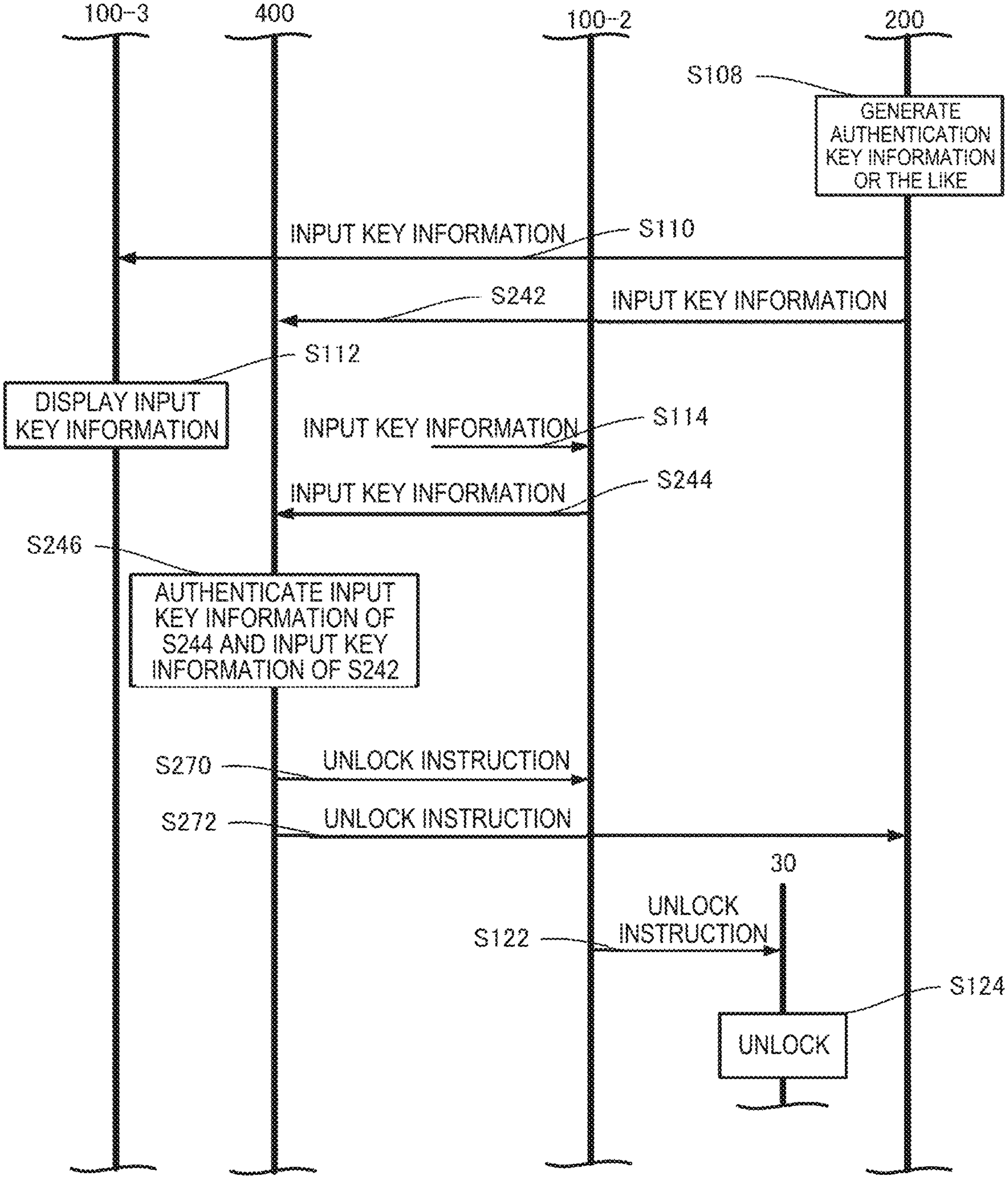
FIG. 15 is a diagram illustrating a communication sequence in the system 1 according to the second embodiment.

FIG. 15 is a diagram illustrating a communication sequence in the system 1 according to the second embodiment. Specifically, FIG. 15 illustrates a processing sequence in a case where the input key information is transmitted to the person-under-restriction terminal device 100-3 and authentication is performed by the restricted item management device 400. In FIG. 15, since the processing before S110 is the same as the processing of S110 in FIG. 14, a description of the processing is omitted.

The processor 212 of the server device 200 transmits the input key information generated in the processing of S108 together with a service identifier to the restricted item management device 400 via the communication interface 214 (S242).

Next, the person-under-restriction terminal device 100-3 receives the operation input of the delivery worker via the input interface 116, and outputs the input key information received in advance to the display via the output interface 111 (S112). Then, the delivery worker inputs the input key information to the restricted item terminal device 100-2 that is the restricted item 3 with reference to the output input key information.

The processor 112 of the restricted item terminal device 100-2 receives the operation input of the input key information performed with the numeric keypad via the input interface 116, and stores the received input key information in the memory 113 (S114). Then, the processor 112 of the restricted item terminal device 100-2 transmits the input key information to the restricted item management device 400 via the communication interface 114 (S224). Once the input key information is received, the processor of the restricted item management device 400 compares the input key information with the input key information received in S242. In a case where both pieces of input key information match each other, the processor of the restricted item management device 400 authenticates the received input key information (S246).

When the input key information is authenticated, the processor of the restricted item management device 400 transmits the unlock instruction for the door 30 of the restricted item 3 to the restricted item terminal device 100-2 via the communication interface (S270), and transmits information indicating that the unlock instruction for the door 30 of the restricted item 3 has been issued to the server device 200 (S272). Since the subsequent processing is the same as S122 to S126 in FIG. 14, a description of the processing is omitted.

As described above, in the example of the processing of FIG. 15, various types of information can be used in the generation of the input key information used for authentication, and the restricted item can be flexibly managed. In addition, since the authentication is performed by the restricted item management device 400 that has received the input key information generated in advance, it is not necessary for the server device 200 to always hold the input key information used for the authentication, so that more flexible management can be performed. In addition, with the restricted item management device 400, it is possible to reduce the processing load of the restricted item terminal device 100-2 and to more flexibly cope with the function update and the like.

As described above, the processing pattern of FIG. 14 is described corresponding to FIG. 7A (A-1 of the first embodiment), and the processing pattern of FIG. 15 is described corresponding to FIG. 8A (A-2 of the first embodiment) in the first embodiment. However, the restricted item management device 400 can be similarly used in FIG. 9A (A-3 of the first embodiment), FIG. 10A (A-4 of the first embodiment), FIG. 11A (B-1 of the first embodiment), and FIG. 12A (B-2 of the first embodiment).

As described above, in the present embodiment, various types of information can be used in the generation of the input key information used for authentication, and the restricted item can be flexibly managed.

Third Embodiment

In the first embodiment, a case where a delivery request operation for a delivery item is performed by an instructor and the delivery item is delivered to the instructor has been described. In a third embodiment, a case where one user who is an instructor performs a delivery request operation for a delivery item to another user will be described. A typical example of such an example is a case where one user who is an instructor sends a gift to another user through an e-commerce service or the like. A configuration, processing, and a procedure of the present embodiment are similar to those of the first embodiment except for points specifically described below. Therefore, a detailed description of these matters is omitted.

Figure 16:
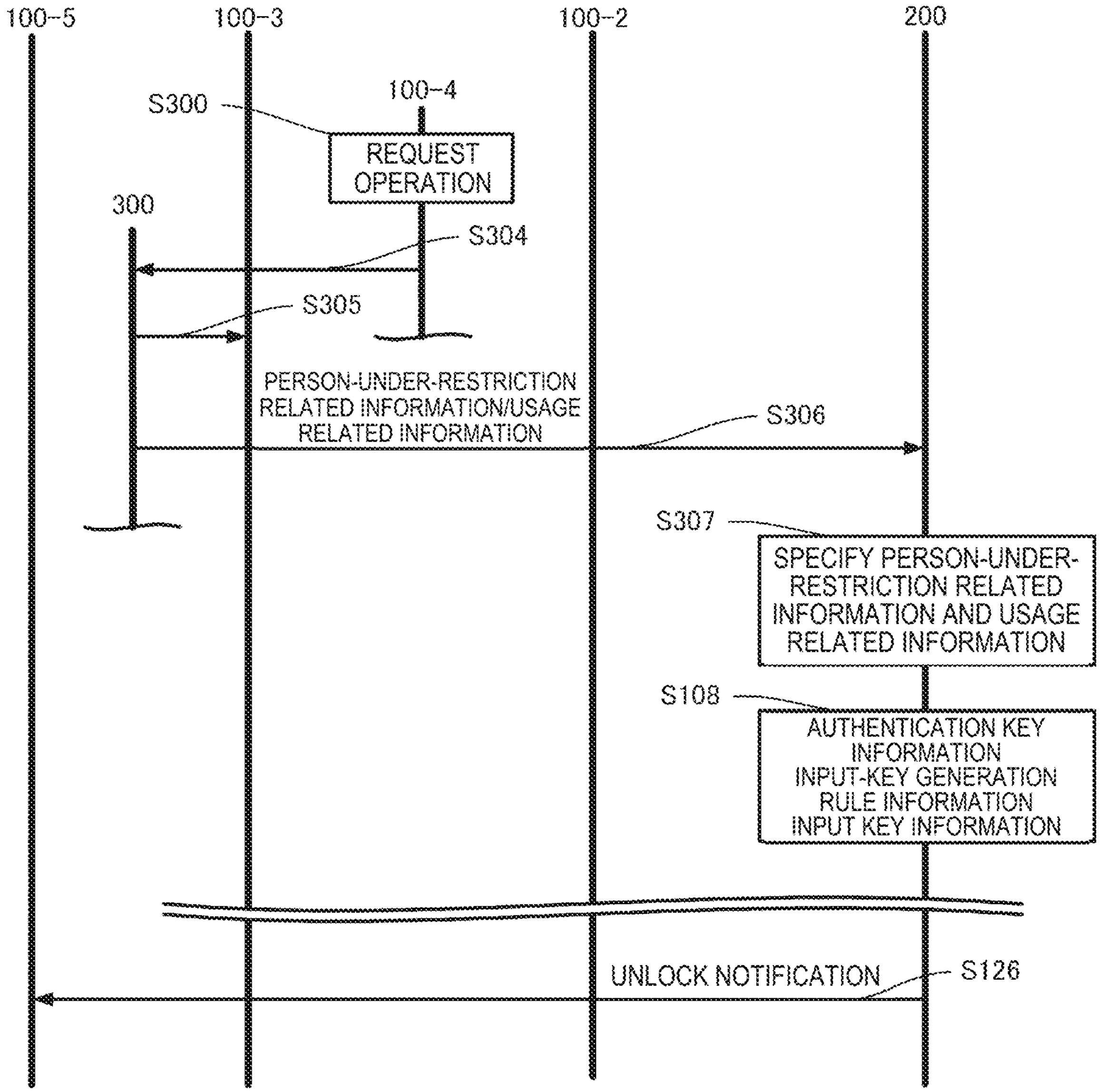
FIG. 16 is a diagram illustrating a communication sequence of a system 1 in a third embodiment.

FIG. 16 is a diagram illustrating a communication sequence of a system 1 in the third embodiment. Specifically, FIG. 16 illustrates a case where one user who is an instructor holds an instructor terminal device 100-4 and delivers a delivery item requested from the instructor terminal device 100-4 to another user holding a user terminal device 100-5. Each terminal device has the same configuration as the components illustrated in FIG. 3 as an example, and thus a description of each component is omitted.

Referring to FIG. 16, a processor of the instructor terminal device 100-4 held by one user who is the instructor receives an operation input of the instructor via an input interface 116 and receives a delivery request operation for the delivery item (S300). In the delivery operation, an address or the like of another user is input as delivery location information indicating a delivery destination designated by one user who is the instructor. A processor 112 of the instructor terminal device 100-1 transmits a request content to a person-under-restriction management device 300 (S304).

Once the request content is received from the instructor terminal device 100-4, a processor of the person-under-restriction management device 300 selects a delivery worker who is a person under restriction according to the request content, and transmits a delivery notification to a person-under-restriction terminal device 100-3 held by the delivery worker (S305). The delivery notification includes delivery time information, the delivery location information, delivery item identification information, and the like in addition to information such as an instructor identifier for specifying one user of the delivery destination and a name of the instructor. Meanwhile, the processor of the person-under-restriction management device 300 generates usage related information and person-under-restriction related information based on the received request content, a person-under-restriction identifier for identifying the selected delivery worker who is the person under restriction, and the like, and transmits the usage related information and the person-under-restriction related information to a server device 200 via a communication interface (S306).

Here, in a case where one user who is the instructor has not subscribed to a service or the like provided by the server device 200 in advance, personal information, address information, or the like of another user, which is the usage related information, may not be sufficiently included in the usage related information received in S306. In such a case, a processor 212 of the server device 200 specifies the usage related information necessary for generating authentication key information, such as the personal information and the address information of another user, by referring to a usage related information table based on the usage related information such as a delivery location received in S306 (307). Then, the processor 212 of the server device 200 reads at least one of the stored person-under-restriction related information or the stored usage related information, and generates the authentication key information from the read information (S108). Since the subsequent processing is the same as S110 to S124 in FIG. 7A of the first embodiment, a description of the processing is omitted.

The processor 212 of the server device 200 transmits an unlock instruction to a restricted item terminal device 100-2, and then transmits an unlock notification indicating that the unlock instruction for a door 30 has been issued to the user terminal device 100-5 as another user (S126). As a result, another user can know that restriction of the door 30 has been released. As a result, the processing sequence ends. In step S126, not only the unlock notification indicating that the unlock instruction for the door 30 has been issued may be transmitted to the user terminal device 100-5 as another user, but also the unlock notification indicating that the unlock instruction has been issued may be transmitted to the instructor terminal device 100-4. As a result, the restriction of the door 30 is released, and the instructor can know that a package has arrived for another user.

As described above, the processing pattern of FIG. 16 is described corresponding to FIG. 7A (A-1 of the first embodiment) in the first embodiment. However, it is possible to similarly execute processing using the instructor terminal device 100-4 and the user terminal device 100-5 in FIG. 8A (A-2 of the first embodiment), FIG. 9A (A-3 of the first embodiment), FIG. 10A (A-4 of the first embodiment), FIG. 11A (B-1 of the first embodiment), and the second embodiment.

As described above, in the example of the processing of FIG. 16, various types of information can be used in the generation of the input key information used for authentication, and the restricted item can be flexibly managed.

Fourth Embodiment

In the first embodiment, a case where authentication key information and input key information are used for authentication of a person under restriction has been described. In a fourth embodiment, a case where authentication is performed using one-time code information based on the input key information and delivery time information generated based on the authentication key information will be described. A configuration, processing, and a procedure are similar to those of the first embodiment except for points specifically described below. Therefore, a detailed description of these matters is omitted.

Figure 17:
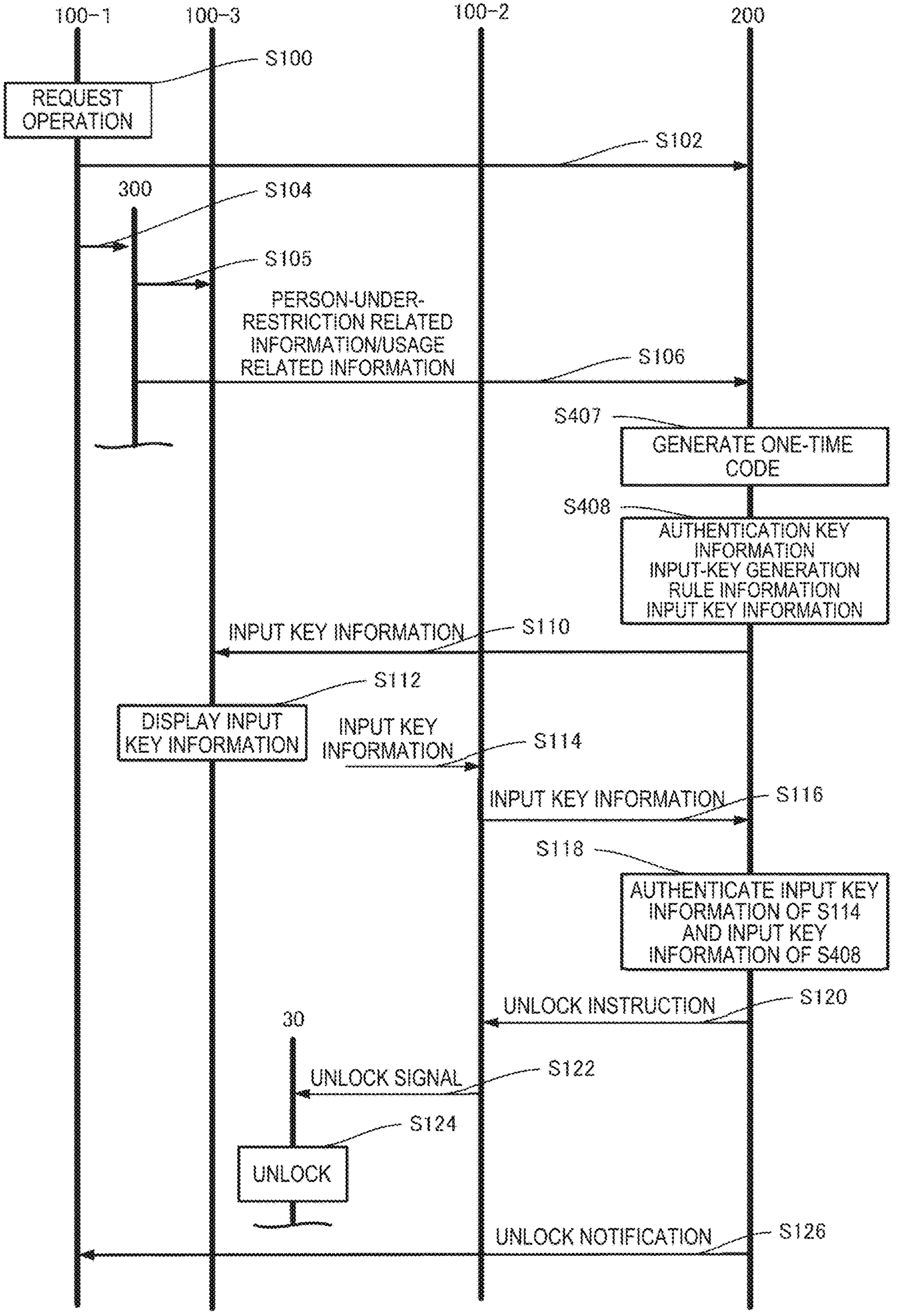
FIG. 17 is a diagram illustrating a communication sequence of a system 1 in a fourth embodiment.

FIG. 17 is a diagram illustrating a communication sequence of a system 1 in the fourth embodiment. Referring to FIG. 17, since the same processing as that in FIG. 7A of the first embodiment is executed in S100 to S106, a detailed description thereof is omitted. Although not particularly illustrated, for example, in security information of a usage related information selection screen illustrated in FIG. 7C, a check box for checking "one-time code" information is output. In a case where an operation input for the check box is detected in an instructor terminal device 100-1, it is possible to enable usage of the one-time code information according to the present embodiment.

A processor 212 of a server device 200 executes processing related to generation of the one-time code information. The one-time code information is code information validated at a predetermined time determined in advance, and the code information includes information regarding a time to be validated. For example, the processor 212 of the server device 200 refers to delivery time information of a delivery that has been requested and delivery company identification information that specifies a delivery company to which a delivery worker who is a person under restriction belongs, based on a request content received from a person-under-restriction management device 300. Then, the processor 212 of the server device 200 determines which one of predetermined time segments (for example, segment 1 for 9:00 to 12:00, segment 2 for 12:00 to 16:00, segment 3 for 16:00 to 18:00, and segment 4 for 18:00 to 20:00) the delivery time information corresponds to. Then, a coefficient corresponding to the specified time segment is multiplied by a value obtained by quantifying the delivery company identification information to acquire the one-time code information. Such time sections are not limited to the four sections, and for example, the time section may be further divided into finer units such as seconds, minutes, hours, days, weeks, or months, or into fewer divisions. In addition, information regarding a specific time actually designated may be used without applying such sections as described above.

That is, the server device 200 is the server device 200 including at least one processor 212, and the at least one processor 212 is configured to execute processing for receiving person-under-restriction related information related to the person under restriction whose usage of a restricted item 3 is restricted and including usage time information related to a time when the person under restriction provides a service, generating the one-time code information validated at a predetermined time specified by the usage time information based on the received person-under-restriction related information, and outputting the generated one-time code information to a person-under-restriction terminal device 100-3 held by the person under restriction via a communication interface 214.

Furthermore, the one-time code information is generated based on company identification information for specifying a company to which the person under restriction providing the service belongs, in addition to the usage time information. That is, the company identification information is not necessarily required in the generation of the one-time code information in the present embodiment, and information capable of identifying the person under restriction or the service provided by the company, other unique identification information, an arbitrary character string, or a combination thereof may be used.

Next, the processor 212 of the server device 200 reads at least one of the person-under-restriction related information or usage related information received and stored in advance in S106, and generates the authentication key information from the read information and the one-time code information generated in S407 (S408). Thereafter, the processor 212 of the server device 200 generates an input key based on the generated authentication key information and selected input-key generation rule information. Since the processing and the processing of S110 to S126 are the same as S110 to S126 of FIG. 7A of the first embodiment, a detailed description is omitted.

As described above, the processing pattern of FIG. 17 is described corresponding to FIG. 7A (A-1 of the first embodiment) in the first embodiment, but it is also possible to similarly execute the processing using the one-time code information in FIG. 8A (A-2 of the first embodiment), FIG. 9A (A-3 of the first embodiment), FIG. 10A (A-4 of the first embodiment), FIG. 11A (B-1 of the first embodiment), the second embodiment, and the third embodiment. Furthermore, in the example of the processing of FIG. 17, in the security information of the usage related information selection screen illustrated in FIG. 7C, in a case where the operation input for the check box for checking the "one-time code" information is detected, usage of the one-time code information is validated. However, it is a matter of course that the validation is set in advance by the server device 200 or the like, and the one-time code information may be used without an operation input of an instructor. Further, in the present embodiment, the input key information may be generated based on the input-key generation rule information from not only the one-time code information but also the authentication key information combined with a plurality of pieces of information other than the one-time code information. For example, even in a case where a specification of the one-time code cannot invalidate the one-time code that is issued once even when the delivery is canceled, it is possible to suppress a risk of leakage of the one-time code information itself.

As described above, in the example of the processing of FIG. 17, various types of information can be used in the generation of the input key information used for authentication, and the restricted item can be flexibly managed. In addition, since the authentication key information and the generated key information are generated using the one-time code information in the authentication, the security can be further improved.

Fifth Embodiment

In the fourth embodiment, a case where one-time code information generated in advance is used to generate authentication key information and input key information has been described. In a fifth embodiment, authentication of the authentication key information and the input key information is performed, and one-time code information issued at a timing when a person under restriction actually comes in front of a restricted item 3 is used. That is, a case where it is ensured that the person under restriction is in front of a restricted item terminal device 100-2 that is the restricted item 3, and authentication using the input key information, that is, two-stage authentication, is performed will be described. A configuration, processing, and a procedure are similar to those of the fourth embodiment except for points specifically described below. Therefore, a detailed description of these matters is omitted.

Figure 18:
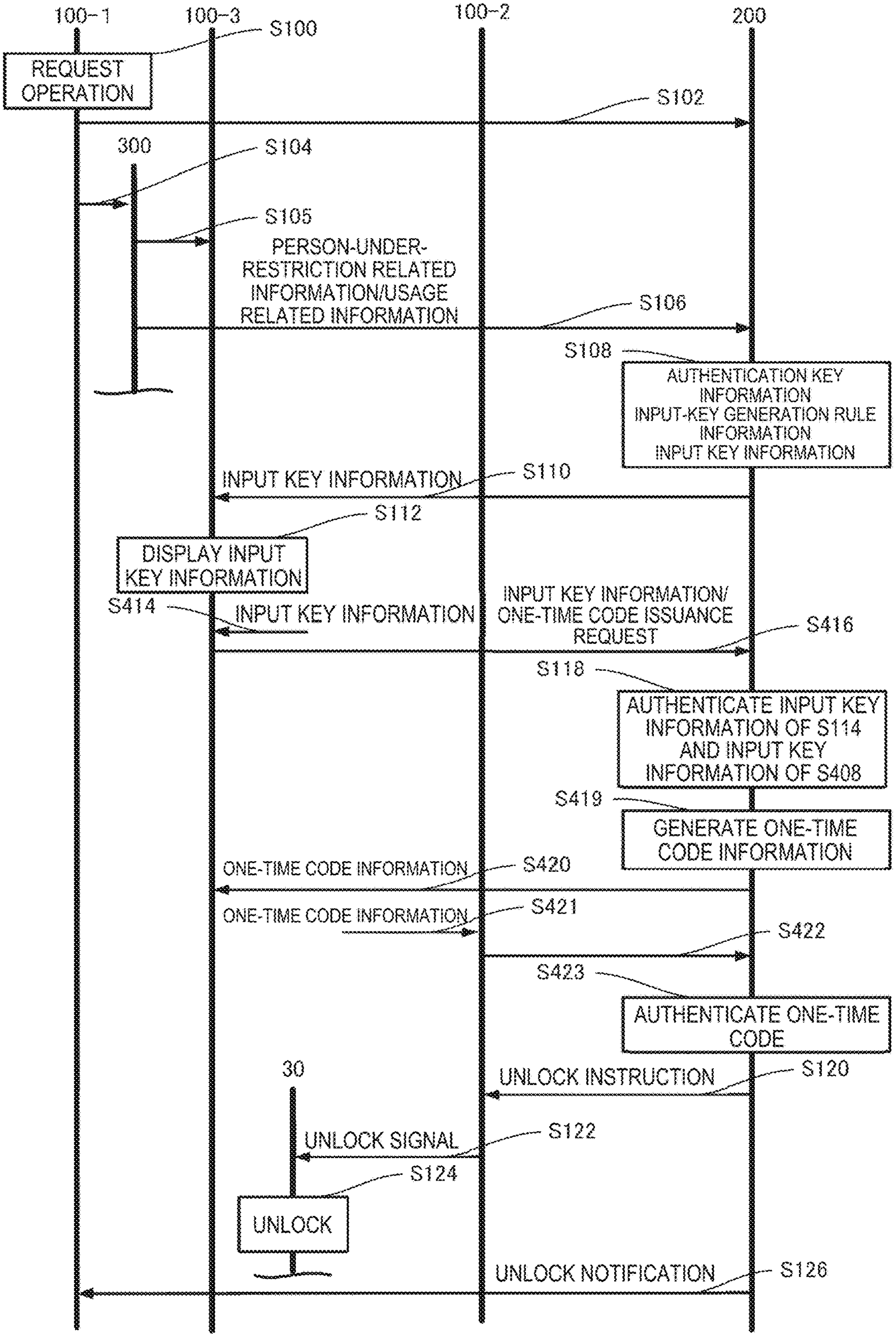
FIG. 18 is a diagram illustrating a communication sequence of a system 1 in a fifth embodiment.

FIG. 18 is a diagram illustrating a communication sequence of a system 1 in the fifth embodiment. Referring to FIG. 18, in the system 1, the same processing as S100 to S110 in FIG. 7A is performed, and thus, a detailed description thereof is omitted. Although not particularly illustrated, for example, in security information of a usage related information selection screen illustrated in FIG. 7C, a check box for checking "issue a one-time code on site" is output. In a case where an operation input for the check box is detected in an instructor terminal device 100-1, it is possible to enable usage of the one-time code issued on site according to the present embodiment.

A processor 212 of a server device 200 transmits the input key information generated in the processing of S108 to a person-under-restriction terminal device 100-3 via a communication interface 214 (S410).

A processor 112 of the person-under-restriction terminal device 100-3 that has received the input key information stores the received information in a memory 113. Thereafter, the delivery worker who is the person under restriction holds the person-under-restriction terminal device 100-3 and visits the door 30 (the restricted item 3) of the entrance of the designated multi-unit residential building based on the delivery time information and the delivery location information designated by the delivery notification received from the person-under-restriction management device 300. Then, the person-under-restriction terminal device 100-3 receives an operation input of the delivery worker via an input interface 116, and outputs the received input key information to a display via an output interface 111. Then, the delivery worker inputs the input key information via the input interface 116 of the person-under-restriction terminal device 100-3 with reference to the output input key information (S414). Once the input key information is input via the input interface 116, the processor 112 of the person-under-restriction terminal device 100-3 transmits the received input key information together with a one-time code issuance request to the server device 200 via a communication interface 114 (S416). The processor 212 of the server device 200 performs authentication based on the input key information received in S118 and the input key information generated in S108 (S118). Then, in a case where the authentication has succeeded, the processor 212 of the server device 200 generates the one-time code information in response to the one-time code issuance request received in S416, and stores the one-time code information in a memory 213 (S419). The processor 212 of the server device 200 transmits the generated one-time code information to the person-under-restriction terminal device 100-3 via the communication interface 114 (S420). The person-under-restriction terminal device 100-3 outputs the received one-time code information to a display via the output interface 111. The delivery worker inputs the input key information to the restricted item terminal device 100-2 that is the restricted item 3 via the input interface 116 with reference to the output one-time code information (S421).

The processor 112 of the restricted item terminal device 100-2 receives the one-time code information input using a numeric keypad via the input interface 116, and transmits the received one-time code information to the server device 200 via the communication interface 114 (S422).

The processor 212 of the server device 200 compares the one-time code information stored in the memory 213 with the one-time code information received in S421, and authenticates that the delivery worker who has performed the input is actually in front of the restricted item terminal device 100-2 that is the restricted item 3 in a case where the pieces of one-time code information match each other (S423).

Since the subsequent processing is the same as S120 to S126 in FIG. 17 of the fourth embodiment, a detailed description thereof is omitted. It is a matter of course that an unlock instruction is not transmitted in a case where the authentication has failed in S423.

In addition, as described above, the processing pattern of FIG. 18 has been described corresponding to FIG. 17 of the fourth embodiment, but processing using the one-time code information can be similarly performed in the processing pattern of any of the first to third embodiments. Further, in the example of the processing of FIG. 18, the authentication using the one-time code (S423) is performed after the authentication using the input key information (S108), but the steps of processing related to these authentications may be performed in the reverse order. Furthermore, in the example of the processing of FIG. 18, in the security information of the usage related information selection screen illustrated in FIG. 7C, in a case where the operation input for the check box for checking the "one-time code" information is detected, usage of the one-time code information is validated. However, it is a matter of course that the validation is set in advance by the server device 200 or the like, and the one-time code information may be used without an operation input of an instructor.

In the present embodiment, the one-time code information is used as an example of a method for ensuring that the delivery worker is actually in front of the restricted item terminal device 100-2, but the present disclosure is not limited to this method.

As another method for ensuring that the delivery worker is actually in front of the restricted item terminal device 100-2, it is also possible to simultaneously perform the authentication using the one-time code information of FIG. 18 (S423) and the authentication using the input key information (S108). In this method, as the one-time code information, for example, it is possible to use recording medium information (for example, a two-dimensional code or a barcode) that is distributed from the server device 200 based on reception of an operation input of the delivery worker and displayed on a display terminal installed in the vicinity of the restricted item terminal device 100-2 that is the restricted item 3. In such a case, more preferably, the recording medium information may be distributed and displayed while being updated every several seconds. In such a case, the delivery worker reads the recording medium information via the input interface 116 of the person-under-restriction terminal device 100-3, and inputs the input key information to the restricted item terminal device 100-2 that is the restricted item 3 with reference to the input key information output in the person-under-restriction terminal device 100-3. The person-under-restriction terminal device 100-3 transmits the read recording medium information to the server device 200 via the communication interface 114, and the restricted item terminal device 100-2 transmits the received input key information to the server device 200 via the communication interface 114. Then, the server device 200 performs authentication using both the recording medium information and the input key information.

Furthermore, as another method for ensuring that the delivery worker is actually in front of the restricted item terminal device 100-2, a method of executing the steps of processing related to the authentication illustrated in FIG. 18 in the reverse order, that is, a method of performing the authentication using the input key information (S108) after the authentication using the one-time code information (S423) may be used. In this method, after reading the recording medium information, the processor 112 of the person-under-restriction terminal device 100-3 transmits an input key information transmission request to the server device 200 together with the recording medium information. The delivery worker inputs the input key information to the restricted item terminal device 100-2 that is the restricted item 3 by referring to the input key information received by the person-under-restriction terminal device 100-3 from the server device 200 and output to the display via the output interface 111. The restricted item terminal device 100-2 transmits the received input key information to the server device 200 via the communication interface 114, and the server device 200 performs authentication of the input key information.

In addition, although the method of performing the authentication by the server device 200 has been described as the method using the recording medium information, the authentication may be performed by the restricted item terminal device 100-2 or the restricted item management device 400 as in the above-described embodiments.

As described above, in the example of the processing of FIG. 18, various types of information can be used in the generation of the input key information used for authentication, and the restricted item can be flexibly managed. In addition, since the authentication is further performed using the one-time code information in the authentication, the security can be further improved.

Sixth Embodiment

In the first embodiment, a case where person-under-restriction related information and usage related information in S106 are automatically transmitted from a person-under-restriction management device 300 to a server device 200 has been described with reference to FIG. 7A. In a sixth embodiment, a case where these pieces of information are transmitted from the person-under-restriction management device 300 to the server device 200 by transmitting a transmission request for these pieces of information from the server device 200 will be described. A configuration, processing, and a procedure of the present embodiment are similar to those of the first embodiment except for points specifically described below. Therefore, a detailed description of these matters is omitted.

Figure 19:
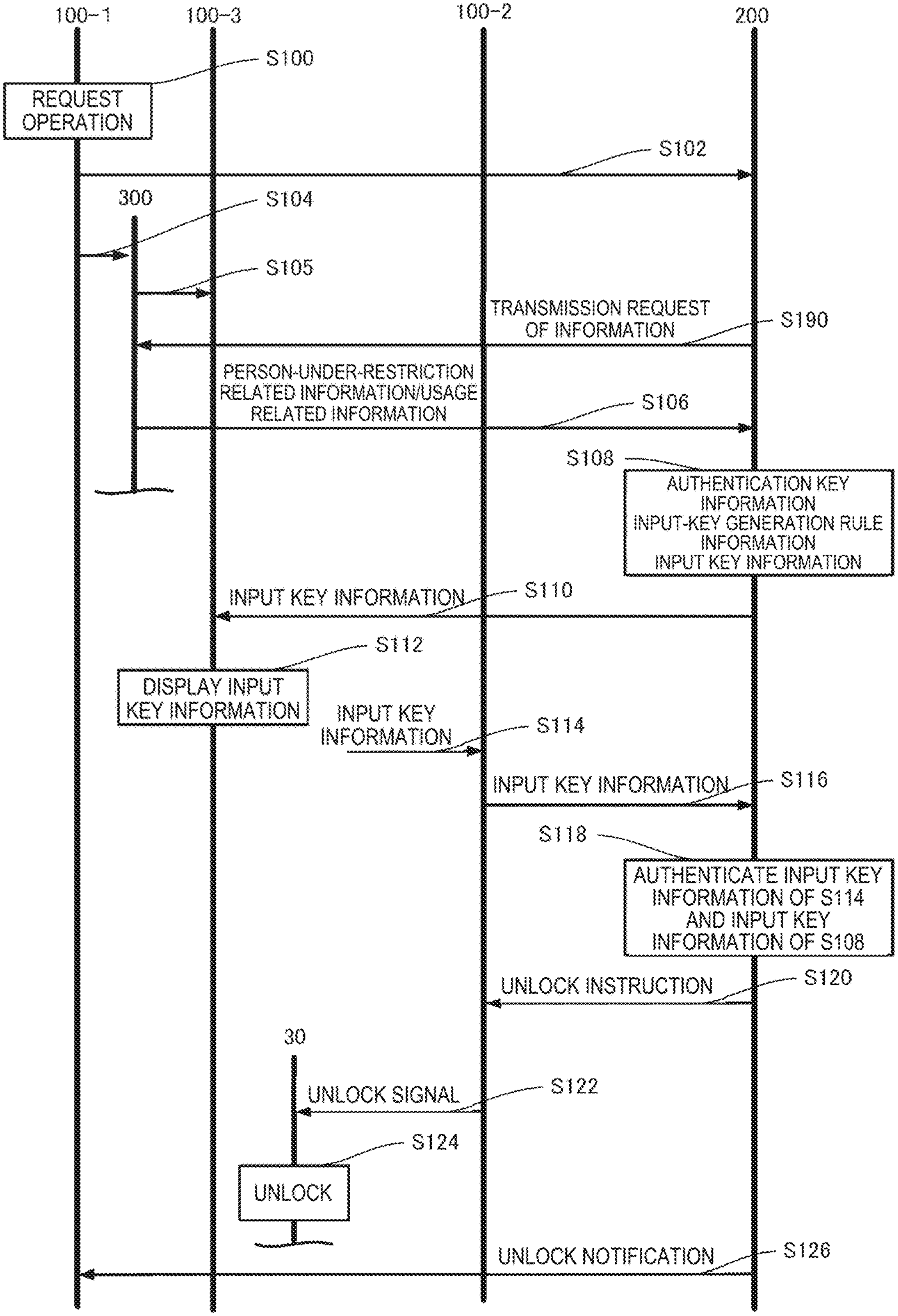
FIG. 19 is a diagram illustrating a communication sequence of a system 1 in a sixth embodiment.

FIG. 19 is a diagram illustrating a communication sequence of the system 1 in the sixth embodiment. Referring to FIG. 19, since the same processing as that in FIG. 7A of the first embodiment is executed in S100 to S105, a detailed description thereof is omitted. Next, a processor 212 of the server device 200 transmits a transmission request of the person-under-restriction related information and the usage related information to the person-under-restriction management device 300 via a communication interface 214 in response to reception of a request content in S102 (S190). At this time, the transmission request includes any information that can specify an instructor identifier and the request content.

Once the transmission request is received, a processor of the person-under-restriction management device 300 extracts the person-under-restriction related information and the usage related information to be transmitted to the server device 200 by referring to a person-under-restriction related information table and a usage related information table based on any information that can specify the instructor identifier and the request content. Thereafter, the processor of the person-under-restriction management device 300 transmits the person-under-restriction related information and the usage related information to the server device 200 via a communication interface (S106).

Since the subsequent processing is the same as S108 to S126 in FIG. 7A of the first embodiment, a detailed description is omitted. The transmission of the transmission request in S190 is triggered by the reception of the request content, but it is a matter of course that the transmission of the transmission request in S190 may be performed based on an instruction input of a person input to the server device 200.

As described above, the processing pattern of FIG. 19 is described corresponding to FIG. 7A (A-1 of the first embodiment) in the first embodiment, but it is also possible to similarly apply the processing according to the embodiment to FIG. 8A (A-2 of the first embodiment), FIG. 9A (A-3 of the first embodiment), FIG. 10A (A-4 of the first embodiment), FIG. 11A (B-1 of the first embodiment), FIG. 12A (B-2 of the first embodiment), and other embodiments.

As described above, in the present embodiment, various types of information can be used in the generation of the input key information used for authentication, and the restricted item can be flexibly managed. Furthermore, in the present embodiment, since the transmission request serving as a trigger for information transmission is transmitted from the server device 200, it is not necessary to set a process related to transmission of these pieces of information between the person-under-restriction management device 300 and the server device 200 in advance. More specifically, an operator of the server device 200 does not need to cooperate in service with a delivery company in advance, for example, so that a more flexible system design becomes possible.

Seventh Embodiment

In the first embodiment, a case where person-under-restriction related information and usage related information in S106 are transmitted from a person-under-restriction management device 300 to a server device 200 has been described with reference to FIG. 7A. In a seventh embodiment, a case where these pieces of information are transmitted not from the person-under-restriction management device 300 but from an instructor terminal device 100-1 to the server device 200 will be described. A configuration, processing, and a procedure of the present embodiment are similar to those of the first embodiment except for points specifically described below. Therefore, a detailed description of these matters is omitted.

Figure 20:
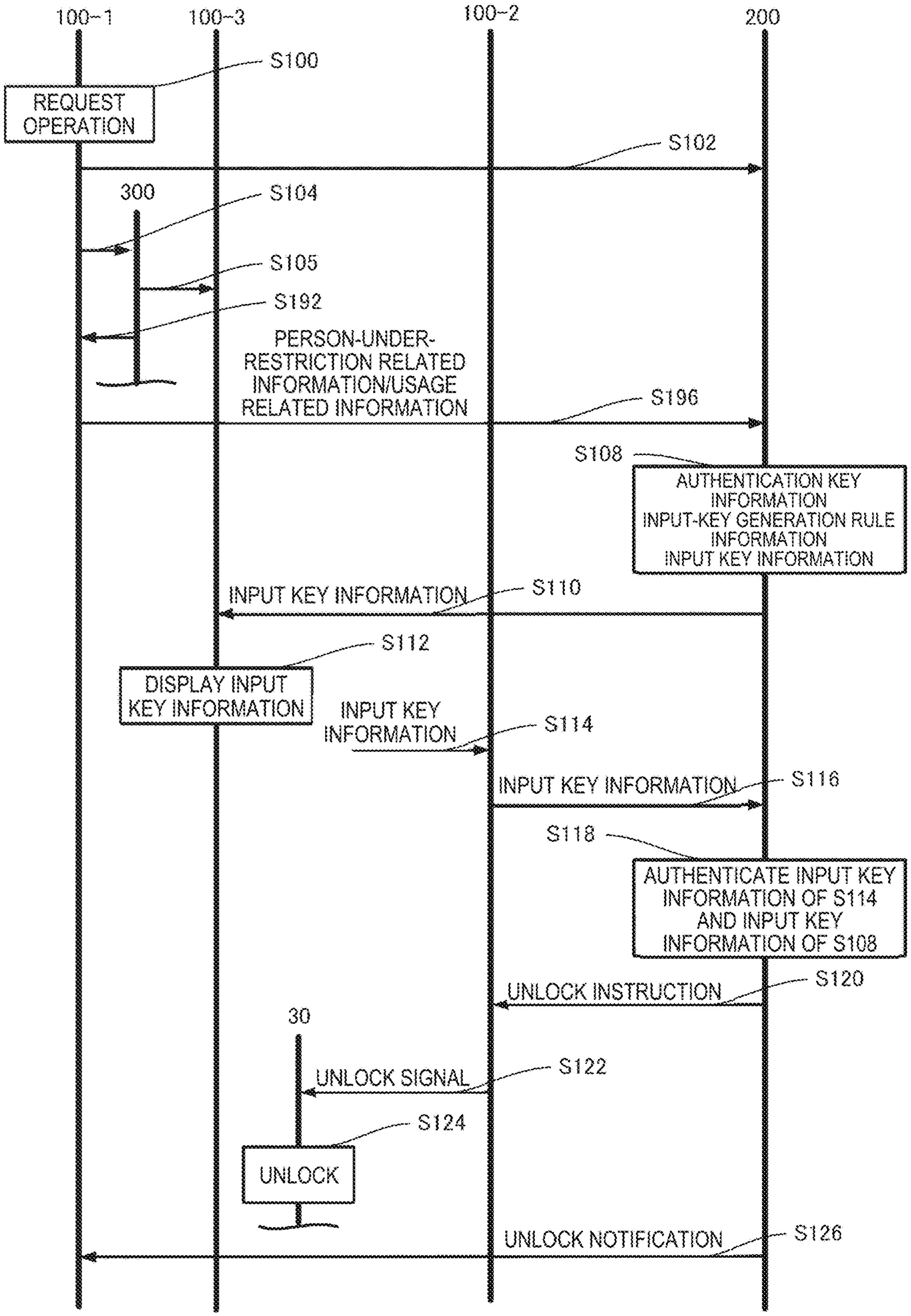
FIG. 20 is a diagram illustrating a communication sequence of a system 1 in a seventh embodiment.

FIG. 20 is a diagram illustrating a communication sequence of a system 1 in the seventh embodiment. Referring to FIG. 20, since the same processing as that in FIG. 7A of the first embodiment is executed in S100 to S105, a detailed description thereof is omitted. Next, a processor of the person-under-restriction management device 300 extracts the person-under-restriction related information and user related information generated based on a request content and stored in a person-under-restriction related information table and a user related information table. Then, the processor of the person-under-restriction management device 300 transmits the extracted person-under-restriction related information and user related information to the instructor terminal device 100-1 via a communication interface (S192).

Once the person-under-restriction related information and the user related information are received, a processor 112 of the instructor terminal device 100-1 stores the person-under-restriction related information and the user related information in a memory 113, and automatically transmits the received person-under-restriction related information and user related information to the server device 200 via a communication interface 114 (S196).

Since the subsequent processing is the same as S108 to S126 in FIG. 7A of the first embodiment, a detailed description is omitted. In the example of FIG. 20, a case where the person-under-restriction related information and the user related information are automatically transmitted to the server device 200 has been described. However, for example, similarly to the example of FIG. 19, the person-under-restriction related information and the user related information may be transmitted in response to reception of a transmission request for these pieces of information by the instructor terminal device 100-1 from the server device 200. Furthermore, in this case, the transmission of the transmission request is triggered by the reception of the request content, but it is a matter of course that the transmission of the transmission request may be performed based on an instruction input of a person input to the server device 200.

As described above, the processing pattern of FIG. 20 is described corresponding to FIG. 7A (A-1 of the first embodiment) in the first embodiment, but it is also possible to similarly apply the processing according to the embodiment to FIG. 8A (A-2 of the first embodiment), FIG. 9A (A-3 of the first embodiment), FIG. 10A (A-4 of the first embodiment), FIG. 11A (B-1 of the first embodiment), FIG. 12A (B-2 of the first embodiment), and other embodiments.

As described above, in the present embodiment, various types of information can be used in the generation of the input key information used for authentication, and the restricted item can be flexibly managed. Further, in the present embodiment, since various types of information necessary for generating authentication key information are transmitted via the instructor terminal device 100-1, it is not necessary to set a process related to transmission of these pieces of information between the person-under-restriction management device 300 and the server device 200 in advance. More specifically, an operator of the server device 200 does not need to cooperate in service with a delivery company in advance, for example, so that a more flexible system design becomes possible.

Eighth Embodiment

In the first embodiment, a case where authentication key information and input key information are used for authentication of a person under restriction has been described. In an eighth embodiment, a case of identifying whether or not the person under restriction is a person permitted for usage by using signature-encrypted usage permit information in addition to the authentication key information and the input key information, that is, a case of performing two-stage authentication, will be described. In this example, processing using the signature-encrypted usage permit information is referred to as "identification", and processing using the authentication key information and the input key information is referred to as "authentication", however, there is no particular distinction in the meaning of the terms. A configuration, processing, and a procedure are similar to those of the first embodiment except for points specifically described below. Therefore, a detailed description of these matters is omitted.

Figure 21:
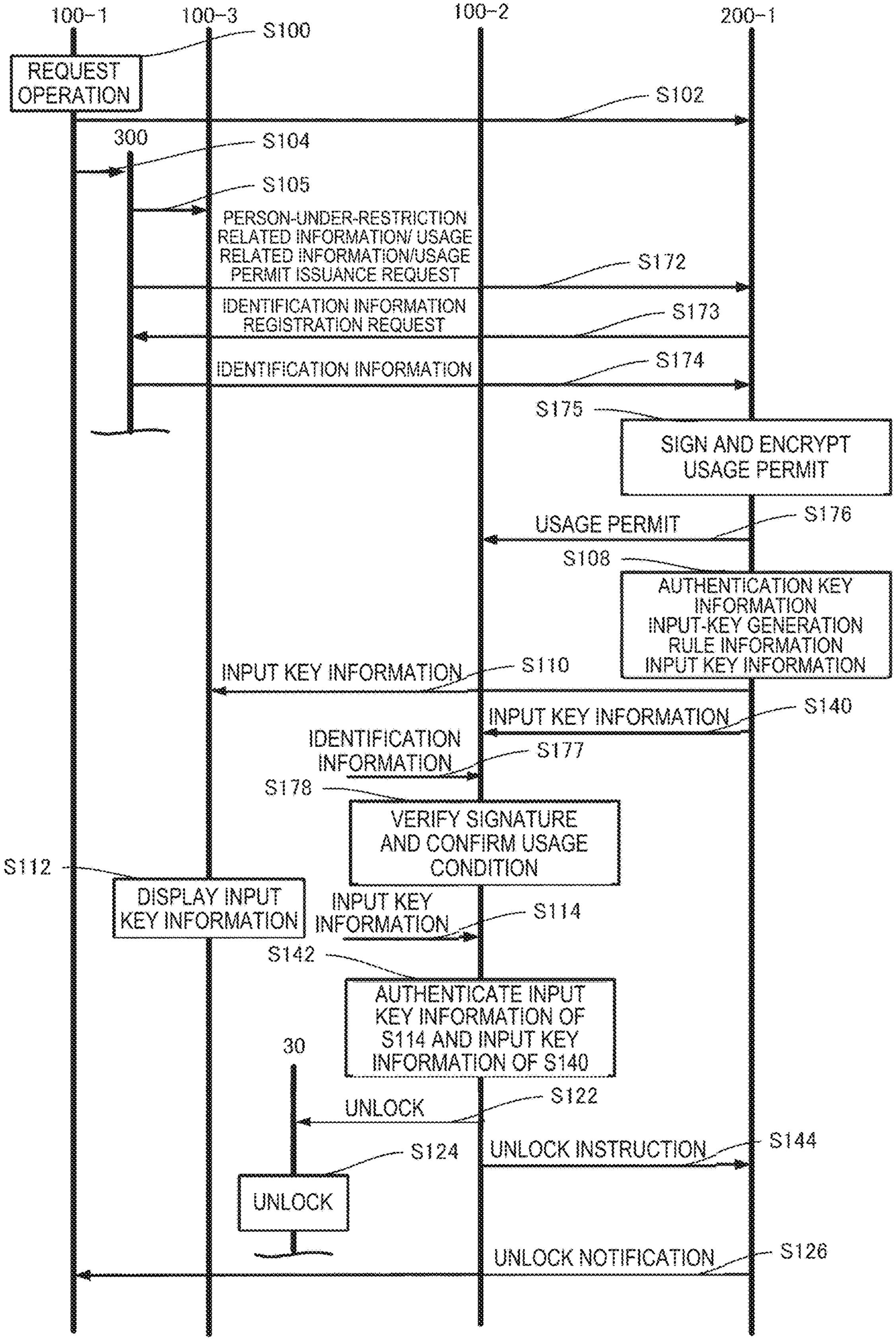
FIG. 21 is a diagram illustrating a communication sequence of a system 1 in an eighth embodiment.

FIG. 21 is a diagram illustrating a communication sequence of a system 1 in the eighth embodiment. Referring to FIG. 21, since the same processing as that in FIG. 8A of the first embodiment is executed in S100 to S105, a detailed description thereof is omitted. Although not particularly illustrated, for example, in security information of a usage related information selection screen illustrated in FIG. 7C, in a case where a check box for checking "usage permit"

information is output and an operation input for the check box is detected in an instructor terminal device 100-1, it is possible to enable usage of the "usage permit" information according to the present embodiment. In addition, usage of the usage permit can be enabled by being set in a server device 200 in advance.

Once a request content is received in S104, a processor of a person-under-restriction management device 300 generates the usage related information and the person-under-restriction related information based on the received request content, and transmits the usage related information and the person-under-restriction related information to the server device 200 via a communication interface in association with a service identifier (S172). At this time, the processor of the person-under-restriction management device 300 requests the server device 200 to issue the usage permit information together with or separately from the information. A processor 212 of the server device 200 transmits, to the person-under-restriction management device 300, information necessary for registration of identification information (information for specifying a person himself/herself, such as face information) for identifying a delivery worker who is the person under restriction, the information being necessary for issuance of the usage permit, as an identification information registration request (S173). The processor of the person-under-restriction management device 300 acquires the identification information for identifying the delivery worker who is the person under restriction, and transmits the identification information to the server device 200 (S174). A step of requesting registration of the identification information for identifying the delivery worker who is the person under restriction and a step of receiving the identification information are separate from each other, which is based on the assumption that it is not clear in S100 which delivery worker is in charge of delivery. In a case where the identification information of the delivery worker who can be in charge is registered in advance in the person-under-restriction management device 300, in S172, the usage related information and the person-under-restriction related information may be generated based on a person-under-restriction identifier or the like for identifying the delivery worker who can be in charge together with the request content received in S104, and may be transmitted to the server device 200 via the communication interface in association with the service identifier.

Once an issuance request for the use permit information is received, the processor 212 of the server device 200 generates the use permit information based on the usage related information and the person-under-restriction related information that are also received. As an example, the usage permit information includes information indicating a usage permission time (for example, a usage permission start time and a usage permission end time) of the restricted item 3 specified by delivery time information in association with the person-under-restriction identifier, delivery company identification information, package identification information, or a combination thereof included in the person-under-restriction related information. Here, in a restricted item terminal device 100-2, a public key necessary for signature verification for the usage permit information and a common key necessary for decryption of the usage permit information are set and stored in advance. Therefore, the processor 212 of the server device 200 encrypts the usage permit information by using the common key set in advance in the restricted item terminal device 100-2. Then, the processor 212 of the server device 200 generates a signature for the usage permit information encrypted using a secret key paired with the public key set in advance in the restricted item terminal device 100-2 (S175). Then, the processor 212 of the server device 200 transmits the encrypted usage permit information and signature to the restricted item terminal device 100-2 in association with the person-under-restriction identifier, the delivery company identification information, the package identification information, or a combination thereof (S176).

Further, the processor 212 of the server device 200 stores the usage related information, the person-under-restriction related information, and the request content received in S172 in the person-under-restriction information table illustrated in FIG. 5A, the usage related information table illustrated in FIG. 5B, and the service information table illustrated in FIG. 5C, respectively, in association with the service identifier. Then, the processor 212 of the server device 200 reads at least one of the stored person-under-restriction related information or the stored usage related information, and generates the authentication key information and the input key information from the read information (S108). Such specific generation processing is as described in the items 6(A) and 6(B) above.

Next, the processor 212 of the server device 200 transmits the input key information generated in the processing of S108 to a person-under-restriction terminal device 100-3 via a communication interface 214 (S110), and transmits the input key information to the restricted item terminal device 100-2 (S140).

Then, the delivery worker who is the person under restriction visits a door 30 (the restricted item 3) of an entrance of a designated multi-unit residential building. Then, the delivery worker uses a reader device connected to the restricted item terminal device 100-2 via an input interface 216 to read an ID card in which the person-under-restriction identifier, the delivery company identification information, the package identification information, or a combination thereof associated with the usage permit information is stored in advance to input any one of the person-under-restriction identifier, the delivery company identification information, the package identification information, or a combination thereof. That is, the restricted item terminal device 100-2 receives the input of these pieces of information (S177). The delivery worker may input these pieces of information by using a numeric keypad of the restricted item terminal device 100-2 according to a predetermined rule, for example.

When any one of the person-under-restriction identifier, the delivery company identification information, the package identification information, and a combination thereof is input, a processor 112 of the restricted item terminal device 100-2 searches for the usage permit information associated with the received information among the delivery company identification information, the package identification information, and a combination thereof from the encrypted usage permit information received in advance. Then, the processor 112 of the restricted item terminal device 100-2 verifies the signature for the searched usage permit information by using the public key set in advance for the restricted item terminal device 100-2. When the signature verification is established, the processor 112 of the restricted item terminal device 100-2 decrypts the encrypted usage permit information by using the common key set in advance for the restricted item terminal device 100-2. Once the usage permit information is decrypted, the processor 112 of the restricted item terminal device 100-2 compares the usage permission time (usage condition) included in the usage permit information with the current time, and in a case where the current time is within a time set as the usage permission time, the processor 112 allows the delivery worker to use the restricted item 3 and enables the input of the input key information (S178).

Since the subsequent processing is the same as S112 to S126 in FIG. 8 of the first embodiment, a detailed description thereof is omitted.

As described above, the processing pattern of FIG. 21 is described corresponding to FIG. 8A (A-2 of the first embodiment) in the first embodiment, but it is also possible to similarly apply the processing according to the embodiment to FIG. 7A (A-1 of the first embodiment), FIG. 9A (A-3 of the first embodiment), FIG. 10A (A-4 of the first embodiment), FIG. 11A (B-1 of the first embodiment), FIG. 12A (B-2 of the first embodiment), and other embodiments. Further, in FIG. 21, the processing related to the authentication using the input key information in S142 is executed after the processing related to the confirmation of the usage condition in S178 is executed, but it is a matter of course that the order of these steps of processing may be reversed, or the steps of processing may be performed simultaneously.

In FIG. 21, the method of using the identification information of the delivery worker who is the person under restriction in S173 and S174 as information used for authentication is described, but the information used for identification is not limited thereto. For example, the server device 200 may issue information to be used as identification information separately from the input key information. In this case, in S172, when the processor of the person-under-restriction management device 300 requests the server device 200 to issue the usage permit information, the processor also requests the server device 200 to issue the information to be used as the identification information. The server device 200 issues, for example, the recording medium information (for example, a two-dimensional code or a barcode) in response to the issuance request for the identification information, and transmits the recording medium information together with the input key information in S110 and S140. Accordingly, when inputting the identification information to the restricted item terminal device 100-2 in S177, the delivery worker causes a reading unit of the restricted item terminal device 100-2 to read the recording medium information received in advance. Then, in S114, the two-stage authentication is performed by inputting the input key information to the restricted item terminal device 100-2.

As described above, in the present embodiment, various types of information can be used in the generation of the input key information used for authentication, and the restricted item can be flexibly managed. Furthermore, in the present embodiment, since the usage permission is performed using the signature-encrypted usage permit information, the security can be further improved.

Modification

In each embodiment, a case where the person-under-restriction related information and the usage related information are automatically received from the person-under-restriction management device 300 to the server device 200 or are read from the memory and transmitted in response to the transmission request from the server device 200 has been described. However, the present disclosure is not limited thereto, and for example, the administrator who operates the person-under-restriction management device 300 may access a predetermined input form provided in advance from the server device 200, an instruction input for the input form by the administrator may be received, and the person-under-restriction information and the usage related information may be manually input by the administrator. For example, specifically describing using FIG. 7A as an example, instead of transmitting the person-under-restriction related information and the usage related information in S106, the instruction input of the administrator for inputting these pieces of information is received in the input form provided from the server device 200, and the pieces of input information are stored in the server device 200. In this manner, by enabling the administrator of the person-under-restriction management device 300 to manually input information, it is not necessary to set a process related to transmission of these pieces of information between the person-under-restriction management device 300 and the server device 200 in advance. More specifically, an operator of the server device 200 does not need to cooperate in service with a delivery company in advance, for example, so that a more flexible system design becomes possible.

In each embodiment, a case where the person-under-restriction related information and the usage related information are automatically received from the person-under-restriction management device 300 to the server device 200 or are read from the memory and transmitted in response to the transmission request from the server device 200 has been described. However, the present disclosure is not limited thereto, and for example, the instructor who holds the instructor terminal device 100-1 may access a predetermined input form provided in advance from the server device 200, an instruction input for the input form by the instructor may be received, and the person-under-restriction information and the usage related information may be manually input by the instructor. For example, specifically describing using FIG. 20 as an example, when the instructor terminal device 100-1 receives the person-under-restriction related information and the usage related information in S192, the instructor may manually input these pieces of information in the input form while referring to the received information, and the pieces of input information may be transmitted from the instructor terminal device 100-1 to the server device 200. In this manner, by enabling the instructor to manually input information, it is not necessary to set a process related to transmission of these pieces of information between the person-under-restriction management device 300 and the server device 200 in advance. More specifically, an operator of the server device 200 does not need to cooperate in service with a delivery company in advance, for example, so that a more flexible system design becomes possible.

The present disclosure can be implemented not only by the devices explicitly described in the embodiments but also by software, hardware, or a combination thereof. Specifically, the processing and procedures described in the present specification can be implemented by implementing a logic corresponding to the processing in a medium such as an integrated circuit, a volatile memory, a nonvolatile memory, a magnetic disk, or an optical storage. Furthermore, the processing and procedures described in the present specification can be implemented as a computer program, and can be executed by various computers including a terminal device and a server device.

The processing and procedures described herein as being performed by a single device, software, component, and/or module may be performed by a plurality of devices, a plurality of pieces of software, a plurality of components, and/or a plurality of modules. Furthermore, in the present specification, various types of information described as being stored in a single memory and storage device can be stored in a distributed manner in a plurality of memories included in a single device or a plurality of memories arranged in a distributed manner in a plurality of devices. Furthermore, a plurality of pieces of software and hardware described in the present specification can be implemented by integrating the plurality of pieces of software and hardware into fewer components or by decomposing the plurality of pieces of software and hardware into more components.

Although the embodiments of the present invention have been described, the embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the present invention, and are included in the invention described in the claims and the equivalent scope thereof.

REFERENCE SIGNS LIST

1 System
14 Communication network
100 Terminal device
100-1 Instructor terminal device
100-2 Restricted item terminal device
100-3 Person-under-restriction terminal device
100-4 Instructor terminal device
100-5 User terminal device
200 Server device
300 Person-under-restriction management device
400 Restricted item management device

The invention claimed is:

1. A server device comprising: at least one processor, wherein the at least one processor is configured to execute computer readable instructions so as to:

receive at least one of person-under-restriction related information related to a person under restriction whose usage of a restricted item is restricted and usage related information related to usage of the restricted item by the person under restriction instructed by an instructor, the person-under-restriction related information being used to authenticate or identify the person under restriction;

convert:

two or more contents of the person-under-restriction related information;

two or more contents of the usage related information; or one or more contents of the person-under-restriction related information and one or more contents of the usage related information, into converted information having two or more contents; and generate authentication key information by combining the two or more contents of the converted information, the authentication key information being used to authenticate input key information generated based on predetermined input-key generation rule information and the authentication key information and input to the restricted item by the person under restriction, and to release restriction of the restricted item.

2. The server device according to claim 1, wherein the person under restriction and the instructor are different from each other.

3. The server device according to claim 1, wherein the person-under-restriction related information includes information unique to the person under restriction.

4. The server device according to claim 1, wherein the person under restriction is a person who provides a predetermined service to the instructor, and the person-under-restriction related information includes identification information for specifying the person under restriction or a company to which the person under restriction belongs.

5. The server device according to claim 4, wherein the usage related information includes content information indicating a content of the predetermined service selected by the instructor and provided by the person under restriction.

6. The server device according to claim 5, wherein the content information includes at least one of provision time information related to a time for providing the predetermined service and location information related to a location for providing the predetermined service.

7. The server device according to claim 1, wherein the usage related information includes unique information given to the instructor.

8. The server device according to claim 1, wherein the usage related information includes information of an arbitrary character string selected by the instructor.

9. The server device according to claim 1, wherein the authentication key information is generated based on one-time code information validated at a predetermined time in addition to the combination of the two or more contents of the converted information.

10. The server device according to claim 9, wherein the one-time code information is generated based on usage time information indicating a time when the person under restriction uses the restricted item.

11. The server device according to claim 1, wherein the authentication of the input key information is performed by the server device that has received the input key information input to the restricted item via a communication network.

12. The server device according to claim 1, wherein the input key information is generated by the at least one processor and then transmitted to the restricted item via a communication network, and the authentication of the input key information is performed by the restricted item that has received the input key information generated by the at least one processor.

13. The server device according to claim 1, wherein the predetermined input-key generation rule information and the authentication key information are transmitted to the restricted item via a communication network, and the authentication of the input key information is performed by the restricted item that has received the input-key generation rule information and the authentication key information.

14. The server device according to claim 1, wherein the input key information and the input-key generation rule information are transmitted to a person-under-restriction terminal device possessed by the person under restriction via a communication network, and the authentication of the input key information is performed by the server device that has received the input key information input to the restricted item via the communication network and has received the input-key generation rule information from the person-under-restriction terminal device via the communication network.

15. The server device according to claim 1, wherein the input key information and the input-key generation rule information are transmitted to a person-under-restriction terminal device possessed by the person under restriction via a communication network, and the authentication of the input key information is performed by the restricted item that has received the input-key generation rule information from the person-under-restriction terminal device and has received the authentication key information from the server device.

16. The server device according to claim 1, wherein the at least one processor is further configured to convert:

the two or more contents of the person-under-restriction related information;

the two or more contents of the usage related information; or the one or more contents of the person-under-restriction related information and the one or more contents of the usage related information, into numerical information, as the converted information, having a predetermined fixed length by using a hash function.

17. The server device according to claim 1, wherein the at least one processor is further configured to:

convert:

the two or more contents of the person-under-restriction related information;

the two or more contents of the usage related information; or the one or more contents of the person-under-restriction related information and the one or more contents of the usage related information, into numerical information as the converted information;

generate a sum by adding the two or more contents of the numerical information; and generate the authentication key information by extracting a specific number of digits at a predetermined position from the sum.

18. The server device according to claim 1, wherein the person-under-restriction related information includes company identification information relating to the person under restriction, the server device has a memory, and the memory is configured to store a conversion table in which the combination of the two or more contents for generating the authentication key information and a conversion rule of the conversion are associated with each content of the company identification information, with respect to the conversion table, the at least one processor is further configured to set, for the each content of the company identification information, one of:

which contents are extracted from the person-under-restriction related information and the usage related information; and the conversion rule based on each of the person-under-restriction related information and the usage related information, and the at least one processor is further configured to generate the authentication key information based on the extracted contents and the conversion rule for the each content of the company identification information in reference to the conversion table.

19. A method for causing a processor to execute a process, the method comprising executing on the processor in a computer the steps of:

receiving at least one of person-under-restriction related information related to a person under restriction whose usage of a restricted item is restricted and usage related information related to usage of the restricted item by the person under restriction instructed by an instructor, the person-under-restriction related information being used to authenticate or identify the person under restriction;

converting:

two or more contents of the person-under-restriction related information;

two or more contents of the usage related information; or one or more contents of the person-under-restriction related information and one or more contents of the usage related information, into converted information having two or more contents; and generating authentication key information by combining the two or more contents of the converted information, the authentication key information being used to authenticate input key information generated based on predetermined input-key generation rule information and the authentication key information and input to the restricted item by the person under restriction, and to release restriction of the restricted item.

20. A computer program product embodying computer readable instructions stored on a non-transitory computer-readable storage medium for causing a computer to execute a process by at least one processor so as to perform the steps of:

receiving at least one of person-under-restriction related information related to a person under restriction whose usage of a restricted item is restricted and usage related information related to usage of the restricted item by the person under restriction instructed by an instructor, the person-under-restriction related information being used to authenticate or identify the person under restriction;

converting:

two or more contents of the person-under-restriction related information;

two or more contents of the usage related information; or one or more contents of the person-under-restriction related information and one or more contents of the usage related information, into converted information having two or more contents; and generating authentication key information by combining the two or more contents of the converted information, the authentication key information being used to authenticate input key information generated based on predetermined input-key generation rule information and the authentication key information and input to the restricted item by the person under restriction, and to release restriction of the restricted item.

* * * * *